(12) United States Patent
Leibler et al.

(10) Patent No.: US 10,005,900 B2
(45) Date of Patent: Jun. 26, 2018

(54) POLYMER COMPOSITIONS COMPRISING CROSS-LINKED POLYMERS COMPRISING BORONIC ESTER FUNCTIONS ENABLING EXCHANGE REACTIONS, PROCESS FOR PREPARING THEM AND THEIR USE

(71) Applicant: ECOLE SUPERIEURE DE PHYSIQUE ET DE CHIMIE INDUSTRIELLES DE LA VILLE DE PARIS, Paris (FR)

(72) Inventors: Ludwik Leibler, Paris (FR); Renaud Nicolay, Verrieres-le-Buisson (FR); Max Rottger, Paris (FR)

(73) Assignee: ECOLE SUPERIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 0 days. days.

(21) Appl. No.: 15/243,449

(22) Filed: Aug. 22, 2016

(65) Prior Publication Data

US 2017/0051117 A1 Feb. 23, 2017

(30) Foreign Application Priority Data

Aug. 20, 2015 (FR) .................................... 15 57822
Oct. 19, 2015 (FR) .................................... 15 59955

(51) Int. Cl.
C08L 43/00 (2006.01)
C08J 3/24 (2006.01)
(Continued)

(52) U.S. Cl.
CPC ............ C08L 33/14 (2013.01); C08F 210/02 (2013.01); C08F 212/08 (2013.01);
(Continued)

(58) Field of Classification Search
CPC ...... C08L 43/00; C08L 85/04; C08L 2666/46; C08F 230/06
See application file for complete search history.

(56) References Cited

FOREIGN PATENT DOCUMENTS

| EP | 0616010 A2 | 9/1994 | |
|---|---|---|---|
| WO | WO 2015/110642 A1 | 7/2015 | |
| WO | WO 2015110642 A1 * | 7/2015 | ............ C08F 212/08 |

OTHER PUBLICATIONS

Bae et al., "Regiospecific Side-Chain Functionalization of Linear Low-Density Polyethylene with Polar Groups," Angewandte Chemie International Edition, vol. 44, 2005, pp. 6410-6413.
(Continued)

*Primary Examiner* — Vu A Nguyen
(74) *Attorney, Agent, or Firm* — Birch, Stewart, Kolasch & Birch, LLP

(57) ABSTRACT

The object of the invention is a polymer compositions comprising cross-linked polymer comprising boronic ester functions enabling exchange reactions, as well as free monofunctional boronic esters.
The compositions are obtained from the modification of a polymer by a functionalized boronic ester additive. This polymer can be pre-functionalized boronic ester or functionalized on addition of the said additive. In particular, the invention relates to a process enabling the behavior of a polymer to be modified by addition of a functional additive, enabling a cross-linked network containing exchangeable boronic ester links to be formed.

22 Claims, 14 Drawing Sheets

A

B

C r = 0 ou 1

(51) Int. Cl.
*C08K 5/55* (2006.01)
*C08L 33/14* (2006.01)
*C09D 7/65* (2018.01)
*C08F 220/14* (2006.01)
*C08F 230/06* (2006.01)
*C08F 210/02* (2006.01)
*C08F 212/08* (2006.01)
*C08F 220/28* (2006.01)
*C08F 220/30* (2006.01)
*C08F 220/16* (2006.01)
*C09D 7/12* (2006.01)

(52) U.S. Cl.
CPC .......... *C08F 220/14* (2013.01); *C08F 220/16* (2013.01); *C08F 220/28* (2013.01); *C08F 220/30* (2013.01); *C08F 230/06* (2013.01); *C08J 3/24* (2013.01); *C08K 5/55* (2013.01); *C08L 43/00* (2013.01); *C09D 7/125* (2013.01); *C09D 7/65* (2018.01); *C08F 2220/282* (2013.01); *C08F 2220/303* (2013.01); *C08F 2438/03* (2013.01); *C08F 2500/07* (2013.01); *C08F 2810/20* (2013.01); *C08J 2333/12* (2013.01); *C08L 2205/025* (2013.01); *C08L 2207/062* (2013.01); *C08L 2312/00* (2013.01)

(56) References Cited

OTHER PUBLICATIONS

Chung, "Synthesis of functional polyolefin copolymers with graft and block structures," Progress in Polymer Science, vol. 27, 2002, pp. 39-85.

French Preliminary Search Report for French Application No. 1557822, dated May 31, 2016.

French Preliminary Search Report for French Application No. 1559955, dated May 30, 2016.

Günay et al., "Standing on the Shoulders of Hermann Staudinger: Post-polymerization Modification from Past to Present," Journal of Polymer Science Part A: Polymer Chemistry, vol. 51, 2013 (Published online Oct. 29, 2012), pp. 1-28.

Hoyle et al., "Thiol-click chemistry: a multifaceted toolbox for small molecule and polymer synthesis," Chemical Society Reviews, vol. 39, 2010 (Published online Feb. 9, 2010), pp. 1355-1387.

Hoyle et al., "Thiol-Ene Click Chemistry," Angewandte Chemie International Edition, vol. 49, 2010, pp. 1540-1573.

International Search Report and Written Opinion of the International Searching Authority (Forms PCT/ISA/210, PCT/ISA/220 and PCT/ISA/237) for International Application No. PCT/EP2016/069783, dated Oct. 20, 2016.

Mather et al., "Michael addition reactions in macromolecular design for emerging technologies," Progress in Polymer Science, vol. 31, 2006, pp. 487-531.

Moad, "The synthesis of polyolefin graft copolymers by reactive extrusion," Progress in Polymer Science, vol. 24, 1999, pp. 81-142.

Passaglia et al., "Control of macromolecular architecture during the reactive functionalization in the melt of olefin polymers," Progress in Polymer Science, vol. 34, 2009 (Available online Jun. 6, 2009), pp. 911-947.

* cited by examiner

POLYMER COMPOSITIONS COMPRISING CROSS-LINKED POLYMERS COMPRISING BORONIC ESTER FUNCTIONS ENABLING EXCHANGE REACTIONS, PROCESS FOR PREPARING THEM AND THEIR USE

The invention relates to polymer compositions comprising cross-linked polymer comprising boronic ester functions enabling exchange reactions, as well as free monofunctional boronic esters.

Two embodiments, for manufacturing said polymer compositions, are herein disclosed. The invention is directed to the embodiment of the claims.

In an embodiment, these compositions arise from the polymerisation of precursor monomers to thermoplastic polymers comprising at least one pending boronic ester group, said pending boronic ester group not containing any polymerisable group and cross-linking agent comprising at least one boronic ester group enabling the formation of a network of cross-linked polymer containing pending functions and cross-links that are exchangeable by boronic ester metathesis reactions.

In another embodiment, these compositions are obtained from the modification of a polymer by a functionalised boronic ester additive. This polymer can be pre-functionalised boronic ester or functionalised on addition of the said additive. In particular, the invention relates to a process enabling the behaviour of a polymer to be modified by addition of a functional additive, enabling a cross-linked network containing exchangeable boronic ester links to be formed.

Surprisingly, a new, rapid boronic ester metathesis reaction has been discovered that can be carried out at ambient temperature, with or without catalyst. Furthermore, the reaction is advantageously quantitative.

"Boronic ester" according to the present invention designates compounds comprising a dioxaborolane or dioxaborinane group.

"Dioxaborolane" according to the present invention designates a group of formula:

"Dioxaborinane" according to the present invention designates a group of formula:

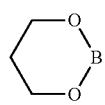

Substituents on the dioxaborolane and dioxaborinane rings according to the present invention designate the groups bound to the carbon and boron atoms that constitute the dioxaborolane and dioxaborinane rings.

The boronic ester according to the present invention is a dioxaborolane or dioxaborinane:

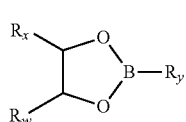

Dioxaborolane

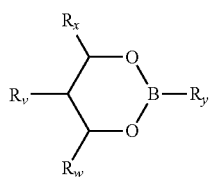

Dioxaborinane where Rx, Rw and Rv are identical or different and each represent a hydrogen atom or a hydrocarbon radical or form together, as a pair, an aliphatic or aromatic ring as defined below. Ry is a hydrocarbon radical as defined below. According to the invention, the group Ry is bound to the boronic ester function by a covalent bond through a carbon atom.

According to the invention, the metathesis reaction of the boronic esters enables an exchange reaction between the substituents on the boronic ester rings and can be represented as follows:

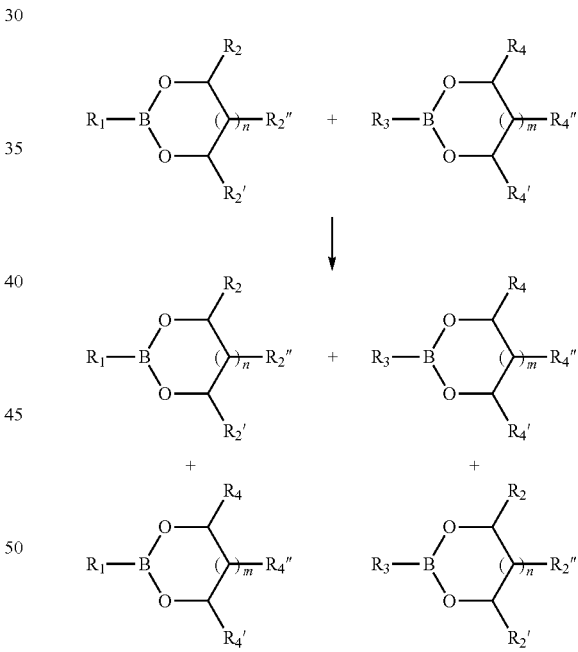

"Exchange reaction" designates that organic molecules, oligomers, polymers or polymeric networks containing boronic ester functions of formula (EB1) or (EB2) can exchange their substituents by a boronic ester metathesis reaction. These substituents can be hydrocarbon groups, oligomer chains or polymer chains. These groups are bound by covalent bonds, before and after the exchange reaction, to at least one carbon atom of the dioxaborolane or dioxaborinane ring and to the boron atom of the dioxaborolane or dioxaborinane ring. The substituents bound to the boron atom of the dioxaborolane or dioxaborinane rings are bound by a covalent bond through a carbon atom.

The boronic ester metathesis reaction does not release a molecule of water, and does not require the presence of water to take place. Notably, "exchange reaction" designates that the polymers of the invention can exchange among themselves the substituents of the boronic ester functions (EB1) or (EB2) that they carry by a boronic ester metathesis reaction. According to the invention, these functions can be pending or form part of the polymer chain, notably when they form part of a cross-link. Preferably these functions are pending or form part of a cross-link. In this way, the polymers are capable of exchanging chemical bonds among themselves.

The metathesis reaction can be carried out in the presence or absence of catalyst. Preferably the catalyst is stable, easily available, inexpensive and non-toxic.

The metathesis reaction can be carried in solvent(s) or in bulk, i.e. in the absence of solvents.

These boronic ester metathesis reaction enable polymer compositions to be obtained that show the properties of thermoset polymers and of thermoplastic polymers and which can be insoluble and malleable when hot.

The boronic esters and the 1,2- or 1,3-diols can also exchange their substituents by a transesterification reaction. Nevertheless, due to their reactivity, the 1,2- and 1,3-diols lead to numerous parasite reactions, such as etherification or esterification reactions, in polymer materials containing carboxylic acid or ester groups. The 1,2- and 1,3-diols may also react with other functions of interest. In addition to the aforementioned carboxylic acid and ester functions, epoxide, isocyanate and anhydride functions and halogenated derivatives may be mentioned, without this list being exhaustive. Furthermore, the parasite reactions caused by the presence of 1,2- and 1,3-diols in organic polymer formulations occur increasingly as the polymers are subjected to higher temperatures, as is often the case during the cross-linking process, during use and/or shaping or during recycling. In addition, certain vinyl monomers of interest, such as acrylates or methacrylates, are poorly stable or unstable under polymerisation conditions when they carry 1,2-diol or 1,3-diol functions. For this reason, it is often necessary for 1,2- or 1,3-diol functions to be protected during the polymerisation step and then deprotected once the polymer has been synthesised. In this way, the presence of pending 1,2-diol or 1,3-diol functions on organic polymers can lead to parasite reactions, limit the functional groups that can be incorporated into the formulations and complicate the polymer manufacturing process by adding a post-polymerisation deprotection step. With this in mind, the inventors have developed cross-linked polymer compositions in which the cross-linking reactions and the exchange reactions do not involve 1,2-diols or 1,3-diols.

By definition, a thermoset is a polymer that hardens following an input of energy, in particular on the action of heat. Thermosets are traditionally divided into two families depending on the glass-transition temperature (Tg) of their polymer matrix. Thermosets whose matrix has a Tg higher than the working temperature are called rigid thermosets, while thermosets whose matrix has a Tg lower than the working temperature are called elastomers. According to the present invention, thermoset designates both rigid thermosets and elastomers. Materials manufactured from thermoset polymers have the advantage of being able to be hardened in a way that gives them a high mechanical, thermal and chemical resistance and for this reason they can replace metals in certain applications. They have the advantage of being lighter than metals. They can also be used as matrices in composite materials. Traditional thermosets must be manufactured; in particular they must be moulded and have the appropriate shape for their final use from the start. No transformation other than machining is possible once they are polymerised, and even machining is difficult because of their fragility. Supple and hard parts and composites based on thermoset resins cannot be transformed or shaped; nor can they be recycled. Thermoplastics belong to another class of polymeric materials. Thermoplastics can be shaped at high temperature by moulding or by injection, but have mechanical properties and thermal and chemical resistance that are less interesting than those of thermosets. In addition, the shaping of thermoplastics can often only be carried out in a very narrow temperature ranges. When thermoplastics are heated, they become liquids the fluidity of which varies abruptly around the melting/glass-transition temperatures, which does not allow the application of a range of transformation methods that exist for glass and for metals for example.

The new polymer compositions, comprising cross-linked polymers, can combine the mechanical properties and insolubility of a thermoset while being used like a thermoplastic. In this way, it is possible to develop polymer compositions that show the mechanical properties and insolubility of a thermoset but which can be transformed when hot after hardening. In particular, it is possible to develop materials that can be heated to temperatures at which they become liquid without suffering destruction or degradation of their structure. In addition, for environmental reasons, the polymer composition is preferably recyclable.

A process can be developed to enable the modification of polymer behaviour, notably thermoplastic behaviour, by cross-linking and the creation of exchangeable links. Advantageously, these modifications can be made to the polymer during operations to shape the said polymer, for example extrusion, injection or compression.

It has also been possible to develop a polymerisation process enabling a cross/linked network with links, comprising pending links, exchangeable by boronic ester metathesis reactions to be prepared from monomers. Advantageously, the invention proposes additives to be used in combination with the monomers usually used to prepare the thermoplastic polymers considered.

In this way, the object of the invention is to propose polymer compositions that can combine the properties of thermosets and thermoplastics, that can be prepared:

by mixing a polymer with one or more additives enabling the formation of a cross-linked polymer composition, preferably a cross-linked network, containing pending links and cross-links that are exchangeable by boronic ester metathesis reactions, without it being necessary to use polymers or additives containing 1,2-diol functions or 1,3-diol functions in the cross-linking step. The polymer of the invention may be boronic-ester functionalised before the addition of the said additive or the addition of the said additive may enable the boronic-ester functionalisation of the polymer and the cross-linking.

by polymerisation of monomers and compounds described below, leading to a cross-linked network containing pending links and cross-links that are exchangeable by boronic ester metathesis reactions. Here again, the presence of 1,2-diol functions or 1,3-diol functions is not necessary for cross-linking and exchange reactions.

Moreover, the object of the invention is a process to modify the behaviour, for example the rheology, of a polymer by addition of one or more additives to the composition comprising such a polymer. This additive or these additives is/are boronic-ester functionalised and enable(s) the formation of a composition of cross-linked polymers, preferably a cross-linked network containing exchangeable links, by a boronic ester metathesis reaction. The polymer may be boronic-ester functionalised before the addition of the said additive or the addition of the said additive may enable the boronic-ester functionalisation of the polymer and the cross-linking.

Another object of the invention is a polymerisation process leading to a cross-linked network containing pending links and cross-links that are exchangeable by boronic ester metathesis reactions.

To do this, the inventors have conceived and developed compositions that enable cross-linked polymer compositions, preferably polymer networks, containing exchangeable cross-links and pending functions to be obtained.

The presence of exchangeable pending functions and exchangeable functions in the cross-links enables the macroscopic behaviour of the polymer networks formed to be easily controlled, independently of the degree of cross-linking. In this way, for a given degree of cross-linking, a given temperature and a given strain, a polymer network of the invention will relax stress quicker if it contains more exchangeable pending functions. Likewise, for a given degree of cross-linking, a given temperature and a given shear, a network of the invention will flow more rapidly if it contains more exchangeable pending functions.

The inventors have tried, without success, to prepare methacrylate and styrene polymer networks containing pending alcohol functions and cross-links containing ester functions with the aim of obtaining thermosetting systems that, while insoluble even at high temperature, can flow and are malleable.

To do this, polymer networks, prepared by radical polymerisation of monomers carrying alcohol functions, such as among others 2-hydroxyethyl methacrylate or 4-vinylbenzyl alcohol, and cross-linking agents containing ester functions, such as among others ethylene glycol dimethacrylate, 1,4-butanediol dimethacrylate, 1,6-hexanediol dimethacrylate or bisphenol A dimethacrylate, have been prepared in the presence of various transesterification catalysts, such as among others zinc acetate, titanium(IV) ethoxide, titanium(IV) isopropoxide, triphenylphosphine or triazabicyclodecene. The various formulations tested did not enable polymer compositions to be prepared that show the mechanical properties of a thermoset while still being transformable at high temperature after hardening without showing degradation of their structure or that could be recycled without the notable loss of their mechanical properties.

The inventors have also tried, without success, to prepare methacrylate polymer networks containing cross-links incorporating imine functions from monomers or polymers containing pending primary amine functions with the aim of obtaining thermosetting systems that, while insoluble even at high temperature, can flow and are malleable.

To do this, methacrylate polymer networks containing cross-links incorporating imine functions have been prepared by radical polymerisation from methyl methacrylate, of monomers carrying primary amine functions, such as 2-aminoethyl methacrylate, 2-aminoethyl methacrylamide or 4-vinylbenzylamine, and cross-linking agents containing imine functions, such as the compound of formula (I) CF1, and/or terephthaldehyde. The various formulations tested did not enable polymer compositions to be prepared that show the mechanical properties of a thermoset while still being transformable at high temperature after hardening without showing degradation of their structure or that could be recycled without the notable loss of their mechanical properties.

Likewise, the inventors have tried, without success, to prepare methacrylate polymer networks containing pending 1,2-diol and/or 1,3-diol functions and cross-links containing the boronic ester functions (EB1) or (EB2) with the aim of obtaining thermosetting systems that, while insoluble even at high temperature, can flow and are malleable.

To do this, methacrylate polymer networks containing cross-links incorporating boronic ester functions have been prepared by radical polymerisation from methyl methacrylate, of monomers carrying 1,2-diol functions, such as 5,6-hexanediol methacrylate, and dimethacrylate or methacrylate-styrene cross-linking agents containing the boronic ester functions (EB1) or (EB2) between the two functions that can be polymerised by the radical route, i.e. the two methacrylate functions or the methacrylate function and the styrene function. The various formulations tested did not enable polymer compositions to be prepared that show the mechanical properties of a thermoset while still being transformable at high temperature after hardening or that could be recycled without the notable loss of their mechanical properties.

Unexpectedly, the inventors were able to successfully prepare polymer networks containing pending boronic ester functions and cross-links incorporating boronic esters. In this way, the inventors have been able to successfully prepare thermosetting systems that, while insoluble even at high temperature, can flow and are malleable.

It has been possible to prepare polymer compositions that show the mechanical properties and insolubility of a thermoset but that are transformable after hardening at a temperature higher than the glass transition temperature (Tg) or the melting temperature (Tf) of the polymer, preferably higher than Tg or Tf+10° C., more preferably higher than Tg or Tf+20° C., still more preferably higher than Tg or Tf+40° C., still more preferably higher than Tg or Tf+80° C., if the glass transition temperature or the melting temperature is lower than 25° C., without suffering destruction or degradation of the structure, and that can be recycled without notable loss of their mechanical properties.

DESCRIPTION OF THE INVENTION

The object of the invention is a composition comprising (a) cross-linked polymers containing exchangeable pending links and exchangeable cross-links, by boronic ester metathesis reactions, preferably obtained by copolymerisation as described below; and (b) free monofunctional boronic esters, said boronic esters being chosen from among the following dioxaborolane and dioxaborinane rings of formulas (EB1) and (EB2):

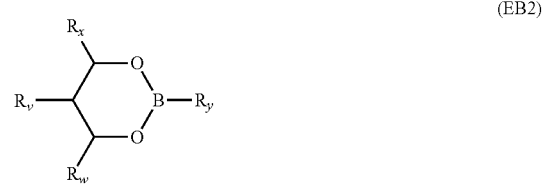

in which

Rx, Rw and Rv are identical or different and each represent a hydrogen atom or a hydrocarbon group or form together, as a pair, an aliphatic or aromatic ring Ry is a hydrocarbon radical linked to the boron atom of the dioxaborolane or dioxaborinane ring by a covalent bond through a carbon atom.

Preferably the compositions contain less than 0.5 mmol of 1,2-diol and 1,3-diol functions per gram of polymer after cross-linking.

In a first embodiment, the composition (a) of cross-linked polymers is prepared by copolymerisation of the following compounds:
  (a) Precursor monomers to thermoplastic polymers comprising at least one pending boronic ester group, said pending boronic ester group not containing any polymerisable group;
  (b) Cross-linking agent comprising at least one boronic ester group enabling the formation of a network of cross-linked polymer containing pending functions and cross-links that are exchangeable by boronic ester metathesis reactions;
    said boronic esters being chosen from among the following dioxaborolane and dioxaborinane rings of formulas (EB1) and (EB2):

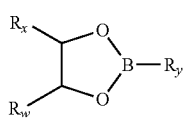
(EB1)

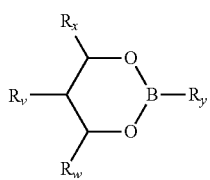
(EB2)

in which

Rx, Rw and Rv are identical or different and each represent a hydrogen atom or a hydrocarbon group or form together, as a pair, an aliphatic or aromatic ring Ry is a hydrocarbon radical linked to the boron atom of the dioxaborolane or dioxaborinane ring by a covalent bond through a carbon atom;

(c) possibly monomers that are precursors to thermoplastic polymers that do not include a boronic ester group of formula (EB1) or (EB2).

The cross-linking agent is chosen from among:
a compound of formula (Ia) or (Ib) below:

Compound of formula (Ia)

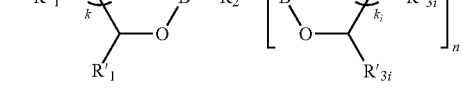

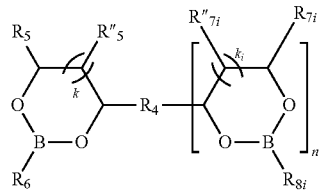
Compound of formula (Ib1)

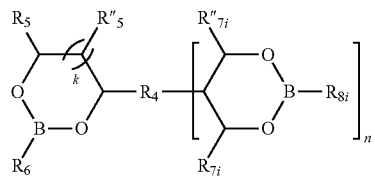
Compound of formula (Ib2)

in which n, i, k, ki, $R_1$, $R'_1$, $R''_1$, $R_{3i}$, $R'_{3i}$, $R''_{3i}$, $R_5$, $R''_5$, $R_{7i}$, $R''_{7i}$, $R_6$, each $R_{8i}$, $R_2$ and $R_4$, are defined below. $R_2$ is linked to the boronic ester function by a covalent bond through a carbon atom. $R_6$, each $R_{8i}$ is linked to the boron atom by a covalent bond through a carbon atom.

a monomer (b) boronic ester functional compound, precursor to a thermoplastic polymer or thermoset, comprising at least one boronic ester function per monomer and carrying at least one polymerisable group and their mixtures.

In particular, the monomer (b) is of formula (IIIa), (IIIb1) or (IIIb2) below:

Compound of formula (IIIa)

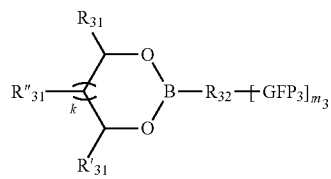

Compound of formula (IIIb1)

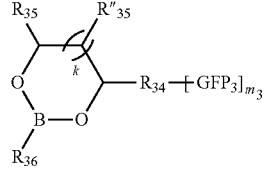

Compound of formula (IIIb2)

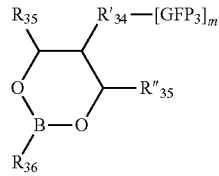

in which $R_{31}$, $R'_{31}$, $R''_{31}$, $R_{35}$, $R''_{35}$, $R_{36}$, $R_{32}$ and $R_{34}$, $GFP_3$, $m_3$, k are as defined below. $R_{32}$ is linked to the boronic ester function by a covalent bond through a carbon atom. $R_{36}$ is linked to the boron atom by a covalent bond through a carbon atom In particular, monomer (b) has the formula (IVa) or (IVb) below:

Compound of formula (IVa)

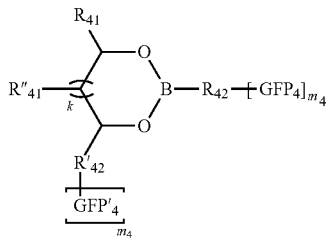

Compound of formula (IVb)

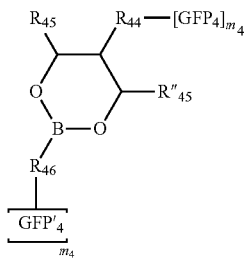

in which $R_{41}$, $R''_{41}$, $R_{45}$, $R''_{45}$, $R_{42}$, $R'_{42}$, $R_{46}$ and $R_{44}$, $GFP_4$, $GFP'_4$, $m_4$ and k are as defined below. $R_{42}$ is linked to the boronic ester function by a covalent bond through a carbon atom. $R_{46}$ is linked to the boron atom by a covalent bond through a carbon atom.

Preferably the monomers (a), (b) and (c) include a single polymerisable group and the polymerisation is a radical polymerisation, a polymerisation by coordination or a ring-opening polymerisation or the monomers (a), (b) and (c) include only two polymerisable groups and the polymerisation is a polyaddition or a polycondensation.

According to the invention, any function that can give rise to two addition or condensation reactions by the mode of monomer polymerisation involved is equivalent to two polymerisable groups.

In a second embodiment, the object of the invention is a composition comprising (a) cross-linked polymers containing exchangeable pending links and exchangeable cross-links, by boronic ester metathesis reactions, obtained by cross-linking of linear or branched polymers; and (b) free monofunctional boronic esters, said boronic esters being chosen from among the following dioxaborolane and dioxaborinane rings of formulas (EB1) and (EB2):

(EB1)

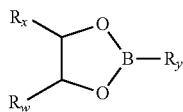

(EB2)

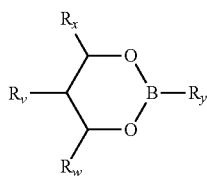

in which

Rx, Rw and Rv are identical or different and each represent a hydrogen atom or a hydrocarbon radical or form together, as a pair, an aliphatic or aromatic ring.

Ry is a hydrocarbon radical linked to the boron atom of the dioxaborolane or dioxaborinane ring by a covalent bond through a carbon atom.

The linear or branched polymers preferably contain less than 1 mmol of 1,2-diol and/or 1,3-diol functions per gram of polymer before cross-linking and the compositions preferably contain less than 0.5 mmol of 1,2-diol and/or 1,3-diol functions per gram of polymer after cross-linking.

Preferably, the polymers, before cross-linking, are linear or branched polymers having side-groups carrying:
boronic ester functional groups of formula (EB1) or (EB2) linked to the polymer by at least one carbon atom of the dioxaborolane or dioxaborinane ring; or
boronic ester functional groups of formula (EB1) or (EB2) linked to the polymer by the boron atom of the dioxaborolane or dioxaborinane ring.

In an embodiment of the invention, the composition results from the mixture, in the molten state or in solution:
Of at least one linear or branched polymer P1 with side-groups carrying:
boronic ester functional groups of formula (EB1) or (EB2) linked to the polymer by at least one carbon atom of the dioxaborolane or dioxaborinane ring; or
boronic ester functional groups of formula (EB1) or (EB2) linked to the polymer by the boron atom of the dioxaborolane or dioxaborinane ring.
Of at least one additive carrying at least two boronic ester groups of formula (EB1) or (EB2) that are capable of reacting with the side groups of the polymer P1 to form a cross-linked polymer composition, preferably a cross-linked network, with pending links and cross-links that are exchangeable by boronic ester metathesis reactions.

The additive or cross-linking agent is preferably a compound of formula (Ia) or (Ib) as described above and below.

The additive can also be a linear or branched polymer P2 carrying
boronic ester functional groups of formula (EB1) or (EB2) linked to the polymer by at least one carbon atom of the dioxaborolane or dioxaborinane ring; or
boronic ester functional groups of formula (EB1) or (EB2) linked to the polymer by the boron atom of the dioxaborolane or dioxaborinane ring.

In an embodiment of the invention, the composition results from the mixture, in the molten state or in solution:
Of at least one linear or branched polymer P1' containing functions enabling grafting,
A combination of molecules of which the molecules comprise at one end a functional group enabling covalent binding of the molecule to the polymer P1' and at the other end a functional group chosen from among a boronic ester function of formula (EB1) or (EB2) linked to the rest of the molecule by at least one carbon atom of the dioxaborolane or dioxaborinane ring, a boronic ester function of formula (EB1) or (EB2) linked to the rest of the molecule by its boron atom, and/or molecules comprising at two of their extremities functional groups enabling covalent binding of the molecule to the polymer P1' and between these two extremities a boronic ester function of formula (EB1) or (EB2), the combination enabling grafting and the creation of pending links and cross-links exchangeable by boronic ester metathesis reactions.

The linear or branched polymer, preferably P1, P1' or P2, is preferably a polymer chosen from among vinyl polymers, polyolefins, polyamides, polysiloxanes or silicones, and polysaccharides.

Another object of the invention is a process for preparing a cross-linked polymer composition, said process comprising the following steps:
  Choosing a linear or branched polymer P1 with side-groups carrying:
    boronic ester functional groups of formula (EB1) or (EB2) linked to the polymer by at least one carbon atom of the dioxaborolane or dioxaborinane ring; or
    boronic ester functional groups of formula (EB1) or (EB2) linked to the polymer by the boron atom of the dioxaborolane or dioxaborinane ring.
  Choosing at least one additive carrying at least two boronic ester groups of formula (EB1) or (EB2) that are capable of reacting with the side groups of the polymer P1 to form a cross-linked polymer composition, preferably a cross-linked network, containing links and cross-links that are exchangeable by boronic ester metathesis reactions.
  Mixing, in the molten state or in solution, said polymer P1 and said additive to obtain the said composition.

Another object of the invention is a process for preparing a cross-linked polymer composition, said process comprising the following steps:
  Choosing a linear or branched polymer P1' containing functions enabling grafting;
  Choosing a combination of molecules of which the molecules comprise at one end a functional group enabling covalent binding of the molecule to the polymer P1' and at the other end a functional group chosen from among a boronic ester function of formula (EB1) or (EB2) linked to the rest of the molecule by at least one carbon atom of the dioxaborolane or dioxaborinane ring, a boronic ester function of formula (EB1) or (EB2) linked to the rest of the molecule by its boron atom, and/or molecules comprising at two of their extremities functional groups enabling covalent binding of the molecule to the polymer P1' and between these two extremities a boronic ester function of formula (EB1) or (EB2), the combination enabling grafting and the creation of pending links and cross-links that are exchangeable by boronic ester metathesis reactions.
  Mixing, in the molten state or in solution, said polymer P1' and said combination.

Another object of the invention is a material obtained from the composition according to the invention. Another object of the invention is a formulation comprising a composition according to the invention.

Another object of the invention is the use of an additive such as defined in the invention, or the combination such as defined in the invention, in the presence of a linear or branched polymer P1 or P1' for the formation of a composition comprising cross-linked polymers, preferably a cross-linked network, containing pending links and cross-links that are exchangeable by boronic ester metathesis reactions and free monofunctional boronic esters of formula (EB1) or (EB2).

Another object of the invention are combinations to cross-link linear or branched polymers, said combinations being chosen from among the combinations comprising:
  A+B;
  A and/or B+C;
  A+compound of formula (Ia); or
  B+compound of formula (Ib).

A, B and C corresponding to the following formulas:

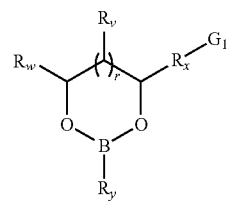

A

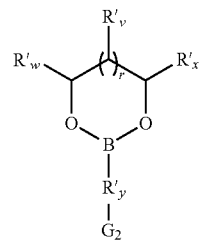

B

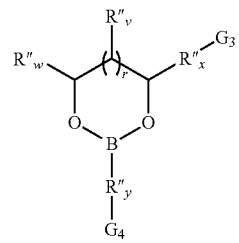

C r = 0 ou 1 where
  $G_1$, $G_2$, $G_3$ and $G_4$ each represent, independently from one another, a functional group enabling the covalent binding of the molecules to the polymer chain to be functionalised;
  Rx, R"x, and Ry, R'y, R"y are hydrocarbon groups;
  R'v, R'w and R'x, identical or different, each represent a hydrogen atom, a hydrocarbon radical, or form together, as a pair, an aliphatic or aromatic ring;
  Rv and Rw, respectively R"v and R"w, identical or different, represent a hydrogen atom, a hydrocarbon radical or form an aliphatic or aromatic ring together, or with Rx, respectively or with R"x;
  Ry, R'y, R"y are linked to the boron through a carbon atom.

Another object of the invention is the use of a combination according to the invention, in the presence of a linear or branched polymer P1 or P1' for the formation of a composition comprising cross-linked polymers, preferably a cross-linked network, containing pending links and cross-links that are exchangeable by boronic ester metathesis reactions and free monofunctional boronic esters of formula (EB1) or (EB2), in particular for modifying the rheology of a composition, such as an oil or a paint, comprising the said polymer P1 or P1' by addition of the combination according to the invention to the composition; the rheology is modified by choosing the concentration of the said combination.

Definitions

Definition of Polymer, Linear Polymer, Branched Polymer

A polymer comprises a set of polymer chains of different molecular dimensions, notably of different molar masses.

The polymer chains are made up from the covalent assembly of a large number of repetitive units called monomer units. The polymer chains so defined have molecular dimensions (characterised by their molar mass) very much larger than those of simple molecules, and are made up from the covalent assembly of more than 5 monomer units, preferably of more than 20 monomer units, still more preferably of more than 50 monomer units.

Polymer chains comprising a single type of monomer unit are called homopolymers. Polymer chains comprising several types of monomer unit are called copolymers. According to this invention, polymer and polymer chain designate both homopolymers and copolymers.

The monomer units constituting the polymer chain may be linked to a variable number of other monomer units. The number of other monomer units to which a monomer unit is linked is called valence. A monomer unit that is linked to a single other monomer unit has a valence of 1 and corresponds to an extremity of the polymer chain. A monomer unit that is linked to two other monomer units has a valence of 2 and corresponds to a linear sequence of a polymer chain. A monomer unit that is linked to more than two other monomer units has a valence greater than 2 and corresponds to a branching point. A polymer chain with two extremities is a linear polymer chain. A linear polymer chain is therefore composed of monomer units with a valence of 2 and two units with a valence of 1. A polymer chain that has more than two extremities and whose molar mass has a finite value is a branched polymer chain. A branched polymer chain is therefore composed of monomer units with a valence of 2, monomer with a valence greater than 2, and more than two monomer units with a valence of 1.

According to this invention, polymer and polymer chain designate both linear polymer chains and branched polymer chains.

Definition of Boronic Ester

"Boronic ester" according to the present invention designates compounds comprising a dioxaborolane or dioxaborinane group, as defined in the introduction.

Definition of 1,2-Diol and 1,3-Diol

"1,2-Diol" according to the present invention designates a compound, whether it be a free organic molecule, an oligomer, a polymer, or a polymer network, containing two hydroxyl (—OH) groups on adjacent, or vicinal, carbon atoms. Non-limiting examples include ethane-1,2-diol or ethylene glycol (HO—(CH$_2$)$_2$—OH), or propane-1,2-diol (or propylene glycol, HO—CH$_2$—CH(OH)—CH$_3$).

"1,3-Diol" according to the present invention designates a compound, whether it be a free organic molecule, an oligomer, a polymer, or a polymer network, containing two hydroxyl (—OH) groups on carbon atoms separated by one atom. Non-limiting examples include propane-1,3-diol (HO—(CH$_2$)$_3$—OH) or butane-1,3-diol (HO—(CH$_2$)$_2$—CH(OH)—CH$_3$).

Definition of Pending Function

A boronic ester function (EB1) or (EB2) is pending if it is linked by a covalent bond to a monomer unit with a valence greater than 1 by one and only one of its hydrocarbon substituents Rx or Ry (see following definition) or by its substituents {Rx, Rw} or {Rx, Rv} if these form together an aliphatic or aromatic ring. In other words, a function is pending if it is linked by a covalent bond to a polymer chain by one and only one of its hydrocarbon substituents Rx or Ry (see following definition) or by its substituents {Rx, Rw} or {Rx, Rv} if these form together an aliphatic or aromatic ring and if it does not constitute an extremity of the polymer chain.

A boronic ester function (EB1) or (EB2) is terminal, or constitutes a chain extremity, if it is linked by a covalent bond to a monomer unit with a valence equal to 1 by one and only one of its hydrocarbon substituents Rx or Ry (see following definition) or by its substituents {Rx, Rw} or {Rx, Rv} if these form together an aliphatic or aromatic ring.

A boronic ester function (EB1) or (EB2) forms part of a cross-link if it is linked by its hydrocarbon substituent Rx through a covalent bond to a monomer unit covalently connected to at least two other monomer units not comprising the said boronic ester function, and if it is linked by its hydrocarbon substituent Ry through a covalent bond to a monomer unit covalently connected to at least two other monomer units not comprising the said boronic ester function.

When it substituents {Rx, Rw} or {Rx, Rv} together form an aliphatic or aromatic ring, a boronic ester function (EB1) or (EB2) can also form part of a cross-link if it is linked, by its substituents {Rx, Rw} or {Rx, Rv}, to a monomer unit covalently connected to at least two other monomer units not comprising the said boronic ester function, and if it is linked by its hydrocarbon substituents Ry through a covalent bond to a monomer unit covalently connected to at least two other monomer units not comprising the said boronic ester function.

In this way, the term "pending group" according to the present invention designates a side-group of the polymer chain. "Side-group" according to the present invention designates a substituent that is not an oligomer or a polymer. A side-group is not integrated into the main chain of the polymer. "Pending boronic ester group" according to the present invention designates a side group comprising a dioxaborolane function or a dioxaborinane function. In this way, when a boronic ester of formula (EB1) or (EB2) is pending, one of its two substituents Rx or Ry is not linked to a polymer chain except through its own boronic ester function. Furthermore, when a boronic ester of formula (EB1) or (EB2) is pending, it substituents Rv and Rw are not linked to a polymer chain, except through the said boronic ester function, unless one of them forms an aliphatic or aromatic ring with the Rx substituent on another carbon atom of the dioxaborolane or dioxaborinane ring and that the said Rx substituent is linked to a polymer chain. The boronic ester of formula (EB1) or (EB2) may be linked with the side group by the boron atom of its dioxaborolane or dioxaborinane ring, by one of the carbon atoms of its dioxaborolane or dioxaborinane ring, or by two or three of the carbon atoms of its dioxaborolane or dioxaborinane ring if these together form an aliphatic or aromatic ring.

When the expression "pending boronic ester function" is used to qualify a monomer, it designates, according to the invention, that after polymerisation of the said monomer, the said boronic ester function will be pending or will form part of a cross-link. In this way, the expression "monomer having a pending boronic ester function" designates that after polymerisation of the said monomer, the boronic ester function considered will not form part of the main chain of the polymer obtained.

Definition of a Free Molecule

According to this invention, a molecule is said to be "free" if it is not linked by a covalent bond to a polymer of the composition.

According to this invention, a "free monofunctional boronic ester" is a free molecule containing one and only one boronic ester function (EB1) or (EB2). A "free monofunctional boronic ester" may or may not contain one or more other functions insofar as these are not boronic ester functions (comprising boronic esters other than those of formula (EB1) or (EB2)), boronic acid, 1,2-diols or 1,3-diols.

Definition of Cross-Linking

Cross-linking, or polymer chain cross-linking, consists of creating covalent chemical bonds between polymer chains that initially are not linked to other by covalent bonds. Cross-linking is accompanied by an increase in connectivity, through covalent bonds, between the various chains that make up the polymer. The cross-linking of linear or branched polymer chains is accompanied by an increase in the molecular dimensions of the chains, notably of the molar masses, and can lead to a network of cross-linked polymers being obtained. The cross-linking of a network of cross-linked polymers is accompanied by an increase in the mass fraction insoluble in good non-reactive solvents according to the definition given below.

According to the invention, cross-linking is the result, among other causes, of metathesis reactions between the boronic ester functions (EB1) or (EB2) on the pending groups of the polymers and/or on the pending groups in the polymers and on compounds of formula (Ia) or (Ib), defined below. Preferably, cross-linking is the result of metathesis reactions between the boronic ester functions on the pending groups of the polymers and/or on the pending groups in the polymers and on compounds of formula (Ia) or (Ib). In this way, for every cross-linking reaction by metathesis reaction between boronic ester functions, one equivalent of free monofunctional boronic ester is generated, as illustrated in FIG. 3 in the case of cross-linking by a metathesis reaction of linear polymers functionalised by complementary pending dioxaborolane functions. Preferably, cross-linking results exclusively from metathesis reactions between the boronic ester functions on the pending groups of the polymers and/or on the pending groups in the polymers and on compounds of formula (Ia) or (Ib).

"Cross-linked network" according to the present invention designates a network of cross-linked polymers.

"Network of cross-linked polymers" according to the present invention designates a set of polymer and/or oligomer chains linked to each other by covalent bonds that, when immersed at a mass fraction of 1/10 in a good non-reactive solvents for the polymer and/or oligomer chains that it is constituted of shows an insoluble mass fraction greater than 0.1%, preferably greater than 0.5%, 1%, 2%, 5%, 10%, 20%, 30%, 40%, 50% and 70%, after 48 hours of immersion at atmospheric pressure and at a temperature between the melting temperature and the boiling temperature of the solvent. A good non-reactive solvent is a good solvent that will not degrade the polymer chains, that will not degrade or react with, notably by transesterification reactions, the boronic ester functions and that will not participate in boronic ester metathesis reactions. The insolubility can be assessed by the naked eye or by passing the formulation through a filter with a porosity of 0.2 micrometer, preferably of 0.4 micrometer, still more preferably of 1 micrometer.

Cross-linking is accompanied by the creation of cross-links linking at least two polymer chains to each other. These cross-links preferably contain boronic ester functions. In this way, after cross-linking, the composition includes boronic ester functions in the cross-links and preferably polymers comprising pending boronic ester functions.

Definition of the Glass Transition

The glass transition temperature, Tg, is defined as the temperature at which the value of the damping factor, or loss factor, tan δ is at a maximum by dynamic mechanical analysis at 1 Hz. The damping factor, or loss factor, tan δ, is defined as the ratio of the loss modulus E" to the conservation modulus E' (Mechanical Properties of Solid Polymers, Author(s): I. M. Ward, J. Sweeney; Editor: Wiley-Blackwell; Edition: 3rd Edition; Print ISBN: 9781444319507; DOI: 10.1002/9781119967125).

Definition of Polymer Composition

A polymer composition is defined as a homogenous or non-homogenous mixture of linear or branched polymers, which may be linked by cross-links, containing pending links and cross-links that are exchangeable by boronic ester metathesis reactions, potentially with various charges, additives or solvents, as defined below.

In this way, "polymer composition" designates both solid formulations that contain little or no solvent(s) and liquid formulations containing a higher mass fraction of solvent(s).

In this way, "formulation" designates both solid formulations and liquid formulations.

According to the invention, a solid formulation contains less than 30% by mass of solvent(s), preferably less than 25% by mass of solvent(s), more preferably less than 20% by mass of solvent(s), still more preferably less than 15% by mass of solvent(s), still more preferably less than 5% by mass of solvent(s), still more preferably less than 2.5% by mass of solvent(s), still more preferably less than 1% by mass of solvent(s) and still more preferably less than 0.5% by mass of solvent(s).

According to the invention, a solid formulation is a material.

According to the invention, a liquid formulation contains more than 30% by mass of solvent(s), preferably more than 50% by mass of solvent(s), more preferably more than 60% by mass of solvent(s), still more preferably more than 70% by mass of solvent(s) and still more preferably more than 75% by mass of solvent(s).

According to the invention, a liquid formulation may be a material.

A solvent is defined as a molecule, or a mixture of molecules, that is liquid at ambient temperature and that has the property, at ambient temperature, of dissolving and/or diluting other substances without modifying them chemically and without being modified itself. Among solvents, a distinction is made between good solvents, which present the property of dissolving substances at room temperature without modifying them chemically and without being modified themselves, and poor solvents, which present the property of diluting substances at ambient temperature without dissolving them, modifying them chemically and without being modified themselves.

A solvent can therefore be a good solvent for one compound and a poor solvent for another compound.

Non-limiting examples of solvents include ethyl acetate, butyl acetate, acetone, acetonitrile, benzyl alcohol, acetic anhydride, anisole, benzene, butanol, butanone, chlorobenzene, chloroform, cyclohexane, dichloroethane, dichloromethane, dimethylformamide, dimethyl sulfoxide, dioxane, water, ethanol, glycol ether, diethyl ether, ethylene glycol, heptane, hexane, mineral oils, natural oils, synthetic oils, hydrocarbons, methanol, pentane, propanol, propoxypropane, pyridine, tetrachloroethane, tetrachloromethane, tetrahydrofuran, toluene, trichlorobenzene, xylene, and their mixtures.

Definition of Radicals

A "hydrocarbon" group according to the present invention is a group consisting of atoms of carbon and hydrogen. This group may also include heteroatoms and/or be substituted by halogens. The hydrocarbon group preferably includes 1-50, more preferably 1-18, still more preferably 1-12 carbon atoms.

"Heteroatom" according to present invention designates atoms of sulfur, nitrogen, oxygen, boron, phosphorus or silicon.

"Halogen" according to present invention designates atoms of fluorine, chlorine, bromine or iodine.

Hydrocarbon groups may be aliphatic or aromatic.

"Aliphatic" according to the present invention designates an "alkyl", "alkenyl", "alkanediyl", "alkenediyl" or "cycloalkyl" group. The valence of the group will be determined case-by-case.

An aliphatic group may include heteroatoms. In particular, it may include ester, amide, ether, thioether, secondary or tertiary amine, carbonate, urethane, carbamide or anhydride functions. If applicable, the aliphatic group may be substituted notably by a halogen, an -Rz, —OH, —NH2, —NHRz, —NRzR'z, —C(O)—H, —C(O)-Rz, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —SH, —S-Rz, —S—S-Rz, —C(O)—N(H)-Rz, —N(H)—C(O)-Rz group with Rz, R'z, identical or different, representing a $C_1$-$C_{50}$ alkyl radical, or by a functional group chosen from among the functional groups that are polymerisable by radical polymerisation and the boronic ester functions of formula (EB1) or (EB2).

An "alkyl" group according to the present invention designates a saturated or unsaturated, linear or branched hydrocarbon chain, preferably comprising 1-50 carbon atoms, more preferably 1-18 carbon atoms, still more preferably 1-12 carbon atoms, and which can include one or more heteroatoms. In this way, according to the invention, ignoring the strict sense of the term, "alkyl" also includes:
- "alkenyls", that is hydrocarbon chains comprising at least one double bond;
- "heteroalkyls", that is alkyl groups as defined above comprising at least one heteroatom.

An "alkanediyl" group according to the present invention designates a divalent, saturated or unsaturated, linear or branched hydrocarbon chain, preferably comprising 1-50 carbon atoms, more preferably 1-18 carbon atoms, still more preferably 1-12 carbon atoms, and which can include one or more heteroatoms. In this way, according to the invention, ignoring the strict sense of the term, "alkanediyl" also includes "alkenediyls", that is hydrocarbon chains comprising at least one double bond, for example a vinylene (ethenylene) group or a propenylene group, and "heteroalkanediyls", that is alkanediyl groups as defined above comprising at least one heteroatom.

A "cycloalkyl" group according to the present invention designates a cyclical alkyl chain, which may be saturated or partially unsaturated but not aromatic, preferably comprising 3-10 carbon atoms in the ring. The alkyl chain may include one or more heteroatoms; in this case it will be specifically called "heterocycloalkyl". The group may include more than one ring, and in this way includes fused, linked or spiro rings. Examples include cyclopropyl, cyclopentyl, cyclohexyl, cycloheptyl, pyrrolidinyl, piperidinyl, piperazinyl or morpholinyl groups. If applicable, the cycloalkyl group may be substituted notably by a halogen, an -Rz, —OH, —NH2, —NHRz, —NRzR'z, —C(O)—H, —C(O)-Rz, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —SH, —S-Rz, —S—S-Rz, —C(O)—N(H)-Rz, —N(H)—C(O)-Rz group with Rz, R'z, identical or different, representing a $C_1$-$C_{50}$ alkyl radical, or by a functional group chosen from among the functional groups that are polymerisable by radical polymerisation and the boronic ester functions of formula (EB1) or (EB2). If applicable, the cycloalkyl group maybe divalent; in this case it is preferably called a "cycloaliphatic" radical.

"Aromatic" according to the present invention designates a monovalent or multivalent group comprising an aromatic hydrocarbon group. The valence of the group will be determined case-by-case.

The aromatic group may include heteroatoms; in this case it is called a "heteroaromatic" radical. In particular, it may include ester, amide, ether, thioether, secondary or tertiary amine, carbonate, urethane, carbamide or anhydride functions. An aromatic group may include one or more rings that are fused or covalently linked. If applicable, the aromatic group may be substituted notably by a halogen, an -Rz, —OH, —NH2, —NHRz, —NRzR'z, —C(O)—H, —C(O)-Rz, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —SH, —S-Rz, —S—S-Rz, —C(O)—N(H)-Rz, —N(H)—C(O)-Rz group with Rz, R'z, identical or different, representing a $C_1$-$C_{50}$ alkyl radical, or by a functional group chosen from among the functional groups that are polymerisable by radical polymerisation and the boronic ester functions of formula (EB1) or (EB2).

The term "aromatic" includes "arylaromatic" groups, that is a group comprising at least one aromatic group and at least one aliphatic group, as defined. The aliphatic group may be linked to one part of the molecule and the aromatic group to another part of the molecule. The group may include two aromatic groups, each linked to a part of the molecule and linked between them by an aliphatic chain.

"Aryl" according to the present invention designates an aromatic hydrocarbon group. The term "aryl" includes aralkyl and alkyl-aryl groups. The aromatic hydrocarbon group may be substituted once or more than once notably by a halogen, an -Rz, —OH, —NH2, —NHRz, —NRzR'z, —C(O)—H, —C(O)-Rz, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —SH, —S-Rz, —S—S-Rz, —C(O)—N(H)-Rz, —N(H)—C(O)-Rz group with Rz, R'z, identical or different, representing a $C_1$-$C_{50}$ alkyl radical, or by a functional group chosen from among the functional groups that are polymerisable by radical polymerisation and the boronic ester functions of formula (EB1) or (EB2).

"Alkyl-aryl" according to the present invention designates an alkyl group, as defined above, linked to the rest of the molecule through an aromatic group, as defined above.

"Aralkyl" according to the present invention designates an aryl group, as defined above, linked to the rest of the molecule through an aliphatic group, as defined above.

"Heteroaryl" according to the present invention designates an aryl group in which at least one of the atoms of the aromatic ring is a heteroatom. "Heteroalkyl-aryl" according to the present invention designates an alkyl-aryl group, as defined, substituted by at least one heteroatom. "Heteroaralkyl" according to the present invention designates an aralkyl group, as defined, substituted by at least one heteroatom.

The boronic ester functions present in the polymers and compounds will hereinafter be referred to generically by the formulas (EB1) and (EB2). It is to be understood that the definition of the substituents of the boronic esters may vary independently from one compound to another.

DETAILED DESCRIPTION

Figure 1:
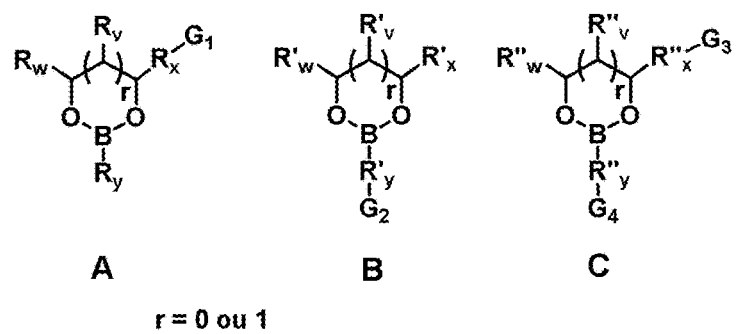
FIG. 1. Representation of the molecules that may be used for the functionalisation and one-step cross-linking of the polymers.

Throughout the description, the term "exchangeable links" implies links that are exchangeable by boronic ester metathesis reactions. These links may be present in the pending links or in cross-links.

The object of the invention is a composition comprising (a) cross-linked polymers containing exchangeable pending links and exchangeable cross-links, by boronic ester metathesis reactions; and (b) free monofunctional boronic esters, said boronic esters being chosen from among the following dioxaborolane and dioxaborinane rings of formulas (EB1) and (EB2):

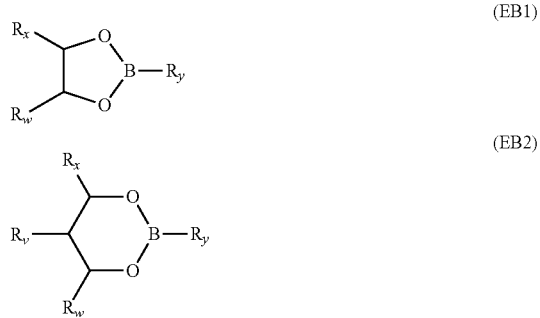

in which
Rx, Rw and Rv are identical or different and each represent a hydrogen atom or a hydrocarbon radical or form together, as a pair, an aliphatic or aromatic ring
Ry is a hydrocarbon radical linked to the boron atom of the dioxaborolane or dioxaborinane ring by a covalent bond through a carbon atom.

This composition may be obtained by cross-linking of linear or branched polymers.

It may also be obtained by copolymerisation of the following compounds:
(a) Precursor monomers to thermoplastic polymers comprising at least one pending boronic ester group, said pending boronic ester group not containing any polymerisable group;
(b) Cross-linking agent comprising at least one boronic ester group enabling the formation of a network of cross-linked polymer containing pending functions and cross-links that are exchangeable by boronic ester metathesis reactions;
said boronic esters being chosen from among the following dioxaborolane and dioxaborinane rings of formulas (EB1) and (EB2):

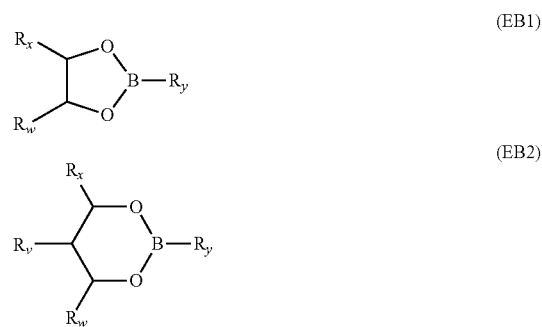

in which
Rx, Rw and Rv are identical or different and each represent a hydrogen atom or a hydrocarbon radical or form together, as a pair, an aliphatic or aromatic ring
Ry is a hydrocarbon radical linked to the boron atom of the dioxaborolane or dioxaborinane ring by a covalent bond through a carbon atom.
(c) possibly monomers that are precursors to thermoplastic polymers that do not include a boronic ester group of formula (EB1) or (EB2).

The expression "said boronic esters" refers to the boronic esters present in the exchangeable pending links, in the exchangeable cross-links and in the free monofunctional boronic esters.

Preferably, independently for each boronic ester group, Rx, Rw and Rv are identical or different and each represents an alkyl, aryl, aralkyl alkyl-aryl or cycloalkyl group. This radical can contain heteroatoms, in particular chosen from among O, N, S or Si, and/or may be substituted. In particular, independently for each boronic ester group, Rx and/or Rw and/or Rv form together, in pairs, an aliphatic or aromatic ring.

In particular, these radicals Rx, Rw and Rv may be substituted by functional groups such as ester or amide functions. In particular, these radicals may be substituted by a halogen, an -Rz, —OH, —NH2, —NHRz, —NRzR'z, —C(O)—H, —C(O)-Rz, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —SH, —S-Rz, —S—S-Rz, —C(O)—N(H)-Rz, —N(H)—C(O)-Rz group with Rz, R'z, identical or different, representing a $C_1$-$C_{50}$ alkyl radical. In particular, these radicals Rx, Rw and Rv may include ester, amide, ether, thioether, secondary or tertiary amine, carbonate, urethane, carbamide or anhydride functions.

In particular, independently for each boronic ester group, Ry represents an alkyl, aryl, aralkyl, alkyl-aryl or cycloalkyl radical. This radical can contain heteroatoms, in particular chosen from among O, N, S or Si, and/or may be substituted. In particular, this radical Ry may be substituted by functional groups such as ester or amide functions. In particular, this radical is substituted by a halogen, an -Rz, —OH, —NH2, —NHRz, —NRzR'z, —C(O)—H, —C(O)-Rz, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —SH, —S-Rz, —S—S-Rz, —C(O)—N(H)-Rz, —N(H)—C(O)-Rz group with Rz, R'z, identical or different, representing a $C_1$-$C_{50}$ alkyl radical. In particular, this radical Ry may include ester, amide, ether, thioether, secondary or tertiary amine, carbonate, urethane, carbamide or anhydride functions.

These boronic ester groups are preferably linked, through Rx and/or Ry, to a polymer chain or to a functional group G enabling covalent linkage of molecules to polymer chains to be functionalised, as defined below. When their substituents {Rx, Rw} or {Rx, Rv} together form and aliphatic or aromatic ring, the boronic ester groups may be linked, through their substituents {Rx, Rw} or {Rx, Rv} and/or Ry, to a polymer chain or to a functional group G enabling covalent linkage of molecules to polymer chains to be functionalised, as defined below.

The compositions according to the invention contain less than 2 mmol, more preferably less than 1.5 mmol, still more preferably less than 1 mmol, still more preferably less than 0.8 mmol, still more preferably less than 0.6 mmol, still more preferably less than 0.4 mmol, still more preferably less than 0.2 mmol, still more preferably less than 0.1 mmol, still more preferably less than 0.05 mmol, still more preferably less than 0.025 mmol, still more preferably less than 0.02 mmol, still more preferably less than 0.01 mmol, still more preferably less than 0.005 mmol of 1,2-diol functions and/or 1,3 diol functions per gram of polymer after cross-linking.

Figure 3:
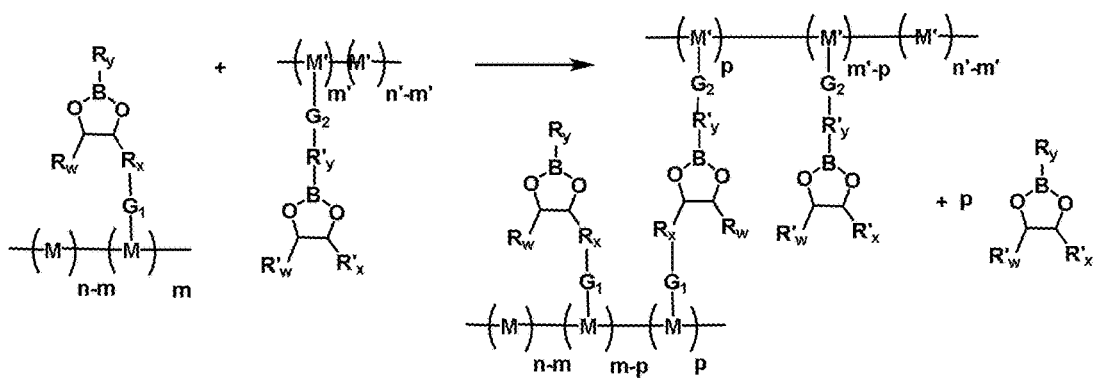
FIG. 3. Schematic representation of cross-linking by a metathesis reaction of linear polymers functionalised by complementary pending dioxaborolane functions.

1. Preparation of the Composition by Cross-Linking of a Polymer:

Preferably, the cross-linking step does not require the use of polymers or additives containing 1,2-diol functions and/or 1,3-diol functions. Cross-linking results, partially or totally, from metathesis reactions between the ester functions on the pending groups of the polymers and/or on the pending groups in the polymers and on compounds of formula (Ia) or (Ib), defined below. In this way, for every cross-linking reaction by metathesis reaction between boronic ester functions, one equivalent of free monofunctional boronic ester is generated, as illustrated in FIG. 3 in the case of cross-linking by a metathesis reaction of linear polymers functionalised by complementary pending dioxaborolane functions. Such a composition preferably forms a network of linear or branched polymers containing pending links and crosslinks that are exchangeable by boronic ester metathesis reactions. Such a composition preferably contains less than 2 mmol, more preferably less than 1.5 mmol, still more preferably less than 1 mmol, still more preferably less than 0.8 mmol, still more preferably less than 0.6 mmol, still more preferably less than 0.4 mmol, still more preferably less than 0.2 mmol, still more preferably less than 0.1 mmol, still more preferably less than 0.05 mmol, still more preferably less than 0.025 mmol, still more preferably less than 0.02 mmol, still more preferably less than 0.01 mmol, still more preferably less than 0.005 mmol of 1,2-diol functions and/or 1,3 diol functions per gram of polymer after cross-linking.

Preferably, the polymers, before cross-linking, are linear or branched polymers having side-groups carrying:
pending boronic ester functional groups of formula (EB1) or (EB2) linked to the polymers by at least one carbon atom of the dioxaborolane or dioxaborinane ring; or
pending boronic ester functional groups of formula (EB1) or (EB2) linked to the polymers by the boron atom of the dioxaborolane or dioxaborinane ring.

These polymers can be functionalised prior to and/or during cross-linking preferably leading to the formation of a network of cross-linked polymers containing pending links and cross-links that are exchangeable by boronic ester metathesis reactions.

The side-groups that are exchangeable by boronic ester metathesis reactions of linear or branched polymers may be distributed along the whole chain in a homogenous or non-homogenous manner or maybe concentrated in one segment of the polymer chain. Preferably, the side-groups that are exchangeable by boronic ester metathesis reactions of linear or branched polymers are distributed along the whole chain in a homogenous or non-homogenous manner. Preferably, the side-groups that are exchangeable by boronic ester metathesis reactions of linear or branched polymers are distributed in a segment or block of the polymer chain. This case is called a diblock structure. Preferably, the side groups that are exchangeable by boronic ester metathesis reactions are randomly distributed all along the polymer chain. Preferably, the polymer has a multiblock structure with blocks containing the side groups that are exchangeable by boronic ester metathesis reactions distributed all along the polymer chain.

The polymers before cross-linking preferably contain less than 4 mmol, more preferably less than 3 mmol, still more preferably less than 2 mmol, still more preferably less than 1.5 mmol, still more preferably less than 1 mmol, still more preferably less than 0.8 mmol, still more preferably less than 0.6 mmol, still more preferably less than 0.5 mmol, still more preferably less than 0.4 mmol, still more preferably less than 0.25 mmol, still more preferably less than 0.2 mmol, still more preferably less than 0.1 mmol, still more preferably less than 0.05 mmol of 1,2-diol functions and/or 1,3 diol functions per gram of polymer.

In a first embodiment, the polymer is functionalised before cross-linking. In particular, the composition results from the mixture, in the molten state or in solution:
Of at least one linear or branched polymer P1 with side-groups carrying:
boronic ester functional groups of formula (EB1) or (EB2) linked to the polymer by at least one carbon atom of the dioxaborolane or dioxaborinane ring; or
boronic ester functional groups of formula (EB1) or (EB2) linked to the polymer by the boron atom of the dioxaborolane or dioxaborinane ring.
Of at least one additive carrying at least two boronic ester groups of formula (EB1) or (EB2) that are capable of reacting with the pending groups of the polymer P1 to form a cross-linked polymer composition, preferably a cross-linked network, containing pending links and cross-links that are exchangeable by boronic ester metathesis reactions.

To enable the formation of a cross-linked polymer composition, preferably a cross-linked polymer network, a cross-linking agent that will not, on its own, react with itself and lose its functionality, is preferably used as an additive. In this way, the cross-linking agent carries:

boronic ester functions of formula (EB1) or (EB2) linked to the agent by at least one carbon atom of the dioxaborolane or dioxaborinane ring; or boronic ester functions of formula (EB1) or (EB2) linked to the agent by the boron atom of the dioxaborolane or dioxaborinane ring.

The additive (the cross-linking agent) may be a molecule and/or a polymer. Combinations of molecules and/or of polymers may be envisaged.

In a first embodiment, the additive is a molecule having at least two boronic ester functions of formula (EB1) or (EB2). This additive is also called a "bi- or multifunctional cross-linking agent". This additive can include boronic ester functions of formula (EB1) or (EB2) all linked to the rest of the molecule by at least one carbon atom of the dioxaborolane or dioxaborinane ring, or boronic ester functions all linked to the rest of the molecule by the boron atom of the dioxaborolane or dioxaborinane ring.

This additive is preferably a compound of formula (Ia), (Ib1) or (Ib2) below:

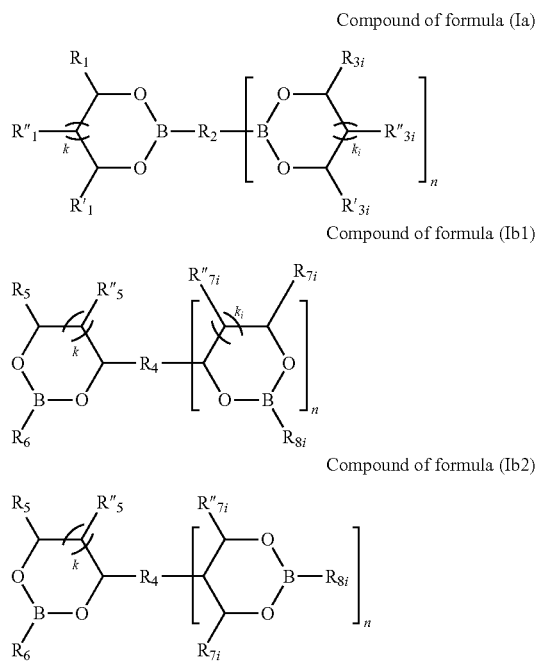

Compound of formula (Ia)

Compound of formula (Ib1)

Compound of formula (Ib2)

in which n is a whole number between 1 and 6;

i is a whole number between 1 and n;

k equals 0 or 1; each ki equals 0 or 1. In this way, the boronic ester functions carried by the compounds of formula (Ia) and (Ib) may be dioxaborolane and/or dioxaborinane functions.

$R_1, R'_1, R''_1, R_{3i}, R'_{3i}, R''_{3i}, R_5, R''_5, R_{7i}, R''_{7i}$, identically or differently, each represent, independently from one another, a hydrogen atom or a hydrocarbon group;

$\{R_1, R'_1, R''_1\}$ can together form, in pairs, an aliphatic or aromatic ring $\{R_{3i}, R'_{3i}, R''_{3i}\}$ can together form, in pairs, an aliphatic or aromatic ring $\{R_5, R''_5\}$ can together form an aliphatic or aromatic ring $\{R_{7i}, R''_{7i}\}$ can together form an aliphatic or aromatic ring $R_2$ and $R_4$, identical or different, each represent a hydrocarbon group $R_2$ is linked to the boronic ester function through a carbon atom $R_6, R_{8i}$, identical or different, each represent, independently of one another, a hydrocarbon group; $R_6$, each $R_{8i}$ is linked to the boron atom by a covalent bond through a carbon atom.

Hereinafter, the terms (Ib) designate either the formula (Ib1) or the formula (Ib2).

$R_2$ and $R_4$, identical or different, can in particular represent a ring, hence allowing the presence of several blocks [boronic ester], possibly on each carbon atom of the ring.

The block [boronic ester] is present n times, depending on the number of substitutions possible on the radicals $R_2$ and $R_4$. The compounds (Ia) and (Ib) can therefore be "star" compounds.

n is a whole number between 1 and 6, preferably between 1 and 4.

i is a whole number between 1 and n.

From one block to another (and likewise for different values of i), the definition of ki, $R_{3i}, R'_{3i}, R''_{3i}, R_{7i}$ and $R''_{7i}$ may vary, which means that the blocks are not necessarily identical to each other.

$R_2$ and $R_4$, identical or different, are each preferably an aliphatic, aromatic, arylaliphatic or cycloaliphatic group that may also contain heteroatoms such as O, N, S, or Si. In a preferred embodiment, $R_2$ and $R_4$, identical or different, each represent an aromatic or heteroaromatic group. Preferably, $R_2$ and $R_4$, identical or different, each represent a $C_1$-$C_{12}$ alkanediyl group, a benzene ring, a naphthalene ring, an arylaliphatic group comprising two benzene rings linked by a $C_1$-$C_6$ alkanediyl group, a pyrimidine ring or a triazine ring.

$R_1, R'_1, R''_1, R_{3i}, R'_{3i}, R''_{3i}, R_5, R''_5, R_{7i}$ and $R''_{7i}$, identical or different, preferably represent a hydrogen atom or an alkyl, alkenyl, aryl, cycloalkyl, heteroaryl, heteroalkyl or heterocycloalkyl group, and each of these groups may be substituted, or $R_1, R'_1, R''_1$, or $R_{3i}, R'_{3i}, R''_{3i}$, or $R_5, R''_5$, or $R_{7i}, R''_{7i}$, together form, in pairs, an aliphatic or aromatic ring.

The use of a compound of formula (Ia) or of a compound of formula (Ib) to obtain a composition comprising cross-linked polymers, preferably a cross-linked network, containing pending links and cross-links that are exchangeable by boronic ester metathesis reactions and free monofunctional boronic esters of formula (EB1) or (EB2) will depend on the nature of the atom through which the pending boronic ester functional groups are linked to the polymer P1.

In this way, when the pending boronic ester groups of formula (EB1) or (EB2) are linked to the polymer P1 by at least one carbon atom of the dioxaborolane or dioxaborinane ring, a compound of formula (Ia) is chosen as the additive.

In this way, when the pending boronic ester groups of formula (EB1) or (EB2) are linked to the polymer P1 by the boron atom of the dioxaborolane or dioxaborinane ring, a compound of formula (Ib) is chosen as the additive.

In a second embodiment, the additive is a polymer P2 carrying:

boronic ester functional groups of formula (EB1) or (EB2) linked to the polymer by at least one carbon atom of the dioxaborolane or dioxaborinane ring; or boronic ester functional groups of formula (EB1) or (EB2) linked to the polymer by the boron atom of the dioxaborolane or dioxaborinane ring.

The choice of nature of the atom through which the pending boronic ester functional groups are linked to the polymer P2 will depend on the nature of the atom through which the pending boronic ester functional groups are linked to the polymer P1.

In this way, when the pending boronic ester groups are linked to the polymer P1 by at least one carbon atom of the dioxaborolane or dioxaborinane ring, a polymer containing pending boronic ester functional groups linked to the polymer P2 by the boron atom of the dioxaborolane or dioxaborinane ring is chosen as the polymer P2.

In this way, when the pending boronic ester groups are linked to the polymer P1 by the boron atom of the dioxaborolane or dioxaborinane ring, a polymer containing pending boronic ester functional groups linked to the polymer P2 by at least one carbon atom of the dioxaborolane or dioxaborinane ring is chosen as the polymer P2.

Hence the invention enables two linear or branched polymers to be assembled by boronic ester metathesis reactions, even if the chemical natures of the polymers are different or incompatible. In this way the invention enables two thermosetting polymers to be assembled. The assembly of a polymer composition according to the invention with a linear or branched polymer P2 may also be envisaged along the same principle. This principle can even be extended to two compositions according to the invention, which can be assembled.

In a second embodiment, the functionalisation and the cross-linking are carried out simultaneously.

In particular, the composition results from the mixture, in the molten state or in solution:
Of at least one linear or branched polymer P1' containing functions enabling grafting,
A combination of molecules of which the molecules comprise at one end a functional group enabling covalent binding of the molecule to the polymer P1' and at the other end a functional group chosen from among a dioxaborolane or dioxaborinane boronic ester function linked to the rest of the molecule by at least one carbon atom of the dioxaborolane or dioxaborinane ring (A), a boronic ester function of formula (EB1) or (EB2) linked to the rest of the molecule by its boron atom of the dioxaborolane or dioxaborinane ring (B), and/or molecules comprising at two of their extremities functional groups enabling covalent binding of the molecule to the polymer P1' and between these two extremities a boronic ester function of formula (EB1) or (EB2) (C), the combination enabling grafting and the creation of pending links and cross-links that are exchangeable by boronic ester metathesis reactions.

In this way, the polymer P1' may be functionalised and cross-linked on addition of the additive. For this, the polymer contains functions enabling grafting, for example in its main chain or on its side/pending groups.

FIG. 1 shows molecules that may be used for the functionalisation and one-step cross-linking of the polymers. The letters $G_1$, $G_2$, $G_3$ and $G_4$ represent a functional group enabling the covalent binding of the molecules to the polymer chain to be functionalised. The functional groups $G_1$, $G_2$, $G_3$ and $G_4$ are chosen as a function of the polymers to be functionalised, the functions enabling grafting to these polymers and the grafting conditions (temperature, reaction medium (molten state or in solution), kinetics, use of a catalyst, etc.). Preferably the groups $G_1$, $G_2$, $G_3$ and $G_4$ are identical.

As non-limiting examples, the functions G may be thiol functions enabling the functionalisation of the alkene bonds of polydienes, such as polybutadiene, polyisoprene and their copolymers, vinyl copolymers with pending alkene groups, or polyolefins obtained by ring-opening metathesis polymerisation (ROMP) or by acyclic diene metathesis (ADMET) (Charles E. Hoyle, Christopher N. Bowman, Angew. Chem. Int. Ed. 2010, 49, 1540-1573; Kemal Arda Günay, Patrick Theato, Harm-Anton Klok, Journal of Polymer Science Part A: Polymer Chemistry 2013, 51, 1-28). The functions G may also be maleimide or methacrylic, acrylic, styrenic or maleic ester functions so as to enable radical grafting to polyethylene and polypropylene for example (G. Moad, Prog. Polym. Sci. 1999, 24, 81-142; Elisa Passagliaa, Serena Coiai, Sylvain Augier, Prog. Polym. Sci. 2009, 34, 911-947). The functions G may be isocyanate functions that will react with the pending alcohol, amine or thiol groups on the polymers to be functionalised (Kemal Arda Günay, Patrick Theato, Harm-Anton Klok, Journal of Polymer Science Part A: Polymer Chemistry 2013, 51, 1-28; Charles E. Hoyle, Andrew B. Lowe, Christopher N. Bowman, Chem. Soc. Rev., 2010, 39, 1355-1387). The functions G may also be electrophilic olefins that can undergo Michael additions with nucleophiles such as thiols, primary or secondary amines or phosphines (Brian D. Mather, Kalpana Viswanathan, Kevin M. Miller, Timothy E. Long, Prog. Polym. Sci. 2006, 31, 487-531). Among the electrophilic olefins, non-limiting examples include acrylates, acrylamides, maleimides, methacrylates and vinylic sulfones. The functions G may also be nucleophilic functions such as alcohols, thiols, amines or carboxylic acids, which can give nucleophilic substitution or ring-opening reactions (Kemal Arda Günay, Patrick Theato, Harm-Anton Klok, Journal of Polymer Science Part A: Polymer Chemistry 2013, 51, 1-28). These functional groups can, for example, open epoxides present in the main chain of the polymers, such as are found in epoxidised natural rubber, or pending epoxide functions such as are found in vinylic copolymers prepared with glycidyl methacrylate. The functions G may also be alcohol, thiol or amine functions that can react with pending ester or activated ester functions to give new ester, thioester or amide functions. This approach can notably be used to functionalise vinylic polymers with pending ester functions, such as for example poly(methyl methacrylate). The functional groups enabling the molecule containing the boronic ester function to be covalently linked to the polymer P1' are therefore numerous and varied, and the person skilled in the art knows how to select the functional group of choice depending on the functions present on the polymer P1' and the grafting conditions (temperature, reaction medium (molten state or in solution), kinetics, use of a catalyst, etc.).

FIG. 1 defines molecules (A), (B) and (C), where the letters $G_1$, $G_2$, $G_3$ and $G_4$ represent a functional group enabling the molecules to be covalently linked to polymer chains to be functionalised, Rx, R"x, and Ry, R'y, R"y are hydrocarbon groups, R'v, R'w and R'x, identical or different, each represent a hydrogen atom or a hydrocarbon radical, or together form, in pairs, an aliphatic or aromatic ring, Rv and Rw, and R"v and R"w, identical or different, represent a hydrogen atom or a hydrocarbon radical, or form an aliphatic or aromatic ring together, or with Rx, respectively or with R"x. The hydrocarbon groups Ry, R'y and R"y are linked to the boron of the dioxaborolane and dioxaborinane ring through a carbon atom. The labels "Rx", "Rw", "Rv"

and "Ry" are used by analogy to the definition of the boronic esters according to the invention, without necessarily being identical.

In particular, Rx, R'x and R"x each represent, independently of one another, an aliphatic, aromatic, arylaliphatic or cycloaliphatic radical. This radical can contain heteroatoms, in particular chosen from among O, N, S or Si, and/or may be substituted.

In particular, Rx, R'x and R"x, independently of one another, may each be substituted by functional groups such as ester or amide functions. In particular, this radical is substituted by a halogen, an -Rz, —OH, —NH2, —NHRz, —NRzR'z, —C(O)—H, —C(O)-Rz, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —SH, —S-Rz, —S—S-Rz, —C(O)—N(H)-Rz, —N(H)—C(O)-Rz group with Rz, R"z, identical or different, representing a $C_1$-$C_{50}$ alkyl radical. In particular, this radical Rx, R'x or R"x may include ester, amide, ether, thioether, secondary or tertiary amine, carbonate, urethane, carbamide or anhydride functions.

In particular, Ry, R'y and R"y each represent, independently of one another, an aliphatic, aromatic, arylaliphatic or cycloaliphatic radical linked to the boron atom of the dioxaborolane or dioxaborinane ring through a carbon atom. This radical Ry, R'y or R"y can contain heteroatoms, in particular chosen from among O, N, S or Si, and/or may be substituted. In particular, this radical Ry, R'y or R"y may be substituted by functional groups such as ester or amide functions. In particular, this radical Ry, R'y or R'y is substituted by a halogen, an -Rz, —OH, —NH2, —NHRz, —NRzR'z, —C(O)—H, —C(O)-Rz, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —SH, —S-Rz, —S—S-Rz, —C(O)—N(H)-Rz, —N(H)—C(O)-Rz group with Rz, R'z, identical or different, representing a $C_1$-$C_{50}$ alkyl radical. In particular, this radical Ry, R'y or R"y may include ester, amide, ether, thioether, secondary or tertiary amine, carbonate, urethane, carbamide or anhydride functions.

Figure 2:
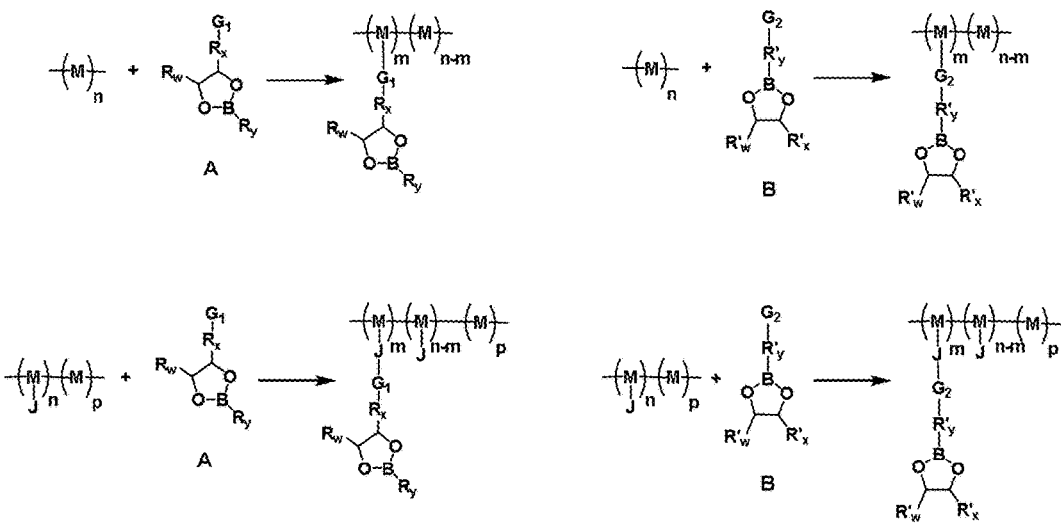
FIG. 2. Schematic representation of the functionalisation of linear polymers by molecule A in the case of a dioxaborolane cyclic boronic ester (left), or molecule B in the case of a dioxaborolane cyclic boronic ester (right), through the creation of covalent bonds between molecule A, or B, and the polymer chains. The functions enabling the grafting of molecules A in the case of a dioxaborolane cyclic boronic ester (left), or molecule B in the case of a dioxaborolane cyclic boronic ester (right), may form part of the main chain (above) or side/pending groups (below) of the main polymer chain to be functionalised.

FIG. 2 schematically shows the functionalisation of linear polymers by molecule A in the case of a dioxaborolane cyclic boronic ester, or B in the case of a dioxaborolane cyclic boronic ester, through the creation of covalent bonds between molecule A, or B, and the polymer chains.

The combinations enabling the one-step cross-linking and functionalisation of polymers are:

A+B: Polymers functionalised with pending boronic ester functions of formula (EB1) or (EB2) attached to the polymer by at least one carbon atom of the dioxaborolane or dioxaborinane ring (A)+polymers functionalised with pending boronic ester functions of formula (EB1) or (EB2) attached to the polymer by the boron atom of the dioxaborolane or dioxaborinane ring (B) and cross-linking by boronic ester metathesis reaction, as illustrated in FIG. 3 in the case of dioxaborolane cyclic boronic esters. Metathesis reactions between boronic esters can take place between A and B before these functions graft onto the polymers (which generates a molecule equivalent to molecule C plus a free monofunctional boronic ester).

A+C: Polymers cross-linked by molecule (C)+polymers functionalised with pending boronic ester functions of formula (EB1) or (EB2) attached to the polymer by at least one carbon atom of the dioxaborolane or dioxaborinane ring (A). Metathesis reactions between boronic esters can take place between A and C before these functions graft onto the polymers.

B+C

A+B+C

In summary, any combination in which on average at least two boronic ester functions will be grafted per polymer chain and linked to the main chain by at least one carbon atom of the dioxaborolane or dioxaborinane ring and two boronic ester functions will be grafted per polymer chain and linked to the main chain by the boron atom of the dioxaborolane or dioxaborinane ring.

Other combinations are possible when a compound of formula (Ia) or (Ib), defined above, are used:

A+compound (Ia). In this way, polymers functionalised with pending boronic ester functions of formula (EB1) or (EB2) linked to the main chain by at least one carbon atom of the dioxaborolane or dioxaborinane ring (A) are prepared, then cross-linking is carried out by a boronic ester metathesis reaction between the pending functions and compound (Ia). Metathesis reactions between boronic esters can take place between A and compound (Ia) before these functions graft onto the polymers.

B+compound (Ib)

Again, there must be on average at least two pending exchangeable functions grafted per polymer chain (through A or B). The quantity of compound (Ia) or of compound (Ib) will vary according to its functionality. Nevertheless, it can be said that compounds (Ia) and (Ib) must also supply on average at least two boronic ester functions of formula (EB1) or (EB2) per polymer chain. These functions must be complementary to the functions grafted onto the polymers (through A or B).

In the compositions according to the invention, the polymers include pending boronic ester functions of formula (EB1) or (EB2). They also include boronic ester functions of formula (EB1) or (EB2) in some, preferably all, of their side-chains forming cross-links. This enables an exchange between boronic esters and improves the cross-linking of the polymers. The inventors think that the exchange reactions between boronic esters enables a circulation of cross-links and could explain the thermoplastic behaviour when the composition, in itself, is insoluble like a thermoset.

The compositions also include free monofunctional esters of formula (EB1) or (EB2) formed during the creation of cross-links.

A compound having a single boronic ester function of formula (EB1) or (EB2) may also be added to any of the compositions previously described. This additional compound enables the properties, notably the viscosity, of the polymer compositions to be modulated.

The polymer P1, or P1', and if applicable the polymer P2, is preferably a thermoplastic polymer or a thermosetting polymer.

By the process according to the invention, polymer preparations having the properties of thermosets and thermoplastics may be prepared from any thermoplastic polymer.

The polymer may be chosen from among:
vinylics, in particular polystyrenes, poly(meth)acrylates, poly(meth)acrylamides, polydienes such as polyisoprenes and polybutadienes, poly(vinyl chloride)s, polyfluorinated polymers, poly(vinyl acetate)s, polyvinylpyrrolidone or polyvinylcarbazole,
polyolefins, in particular polyethylene and polypropylene, unsaturated polyolefins,
polyamides,
polysaccharides,
polysiloxanes or silicones.

These polymers may be functionalised to introduce pending boronic ester functionalised side groups of formula (EB1) or (EB2) or to introduce groups or functions enabling grafting. The introduction of these pending boronic ester functionalised side groups can be carried out by various processes known to the person skilled in the art: copolymerisation of polymer-precursor monomers with boronic ester functionalised monomers (the boronic ester functions are not integrated into the main chain of the polymer being formed, but are found on a pending side group), grafting onto a reactive function of the polymer, copolymerisation of polymer-precursor monomers with monomers containing one or more functions that will serve to graft the pending boronic ester functions after formation of the polymer. These functions that will serve to graft the pending boronic ester functions may be functions that are not implicated in the polymerisation reaction or may be functions that are implicated in the polymerisation reaction but that remain unreacted at the end of polymerisation, either because of the stoichiometry/functionality of the monomer mix or because the polymerisation stopped before the complete conversion of all the polymerisable functions. Such processes are known to the person skilled in the art and are notably used in the synthesis of polymers by polycondensation and by polyaddition. For example, the polymer P1 is obtained by copolymerisation, by a radical route or by polycondensation, by polymerisation by coordination, or by polyaddition or by ring-opening of a monomer precursor to a thermoplastic polymer and of a monomer carrying the boronic ester functionalised side group. For example, the polymer P1' is obtained by copolymerisation, by a radical route or by polycondensation, by polymerisation by coordination, or by polyaddition or by ring-opening of a monomer precursor to a thermoplastic polymer and of a monomer carrying the side group enabling the grafting of the molecule containing the boronic ester function. Likewise, the introduction of groups or functions enabling grafting can be carried out by various processes known to the person skilled in the art (Charles E. Hoyle, Christopher N. Bowman, Angew. Chem. Int. Ed. 2010, 49, 1540-1573; Kemal Arda Günay, Patrick Theato, Harm-Anton Klok, Journal of Polymer Science Part A: Polymer Chemistry 2013, 51, 1-28; G. Moad, Prog. Polym. Sci. 1999, 24, 81-142; Elisa Passagliaa, Serena Coiai, Sylvain Augier, Prog. Polym. Sci. 2009, 34, 911-947; Charles E. Hoyle, Andrew B. Lowe, Christopher N. Bowman, Chem. Soc. Rev., 2010, 39, 1355-1387; Brian D. Mather, Kalpana Viswanathan, Kevin M. Miller, Timothy E. Long, Prog. Polym. Sci. 2006, 31, 487-531; T. C. Chung, Prog. Polym. Sci. 2002, 27, 39-85. Chulsung Bae, John F. Hartwig, Hoyong Chung, Nicole K. Harris, Karen A. Switek, Marc A. Hillmyer, Angew. Chem. Int. Ed. 2005, 44, 6410-6413).

As described above, the polymers may be functionalised and cross-linked on addition of the additive.

The number average molar mass, $M_n$, of the linear or branched polymers P1, P1', or P2, i.e. before cross-linking, is preferably between 2000 g/mol and 2500000 g/mol, more preferably between 5000 g/mol and 750000 g/mol and still more preferably between 10000 g/mol and 400000 g/mol.

The dispersity, $Đ = M_w/M_n$, of the linear or branched polymers P1, P1', or P2, i.e before cross-linking, is preferably between 1.01 and 15, more preferably between 1.03 and 10 and still more preferably between 1.05 and 7.5.

In the invention, the molar ratio of [repetition units of polymer P1 or P1' not containing pending boronic ester functions]/[repetition units of polymer P1 or P1' containing pending boronic ester functions] is preferably between 0.01 and 1000, more preferably between 0.1 and 250, and still more preferably between 1 and 100. "Pending boronic ester functions" means here either a boronic ester function or a function that enables the grafting of such a boronic ester function.

The molar ratio [compound of formula (Ia)]/[repetition unit of polymer P1 or P1' containing a pending boronic ester function] is preferably between 5 and 0.001, more preferably between 1 and 0.005, and still more preferably between 0.5 and 0.01. "Pending boronic ester functions" means here either a boronic ester function or a function that enables the grafting of such a boronic ester function.

The molar ratio [compound of formula (Ib)]/[repetition unit of polymer P1 or P1' containing a pending boronic ester function] is preferably between 5 and 0.001, more preferably between 1 and 0.005, and still more preferably between 0.5 and 0.01. "Pending boronic ester functions" means here either a boronic ester function or a function that enables the grafting of such a boronic ester function.

In the invention, the molar ratio of [repetition units of polymer P2 not containing pending boronic ester functions]/[repetition units of polymer P2 containing pending boronic ester functions] is preferably between 0.01 and 1000, more preferably between 0.1 and 250, and still more preferably between 1 and 100.

The molar ratio [repetition unit of polymer P2 containing a pending boronic ester function]/[repetition unit of polymer P1 or P1' containing a pending boronic ester function] is preferably between 2500 and 0.0004, more preferably between 250 and 0.004, and still more preferably between 100 and 0.01. "Pending boronic ester functions" means here either a boronic ester function or a function that enables the grafting of such a boronic ester function.

The physical and chemical properties of the polymers of the invention depend strongly on the compounds used, in particular on the polymers P1 and P1', and if applicable P2.

Nevertheless, starting from a thermoplastic polymer P1 or P1', the compositions according to the invention combine the properties of a thermoplastic polymer with those of a thermoset. In particular, the compositions according to the invention are insoluble like a thermoset but may be recycled and/or reshaped at a temperature higher than the glass transition temperature (Tg) or the melting temperature (Tf) of the polymer P1 or P1', if applicable P2, preferably higher than Tg or Tf+10° C., more preferably higher than Tg or Tf+20° C., still more preferably higher than Tg or Tf+40° C., still more preferably higher than Tg or Tf+80° C., if the glass transition temperature or the melting temperature is lower than 25° C.

2. Preparation of the Composition by Copolymerisation of Monomers:

The object of the invention is a polymer composition comprising a network of cross-linked polymers. Said network is prepared by copolymerisation of the following compounds:
(a) Precursor monomers to thermoplastic polymers comprising at least one pending boronic ester group, said pending boronic ester group not containing any polymerisable group;
(b) Cross-linking agent comprising at least one boronic ester group enabling the formation of a network of cross-linked polymer containing pending functions and cross-links that are exchangeable by boronic ester metathesis reactions;
said boronic esters being chosen from among the following dioxaborolane and dioxaborinane rings of formulas (EB1) and (EB2):

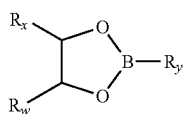
(EB1)

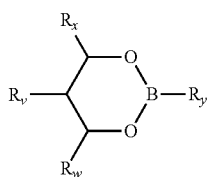
(EB2)

in which
Rx, Rw and Rv are identical or different and each represent a hydrogen atom or a hydrocarbon radical or form together, as a pair, an aliphatic or aromatic ring
Ry is a hydrocarbon radical linked to the boron atom of the dioxaborolane or dioxaborinane ring by a covalent bond through a carbon atom.
(c) if applicable monomers that are precursors to thermoplastic polymers that do not include a boronic ester group of formula (EB1) or (EB2).

The polymerisation is preferably a radical polymerisation, a polymerisation by coordination, a ring-opening polymerisation, a polyaddition or a polycondensation.

Monomer (a):

Monomer (a), which is a boronic ester functional compound, includes at least one pending boronic ester function of formula (EB1) or (EB2) per monomer and carries at least one polymerisable functional group. The pending boronic ester function does not include a polymerisable group.

The expression "monomers comprising at least one pending boronic ester group, said group not containing a polymerisable group" signifies that the pending boronic ester group is of formula (EB1) or (EB2) and that none of Rx, Rw, Rv or Ry carry a polymerisable group other than that or those that constitute the monomer.

The expression "said pending boronic ester group not containing a polymerisable group" implies no group that is polymerisable through the polymerisation mechanism used for the system considered.

The polymerisable functional group is preferably a functional group that is polymerisable by radical polymerisation, by polymerisation by coordination, by ring-opening polymerisation, by polyaddition or by polycondensation. As examples, alcohol, epoxide, carboxylic acid, ester, primary or secondary amine, isocyanate or vinylic functions may be mentioned.

Monomer (a) preferably includes only one or two polymerisable groups. In particular:
monomer (a) includes a single polymerisable group when the group is polymerisable by radical polymerisation, by polymerisation by coordination, or by ring-opening polymerisation
monomer (a) includes only two polymerisable groups when the groups are polymerisable by polyaddition or by polycondensation.

Monomer (a) preferably has the formula (IIa) or (IIb) below:

Compound of formula (IIa)

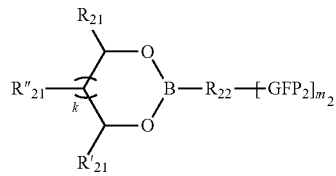

Compound of formula (IIb1)

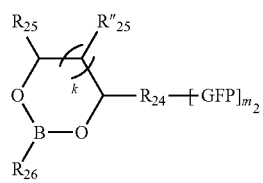

Compound of formula (IIb2)

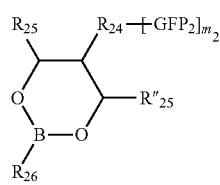

In which
$R_{21}$, $R'_{21}$, $R''_{21}$, $R_{25}$, $R''_{25}$, identical or different, each represent, independently of one another, a hydrogen atom or a hydrocarbon group
$R_{26}$ represents a hydrocarbon group
$R_{22}$ and $R_{24}$, identical or different, each represent a hydrocarbon group $R_{22}$ is linked to the boronic ester function by a covalent bond through a carbon atom
$\{R_{21}, R'_{21}, R''_{21}\}$ can together form, in pairs, an aliphatic or aromatic ring
$\{R_{24}, R_{25}, R''_{25}\}$ can together form, in pairs, an aliphatic or aromatic ring
$R_{26}$ is linked to the boron atom by a covalent bond through a carbon atom
k equals 0 or 1
$GFP_2$ represents a polymerisable functional group as described previously.
$m_2$ equals 1 or 2.

Hereinafter, the terms (IIb) designate either the formula (IIb1) or the formula (IIb2).

Preferably, $m_2$ equals 2 when $GFP_2$ is polymerisable by polyaddition or by polycondensation. Preferably, $m_2$ equals 1 when $GFP_2$ is polymerisable by radical polymerisation, by polymerisation by coordination, or by ring-opening polymerisation None of the radicals $R_{21}$, $R'_{21}$, $R''_{21}$, $R_{22}$, $R_{24}$, $R_{25}$, $R''_{25}$, or $R_{26}$ carries a functional group that is polymerisable by the mode of polymerisation used to polymerise $GFP_2$.

$R_{22}$ and $R_{24}$, identical or different, can in particular represent a ring, hence allowing the presence of several blocks [boronic ester], possibly on each carbon atom of the ring or a hydrocarbon chain enabling the presence of several blocks [boronic ester], possibly on different carbon atoms of the chain.

$R_{22}$ and $R_{24}$, identical or different, are each preferably an aliphatic, aromatic, arylaliphatic or cycloaliphatic group that may also contain heteroatoms such as O, N, S, or Si. In a preferred embodiment, $R_{22}$ and $R_{24}$, identical or different, each represent an aromatic or heteroaromatic group.

Preferably, $R_{22}$ and $R_{24}$, identical or different, each represent a $C_1$-$C_{12}$ alkanediyl group, a benzene ring, a naphthalene ring, an arylaliphatic group comprising two benzene rings linked by a $C_1$-$C_6$ alkanediyl group, a pyrimidine ring or a triazine ring.

In particular, the radical $R_{22}$ or $R_{24}$ can contain heteroatoms, in particular chosen from among O, N, S or Si, and/or may be substituted. In particular, this radical may be substituted by functional groups such as ester or amide functions, on condition that these functional groups are not involved in the polymerisation reactions. In particular, this radical is substituted by a halogen, an -Rz, —OH, —NH2, —NHRz, —NRzR'z, —C(O)—H, —C(O)-Rz, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —SH, —S-Rz, —S—S-Rz, —C(O)—N(H)-Rz, —N(H)—C(O)-Rz group with Rz, R'z, identical or different, representing a $C_1$-$C_{50}$ alkyl radical, insofar as this group is not involved in the polymerisation reactions. In particular, this radical may include ester, amide, ether, thioether, secondary or tertiary amine, carbonate, urethane, carbamide or anhydride functions.

$R_{21}$, $R'_{21}$, $R''_{21}$, $R_{25}$, $R'_{25}$, identical or different, preferably represent a hydrogen atom or an alkyl, alkenyl, aryl, cycloalkyl, heteroaryl, heteroalkyl or heterocycloalkyl group, and each of these groups may be substituted, or $R_{21}$, $R'_{21}$, $R''_{21}$, or $R_{24}$, $R_{25}$, $R''_{25}$, together form, in pairs, an aliphatic or aromatic ring.

As non-limiting examples, seven monomers (a), precursors to thermoplastic polymers comprising at least one pending boronic ester group, are represented below, said pending boronic ester group not containing any polymerisable group in the system considered.

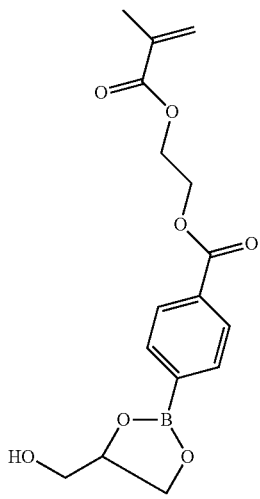

Monomer M1OH

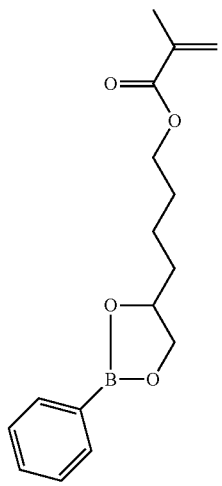

Monomer M3

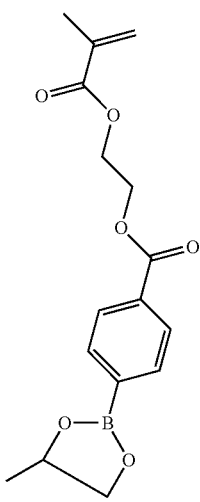

Monomer M1

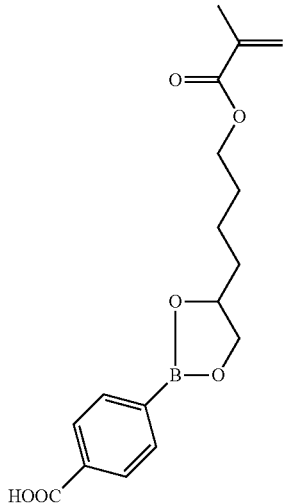

Monomer M3COOH

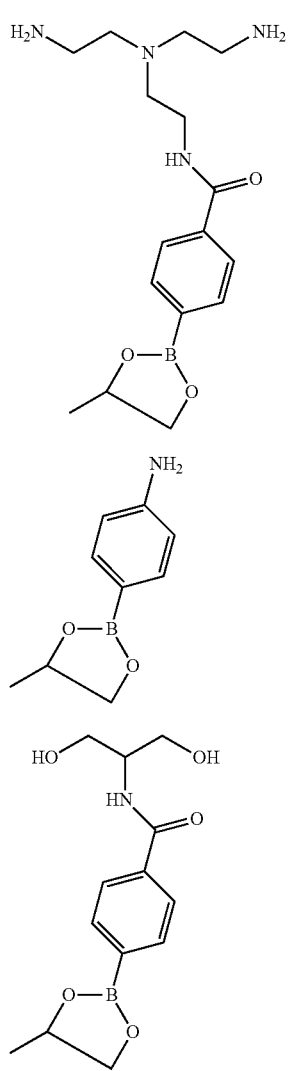

Monomer MX

Monomer MY

Monomer MZ

The monomers M1, M1OH M3 and M3COOH are precursors to polymethacrylates comprising a pending dioxaborolane group, said pending dioxaborolane group not containing a polymerisable group. The polymerisation of these monomers is carried out by radical polymerisation. In this case, the alcohol and carboxylic acid functions respectively carried by the pending dioxaborolane groups of the monomers M1OH and M3COOH are not polymerisable groups, as these functions are not involved in the polymerisation reactions.

The monomer MX is a polyamide precursor comprising a pendant dioxaborolane group linked to the monomer by the boron atom. In this case, the primary amine function is a function that can only give rise to a single condensation reaction. The monomer MY is a precursor to thermoplastic polyepoxide when it is copolymerised with a diepoxide monomer, comprising a pendant dioxaborolane group linked to the monomer by the boron atom. In this case, the primary amine function is a function that can give rise to two condensation reactions on epoxide rings.

The monomer MZ is a polyester and polyurethane precursor comprising a pendant dioxaborolane group linked to the monomer by the boron atom. The synthesis of polyesters is carried out by polycondensation between monomers carrying alcohol functions and for example monomers carrying carboxylic acid or ester function (these functions are not limiting and are not the only functions that can be used for the synthesis of polyesters). The synthesis of polyurethanes is carried out by polyaddition between monomers carrying alcohol functions and monomers carrying isocyanate functions. In these two cases, the alcohol functions are polymerisable groups, as these functions are involved in the polymerisation reactions.

As non-limiting examples, the monomer could be prepared for example by coupling of a reagent carrying one or two polymerisable functional group(s) $GFP_2$ and a halogen with another reagent carrying a boronic ester function and an alcohol function, according to methods known to the person skilled in the art. This monomer could also be prepared for example by coupling of a reagent carrying one or two polymerisable functional group(s) $GFP_2$ and a halogen with another reagent carrying a boronic ester function and a carboxylic acid function, according to methods known to the person skilled in the art.

This monomer could also be prepared for example by coupling of a reagent carrying one or two polymerisable functional group(s) $GFP_2$ and an anhydride function with another reagent carrying a boronic ester function and an alcohol function, according to methods known to the person skilled in the art. This monomer could also be prepared for example by coupling of a reagent carrying one or two polymerisable functional group(s) $GFP_2$ and an anhydride function with another reagent carrying a boronic ester function and a primary amine function, according to methods known to the person skilled in the art.

This monomer could also be prepared for example by coupling of a reagent carrying one or two polymerisable functional group(s) $GFP_2$ and a carboxylic acid or acyl halide function with another reagent carrying a boronic ester function and an alcohol function, according to methods known to the person skilled in the art. This monomer could also be prepared for example by coupling of a reagent carrying one or two polymerisable functional group(s) $GFP_2$ and a carboxylic acid or acyl halide function with another reagent carrying a boronic ester function and a primary amine function, according to methods known to the person skilled in the art.

This monomer could also be prepared for example by coupling of a reagent carrying one or two polymerisable functional group(s) $GFP_2$ and an alcohol function with another reagent carrying a boronic ester function and a carboxylic acid or ester function, according to methods known to the person skilled in the art. This monomer could also be prepared for example by coupling of a reagent carrying one or two polymerisable functional group(s) $GFP_2$ and a primary amine function with another reagent carrying a boronic ester function and a carboxylic acid or ester function, according to methods known to the person skilled in the art.

This monomer could also be prepared for example by coupling of a reagent carrying one or two polymerisable functional group(s) $GFP_2$ and an amine function with another reagent carrying a boronic ester function and an acrylate function, according to methods known to the person skilled in the art.

This monomer could also be prepared for example by coupling of a reagent carrying one or two polymerisable functional group(s) $GFP_2$ and an isocyanate function with another reagent carrying a boronic ester function and an alcohol function, according to methods known to the person skilled in the art.

These initial reagents are commercially available or may be synthesised according to methods known to the person skilled in the art.

Cross-Linking Agent (b):

As for the additive previously described, to enable the formation of a cross-linked polymer network with exchangeable pending links and cross-links, a cross-linking agent that will not, on its own, react with itself and lose its functionality, is preferably used. In this way, the cross-linking agent carries the following pending and/or terminal functions:

boronic ester functions linked by at least one carbon atom of the dioxaborolane or dioxaborinane ring; or boronic ester functions linked by the boron atom of the dioxaborolane or dioxaborinane ring.

A first usable cross-linking agent is a compound comprising at least two boronic ester functions. This first cross-linking agent is called a "bi- or multifunctional cross-linking agent".

The cross-linking agent may also be a monomer or a polymer.

In all these cases, the boron atom of the boronic ester function is linked by a covalent bond through a carbon atom to a hydrocarbon radical.

In a first embodiment, the cross-linking agent is a compound comprising at least two boronic ester functions.

This compound may or may not include a functional group that is polymerisable by the mode of polymerisation of monomers put into play.

The cross-linking agent is preferably a compound of formula (Ia) or (Ib) as described above.

In a particular embodiment, at least one of the radicals $\{R_1, R'_1, R''_1\}$ and at least one of the radicals $\{R_{3i}, R'_{3i}, R''_{3i}\}$ carries at least one functional group that is polymerisable by the mode of polymerisation of monomers put into play or the radical $R_6$ and at least one of the radicals $R_{8i}$ carry at least one functional group polymerisable by the mode of polymerisation of monomers put into play.

The polymerisable functional group is preferably a functional group that is polymerisable by radical polymerisation, by polymerisation by coordination, by ring-opening polymerisation, by polyaddition or by polycondensation. As examples, alcohol, epoxide, carboxylic acid, ester, primary or secondary amine, isocyanate or vinylic functions may be mentioned.

Preferably, when none of the radicals in formula (Ia) or (Ib) carries a polymerisable functional group, then:

When the boronic ester function in monomer (a) is linked by at least one carbon atom of the dioxaborolane or dioxaborinane ring to the polymerisable group, preferably a compound of formula (IIb), then the cross-linking agent is the compound of formula (Ia);

When the boronic ester function in monomer (a) is linked by the boron atom of the dioxaborolane or dioxaborinane ring, preferably a compound of formula (IIa), then the cross-linking agent is the compound of formula (Ib).

In a second embodiment, the cross-linking agent is a polymer.

In this second embodiment, the polymer includes pending boronic ester groups. The polymer carries:

pending boronic ester functional groups of formula (EB1) or (EB2), not containing polymerisable groups, linked to the polymer by at least one carbon atom of the dioxaborolane or dioxaborinane ring; or pending boronic ester functional groups of formula (EB1) or (EB2), not containing polymerisable groups, linked to the polymer by the boron atom of the dioxaborolane or dioxaborinane ring.

The polymeric chain may be any polymer that may be functionalised with pending boronic ester groups.

The use of a polymer as cross-linking agent enables the viscosity of the composition of monomers to be polymerised to be modulated.

The choice of nature of the atom through which the pending boronic ester functional groups are linked to the polymer will depend on the nature of the atom through which the pending boronic ester functional groups are linked to the polymerisable group of monomer (a).

In this way, when the pending boronic ester groups in monomer (a) are linked to the polymerisable group by at least one carbon atom of the dioxaborolane or dioxaborinane ring, preferably a compound of formula (IIb), a polymer containing pending boronic ester functional groups linked to the polymer by the boron atom of the dioxaborolane or dioxaborinane ring is chosen as the polymer.

In this way, when the pending boronic ester groups in monomer (a) are linked to the polymerisable group by the boron atom of the dioxaborolane or dioxaborinane ring, preferably a compound of formula (IIa), a polymer containing pending boronic ester functional groups linked to the polymer by at least one carbon atom of the dioxaborolane or dioxaborinane ring is chosen as the polymer.

In a third embodiment, the cross-linking agent is a monomer that is a boronic ester functional compound, precursor to a thermoplastic polymer or thermoset, comprising at least one boronic ester function per monomer and carrying at least one polymerisable group This monomer can hereinafter be referred to as "monomer (b)".

Monomer (b) preferably includes only one or two polymerisable groups. In particular:

monomer (b) includes a single polymerisable group when the group is polymerisable by radical polymerisation, by polymerisation by coordination, or by ring-opening polymerisation monomer (b) includes only two polymerisable groups when the groups are polymerisable by polyaddition or by polycondensation.

In a first embodiment, the monomer (b) is preferably of formula (IIIa), (IIIb1) or (IIIb2) below:

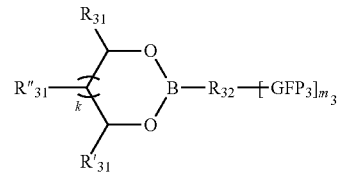

Compound of formula (IIIa)

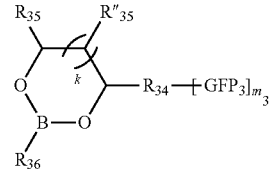

Compound of formula (IIIb1)

-continued

Compound of formula (IIIb2)

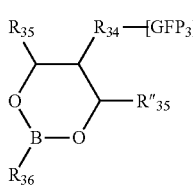

In which $R_{31}$, $R'_{31}$, $R''_{31}$, $R_{35}$, $R''_{35}$, identical or different, each represent, independently of one another, a hydrogen atom or a hydrocarbon group $R_{36}$ represents a hydrocarbon group $R_{32}$ and $R_{34}$, identical or different, each represent a hydrocarbon group $R_{32}$ is linked to the boronic ester function by a covalent bond through a carbon atom $\{R_{31}, R_{35}, R''_{35}\}$ can together form, in pairs, an aliphatic or aromatic ring $\{R_{34}, R_{35}, R''_{35}\}$ can together form, in pairs, an aliphatic or aromatic ring $R_{36}$ is linked to the boron atom by a covalent bond through a carbon atom $R_{32}$ and $R_{34}$, identical or different, are each preferably an aliphatic, aromatic, arylaliphatic or cycloaliphatic group that may also contain heteroatoms such as O, N, S, or Si. In a preferred embodiment, $R_{32}$ and $R_{34}$, identical or different, each represent an aromatic or heteroaromatic group.

k equals 0 or 1

$GFP_3$ represents a polymerisable functional group as described previously.

$m_3$ equals 1 or 2.

Hereinafter, the terms (IIIb) designate either the formula (IIIb1) or the formula (IIIb2).

Preferably, $m_3$ equals 2 when $GFP_3$ is polymerisable by polyaddition or by polycondensation. Preferably, $m_3$ equals 1 when $GFP_3$ is polymerisable by radical polymerisation, by polymerisation by coordination, or by ring-opening polymerisation.

None of the radicals $R_{31}$, $R'_{31}$, $R''_{31}$, $R_{35}$, $R''_{35}$, or $R_{36}$ carries a functional group that is polymerisable by the mode of polymerisation used to polymerise $GFP_3$.

Apart from $GFP_3$, $R_{32}$ and $R_{34}$, do not carry any other functional group that is polymerisable by the mode of polymerisation used to polymerise $GFP_3$.

$R_{32}$ and $R_{34}$, identical or different, can in particular represent a ring, hence allowing the presence of several blocks [boronic ester], possibly on each carbon atom of the ring or a hydrocarbon chain enabling the presence of several blocks [boronic ester], possibly on different carbon atoms of the chain.

$R_{32}$ and $R_{34}$, identical or different, are each preferably an aliphatic, aromatic, arylaliphatic or cycloaliphatic group that may also contain heteroatoms such as O, N, S, or Si. In a preferred embodiment, $R_{32}$ and $R_{34}$, identical or different, each represent an aromatic or heteroaromatic group.

Preferably, $R_{32}$ and $R_{34}$, identical or different, each represent a $C_1$-$C_{12}$ alkanediyl group, a benzene ring, a naphthalene ring, an arylaliphatic group comprising two benzene rings linked by a $C_1$-$C_6$ alkanediyl group, a pyrimidine ring or a triazine ring.

In particular, the radical $R_{32}$ or $R_{34}$ can contain heteroatoms, in particular chosen from among O, N, S or Si, and/or may be substituted. In particular, this radical Ry may be substituted by functional groups such as ester or amide functions, on condition that these functional groups are not involved in the polymerisation reactions. In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical, insofar as this group is not involved in the polymerisation reactions. In particular, this radical may include ester, amide, ether, thioether, secondary or tertiary amine, carbonate, urethane, carbamide or anhydride functions.

$R_{31}$, $R'_{31}$, $R''_{31}$, $R_{35}$, $R'_{35}$, identical or different, preferably represent a hydrogen atom or an alkyl, alkenyl, aryl, cycloalkyl, heteroaryl, heteroalkyl or heterocycloalkyl group, and each of these groups may be substituted, or $R_{31}$, $R'_{31}$, $R''_{31}$, or $R_{34}$, $R_{35}$, $R''_{35}$, together form, in pairs, an aliphatic or aromatic ring.

In a second embodiment, monomer (b) is a compound containing a boronic ester function the boron atom of which is linked to at least one polymerisable group and in which at least one carbon atom of the boronic ester ring is linked to at least one polymerisable group; said groups being polymerisable by the same mechanism as that used to polymerise monomer (a).

When the polymerisation is of the polyaddition/polycondensation type, monomer (b) is a compound containing a boronic ester function the boron atom of which is linked to two polymerisable groups and in which at least one carbon atom of the boronic ester ring is linked to two polymerisable groups. In other types of polymerisation, monomer (b) is a compound containing a boronic ester function the boron atom of which is linked to one polymerisable group and in which at least one carbon atom of the boronic ester ring is linked to one polymerisable group.

Preferably, monomer (b) has the formula (IVa) or (IVb) below:

Compound of formula (IVa)

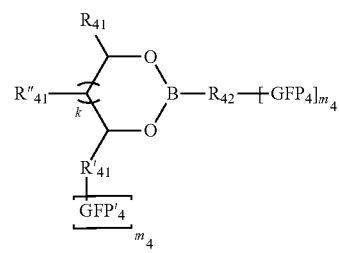

Compound of formula (IVb)

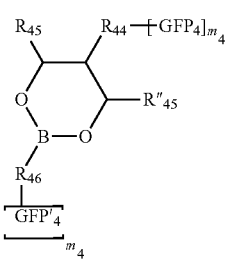

in which $R_{41}$, $R'_{41}$, $R''_{41}$, $R_{45}$, $R''_{45}$, identical or different, each represent, independently of one another, a hydrogen atom or a hydrocarbon group $R_{46}$ represents a hydrocarbon group $R_{42}$, $R'_{42}$ and $R_{44}$, identical or different, each represent a hydrocarbon group $R_{42}$ and $R_{46}$ are each linked to the boronic ester function by a covalent bond through a carbon atom $\{R_{41}, R''_{41}, R'_{42}\}$ can together form, in pairs, an aliphatic or aromatic ring $\{R_{44}, R_{45}, R''_{45}\}$ can together form, in pairs, an aliphatic or aromatic ring $R'_{42}$, $R_{42}$, $R_{44}$ and $R_{46}$, identical or different, are each preferably an aliphatic, aromatic, arylaliphatic or cycloaliphatic group that may also contain heteroatoms such as O, N, S, or Si. In a preferred embodiment, $R''_{42}$, $R_{42}$, $R_{44}$ and $R_{46}$, identical or different, each represent an aromatic or heteroaromatic group k equals 0 or 1

$GFP_4$ and $GFP_4$, identical or different, each represents a polymerisable functional group as described previously.

$m_4$ equals 1 or 2.

Hereinafter, the terms (IV) designate either the formula (IVa) or the formula (IVb).

Preferably, $m_4$ equals 2 when $GFP_4$ and $GFP_4$ are polymerisable by polyaddition or by polycondensation. Preferably, $m_4$ equals 1 when $GFP_4$ and $GFP_4$ are polymerisable by radical polymerisation, by polymerisation by coordination, or by ring-opening polymerisation.

$R_{42}$ et $R_{44}$, $R'_{42}$ and $R_{46}$, identical or different, are each preferably an aliphatic, aromatic, arylaliphatic or cycloaliphatic group that may also contain heteroatoms such as O, N, S, or Si. In a preferred embodiment, $R_{42}$ and $R_{44}$, identical or different, each represent an aromatic or heteroaromatic group.

Preferably, $R_{42}$ and $R_{44}$, $R'_{42}$ and $R_{46}$, identical or different, each represent a $C_1$-$C_{12}$ alkanediyl group, a benzene ring, a naphthalene ring, an arylaliphatic group comprising two benzene rings linked by a $C_1$-$C_6$ alkanediyl group, a pyrimidine ring or a triazine ring.

In particular, the radical $R_{42}$ or $R_{44}$, $R'_{42}$ or $R_{46}$ can contain heteroatoms, in particular chosen from among O, N, S or Si, and/or may be substituted. In particular, this radical Ry may be substituted by functional groups such as ester or amide functions, on condition that these functional groups are not involved in the polymerisation reactions. In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical, insofar as this group is not involved in the polymerisation reactions. In particular, this radical may include ester, amide, ether, thioether, secondary or tertiary amine, carbonate, urethane, carbamide or anhydride functions.

$R_{41}$, $R''_{41}$, $R_{45}$, $R''_{45}$, identical or different, preferably represent a hydrogen atom or an alkyl, alkenyl, aryl, cycloalkyl, heteroaryl, heteroalkyl or heterocycloalkyl group, and each of these groups may be substituted, or $R_{41}$, $R''_{41}$, $R'_{42}$ or $R_{44}$, $R_{45}$, $R''_{45}$, together form, in pairs, an aliphatic or aromatic ring.

In one or other of these embodiments, the polymerisable functional group is preferably a functional group that is polymerisable by radical polymerisation, by polymerisation by coordination, by ring-opening polymerisation, by polyaddition or by polycondensation. As examples, alcohol, epoxide, carboxylic acid, ester, primary or secondary amine, isocyanate or vinylic functions may be mentioned.

In particular, when the polymerisation is conducted in the presence of monomers (a) in which the boronic ester function is linked to the polymerisable group by the boron atom of the dioxaborolane or dioxaborinane ring, preferably of formula (IIa), and of monomers (b) in which the boronic ester function is linked to the polymerisable group by at least one carbon atom of the dioxaborolane or dioxaborinane ring, preferably of formula (IIIb), and respectively in the presence of monomers (a) in which the boronic ester function is linked to the polymerisable group by at least one carbon atom of the dioxaborolane or dioxaborinane ring, preferably of formula (IIb), and of monomers (b) in which the boronic ester function is linked to the polymerisable group by the boron atom of the dioxaborolane or dioxaborinane ring, preferably of formula (IIIa), a cross-linked polymer presenting the desired thermosetting/thermoplastic properties may be obtained. Specifically, the polymer network will contain pending boronic ester functionalised groups, of small size (i.e. that do not form part of the main chain of the polymer), available for exchange reactions. In such a case, the presence of a bi- or multifunctional means of cross-linking, for example of formula (Ia) or (Ib), is optional.

In particular, when the polymerisation is conducted in the presence of monomers (a) in which the boronic ester function is linked to the polymerisable group by the boron atom or by at least one carbon atom of the dioxaborolane or dioxaborinane ring, preferably of formula (IIa) or (IIb), and of monomers (b) of formula (IV), a cross-linked polymer presenting the desired thermosetting/thermoplastic properties may be obtained. Specifically, the polymer network will contain pending boronic ester functionalised groups, of small size (i.e. that do not form part of the main chain of the polymer), available for exchange reactions. In such a case, the presence of a bi- or multifunctional means of cross-linking, for example of formula (Ia) or (Ib), is optional.

The cross-linking agent of the first, second and third embodiments may be used in combination, in particular as pairs, or all three together.

They may be synthesised by known methods, notably by those described for the preparation of monomers (a).

The copolymerisation is preferably carried out in the presence of monomers (c) that are precursors to thermoplastic polymers that do not include a boronic ester group. These monomers are commercially available.

Monomer (c) preferably includes only one or two polymerisable groups. In particular:

monomer (c) includes a single polymerisable group when the group is polymerisable by radical polymerisation, by polymerisation by coordination, or by ring-opening polymerisation monomer (c) includes only two polymerisable groups when the groups are polymerisable by polyaddition or by polycondensation.

By the process according to the invention, polymer preparations having the properties of thermosets and thermoplastics may be prepared from any thermoplastic polymer precursor.

For example, the polymer precursor of interest is chosen from the group comprising styrene and its derivatives, alkyl methacrylates, arylalkyl methacrylates, alkyl acrylates, arylalkyl acrylates, acrylonitrile, acrylamides, methacrylamides, ethylene, fluoroalkyl methacrylates, fluoroalkyl acrylates, halogenated alkenes (tetrafluoroethylene, chlorotrifluoroethylene), alkyl dienes (butadiene, isoprene), vinyl acetate, vinyl chloride, vinylidene fluoride, maleic anhydride, maleimides, N-vinylpyrrolidone, 2-vinylpyridine, 4-vinylpyridine, N-vinylcarbazole and appropriate mixtures. "Appropriate mixtures" designates precursors that are compatible to be copolymerised. This may easily be determined by the person skilled in the art on the basis of his/her general knowledge.

In another example, the polymer precursor of interest is chosen from the group comprising polyols, in particular di-alcohols, primary or secondary polyamines, in particular diamines, dicarboxylic acids, diesters, di- or triepoxides and diisocyanates.

In another example, the polymer precursor of interest is chosen from the group comprising lactones and lactams.

In another example, the polymer precursor of interest is chosen from the group of cyclic alkenes, such as norbornene or cyclooctene.

In another example, the polymer precursor of interest is chosen from the group of olefins, such as ethylene or propylene.

These monomers are commercially available.

It is perfectly conceivable to use several different monomers precursor of polymers of interest. The person skilled in the art knows how to choose compatible monomers.

The polymer of the invention may be prepared by polymerisation:
of monomers (c)
of monomers (a), preferably of formula (IIa) or (IIb)
of a cross-linking agent as defined previously, in particular a compound of formula (Ia) or (Ib) or a monomer (b), preferably of formula (IIIa) or (IIIb) or of formula (IV).

The nature of the compound of formula (I) or (III), and so the choice between the formulas (Ia) or (Ib)/(IIIa) or (IIIb) will depend on the monomer (a) chosen. In this way, preferably, when this monomer is a compound of formula (IIa), the cross-linking agent is of formula (Ib) or (IIIb); and respectively when this monomer is a compound of formula (IIb), the cross-linking agent is of formula (Ia) or (IIIa) The monomer of formula (IV) may be used with any monomer (a).

When the polymerisation is carried out in the presence of these compounds, a cross-linked polymer showing the desired thermosetting/thermoplastic properties may be obtained. The polymer network will contain pending boronic ester functionalised groups of formula (EB1) or (EB2), of small size (i.e. that do not form part of the main chain of the polymer), available for exchange reactions.

The polymers according to the invention include pending boronic ester functions of formula (EB1) or (EB2). The polymers of the invention also include boronic ester functions of formula (EB1) or (EB2) in their side-chains forming cross-links. This enables an exchange between boronic esters and improves the cross-linking of the polymers. The inventors think that the exchange reactions between boronic esters enables a circulation of cross-links and could explain the thermoplastic behaviour when the composition, in itself, is insoluble like a thermoset.

The number and position of the cross-links will vary depending on the compounds used and the relative concentrations of these compounds. For example, the polymer could contain one cross-link for every 1000 monomer units. The number of cross-links in the polymers of the invention may vary from one cross-link for every 5000 units to one cross-link for every 3 units, preferably from one cross-link for every 2000 units to one cross-link for every 6 units, more preferably from one cross-link for every 1000 units to one cross-link for every 20 units, still more preferably from one cross-link for every 500 units to one cross-link for every 80 units.

In the invention, the molar ratio [monomer (c)]:[monomer (a)+compound of formula (Ia) or (Ib)] is preferably between 0.01 and 500, more preferably between 0.1 and 100, still more preferably between 1 and 50.

The molar ratio [monomer (c)]:[monomer (a)+monomer (b)] is preferably between 0.01 and 500, more preferably between 0.1 and 100, still more preferably between 1 and 50.

The molar ratio [compound of formula (Ia) or (Ib)]: [monomer (a)] is preferably between 5 and 0.001, more preferably between 1 and 0.005 and still more preferably between 0.5 and 0.01.

The molar ratio [monomer (a)]:[monomer (b)] is preferably between 500 and 0.002, more preferably between 100 and 0.01 and still more preferably between 40 and 0.025.

Some examples of networks that may be obtained according to the invention will be described. In the case in which the primary amine function can react with two other functions, the primary amine function is equivalent to two polymerisable groups.

The invention enables the preparation of epoxy networks.

These epoxy networks may be obtained by copolymerisation:
of diepoxide, bis(secondary amine) or primary amine monomers (a);
with one or more cross-linking agent as defined previously, in particular
one or more compounds of formula (Ia) or (Ib), which may or may not contain polymerisable groups;
monomers of formula (IIIa) or (IIIb) and/or of formula (IV) that are chosen among diepoxide, bis(secondary amine) or primary amine compounds
preferably also in the presence of one or more diepoxide or bis(secondary amine) monomers (c), more particularly in the presence of diepoxide monomers (c) and bis(secondary amine) monomers (c)
if applicable in the presence of cross-linking agents usually used to form epoxy resins, that is polyamines or polyepoxides that do not include any boronic ester function of formula (EB1) or (EB2).

In an example embodiment, the epoxy networks may be obtained by copolymerisation:
of diepoxide, bis(secondary amine) or primary amine monomers (a);
of compounds of formula (Ia) or (Ib) comprising terminal epoxide groups
and/or of compounds of formula (Ia) or (Ib) comprising terminal primary or secondary amine groups
if applicable, of primary or secondary diamine or triamine monomers (c)
if applicable, of diepoxide or triepoxide monomers (c)
if applicable in the presence of cross-linking agents usually used to form epoxy resins, that is polyamines or polyepoxides that do not include any boronic ester function of formula (EB1) or (EB2).

In another example embodiment, the epoxy networks may be obtained by copolymerisation:
of secondary diamine or triamine or primary amine monomers (c)
of diepoxide or triepoxide monomers (c)
of diepoxide, bis(secondary amine) or primary amine monomers (a)
of diepoxide, bis(secondary amine) or primary amine monomers (b), in particular of formula (IIIa) or (IIIb) and/or of formula (IV), and/or compound of formula (Ia) or (Ib)
if applicable in the presence of cross-linking agents usually used to form epoxy resins, that is polyamines or polyepoxides that do not include any boronic ester function of formula (EB1) or (EB2).

In this way, it is possible, starting from monomers usually used for the manufacture of epoxy resins, and by adding a compatible monomer (a) according to the invention and compatible cross-linking agent as defined, to prepare epoxy networks containing pending links and cross-links that are exchangeable by boronic ester metathesis reactions.

The invention enables the preparation of polyurethane networks.

These polyurethane networks may be obtained by copolymerisation:
- of di-alcohol monomers (a);
- of di-isocyanate monomers (c);
- with one or more cross-linking agent as defined previously, in particular
  - one or more compounds of formula (Ia) or (Ib), which may or may not contain polymerisable groups;
  - monomers of formula (IIIa) or (IIIb) that are chosen among di-isocyanate or di-alcohol compounds
  - monomers of formula (IV) that are chosen among tetra-alcohols
- preferably in the presence of one or more di-alcohol monomers (c)
- if applicable in the presence of cross-linking agents usually used to form polyurethane resins, that is polyols that do not include any boronic ester function of formula (EB1) or (EB2).

In an example embodiment, the polyurethane networks may be obtained by copolymerisation:
- of di-alcohol monomers (a);
- of compounds of formula (Ia) or (Ib) comprising terminal hydroxyl groups
- of di-isocyanate monomers (c)
- if applicable, of di-alcohol monomers (c)
- if applicable in the presence of cross-linking agents usually used to form polyurethane resins, that is polyols that do not include any boronic ester function of formula (EB1) or (EB2).

In another example embodiment, the polyurethane networks may be obtained by copolymerisation:
- of di-alcohol monomers (c)
- of di-isocyanate monomers (c)
- of di-alcohol monomers (a)
- of a diol monomer (b) and/or a compound of formula (Ia) or (Ib) and/or monomers of formula (IV) chosen from among the tetra-alcohols.

In this way, it is possible, starting from monomers usually used for the manufacture of polyurethane resins, and by adding a compatible monomer (a) according to the invention and compatible cross-linking agent as defined, to prepare polyurethane networks containing pending links and cross-links that are exchangeable by boronic ester metathesis reactions.

The invention enables the preparation of polyamide networks.

These polyamide networks may be obtained by copolymerisation:
- of primary diamine or diester or dicarboxylic acid monomers (a);
- of diester or dicarboxylic acid monomers (c);
- of primary diamine monomers (c)
- if applicable, of primary triamine or triester or tricarboxylic acid monomers (c)
- with one or more cross-linking agent as defined previously, in particular
  - one or more compounds of formula (Ia) or (Ib), which may or may not contain polymerisable groups;
  - monomers of formula (IIIa) or (IIIb) that are chosen among primary diamine, diester or dicarboxylic acid compounds
  - monomers of formula (IV) that are chosen among primary tetramines, or tetraesters or tetracarboxylic acids In an example embodiment, the polyamide networks may be obtained by copolymerisation:
- of primary diamine monomers (c)
- of diester monomers (c)
- of primary diamine or diester monomers (a)
- of a primary diamine or diester monomer (b) and/or compound of formula (Ia) or (Ib) and/or monomers (b) of formula (IV) that are chosen among primary tetramines, or tetraesters
- if applicable, of primary triamine or triester monomers (c)

In another example embodiment, the polyamide networks may be obtained by copolymerisation:
- of primary diamine monomers (c)
- of dicarboxylic acid monomers (c)
- of diamine or dicarboxylic acid monomers (a)
- of a primary diamine or dicarboxylic acid monomer (b) and/or compound of formula (Ia) or (Ib) and/or monomers (b) of formula (IV) that are chosen among primary tetramines, or tetracarboxylic acids
- if applicable, of primary triamine or tricarboxylic acid monomers (c)

In this way, it is possible, starting from monomers usually used for the manufacture of polyamide resins, and by adding a compatible monomer (a) according to the invention and compatible cross-linking agent as defined, to prepare polyamide networks containing pending links and cross-links that are exchangeable by boronic ester metathesis reactions.

The invention enables the preparation of polyester networks.

These polyester networks may be obtained by copolymerisation:
- of di-alcohol or diester monomers (a);
- of diester monomers (c);
- of di-alcohol monomers (c)
- if applicable, of tri-alcohol or tetra-alcohol or triester monomers (c)
- with one or more cross-linking agent as defined previously, in particular
  - one or more compounds of formula (Ia) or (Ib), which may or may not contain polymerisable groups;
  - monomers of formula (IIIa) or (IIIb) that are chosen among di-alcohol or diester compounds
  - monomers of formula (IV) that are chosen among tetra-alcohols or tetraesters In an example embodiment, the polyester networks may be obtained by copolymerisation:
- of diol monomers (c)
- of diester monomers (c)
- of diol monomers (a)
- of a di-alcohol or diester monomer (b) and/or compound of formula (Ia) or (Ib) and/or monomers of formula (IV) that are chosen among tetra-alcohols or tetraesters
- if applicable, of tri-alcohol or tetra-alcohol monomers (c)

In another example embodiment, the polyester networks may be obtained by copolymerisation:
- of diol monomers (c)
- of diester monomers (c)
- of diester monomers (a)

of a di-alcohol or diester monomer (b) and/or compound of formula (Ia) or (Ib) and/or monomers of formula (IV) that are chosen among tetra-alcohols or tetraesters if applicable, of tri-alcohol or tetra-alcohol monomers (c)

In this way, it is possible, starting from monomers usually used for the manufacture of polyester resins, and by adding a compatible monomer (a) according to the invention and compatible cross-linking agent as defined, to prepare polyester networks containing pending links and cross-links that are exchangeable by boronic ester metathesis reactions.

The invention enables the preparation of vinylic networks.

These vinylic networks may be obtained by copolymerisation:
of vinylic monomers (a);
of vinylic monomers (c);
with one or more cross-linking agent as defined previously, in particular
one or more compounds of formula (Ia) or (Ib), which may or may not contain polymerisable groups;
monomers of formula (IIIa) or (IIIb) that are chosen among vinylic compounds
monomers of formula (IV) that are chosen among divinylic compounds
if applicable a conventional cross-linking agent, comprising several vinylic bonds and not comprising any boronic ester function of formula (EB1) or (EB2).

In this way, it is possible, starting from monomers usually used for the manufacture of vinylic resins, and by adding a compatible monomer (a) according to the invention and compatible cross-linking agent as defined, to prepare vinylic networks containing pending links and cross-links that are exchangeable by boronic ester metathesis reactions.

The compositions obtained after copolymerisation may include free monofunctional boronic esters, such as defined previously for the compositions obtained by cross-linking of polymers.

The physical and chemical properties of the polymers of the invention depend strongly on the compounds used, in particular on the precursor monomers used.

Nevertheless, starting from a precursor monomer of a thermoplastic polymer, all the polymers combine the properties of a thermoplastic polymer with those of a thermoset. In particular, the polymer is insoluble like a thermoset but may be recycled and/or reshaped at a temperature higher than the glass transition temperature or the melting temperature of the polymer, preferably higher than Tg or Tf+10° C., more preferably higher than Tg or Tf+20° C., still more preferably higher than Tg or Tf+40° C., still more preferably higher than Tg or Tf+80° C., if the glass transition temperature or the melting temperature is lower than 25° C.

The number average molar mass, $M_n$, of the linear or branched polymers obtained after degradation is preferably between 1500 g/mol and 2000000 g/mol, more preferably between 5000 g/mol and 500000 g/mol and still more preferably between 15000 g/mol and 200000 g/mol.

The dispersity, $Đ = M_w/M_n$, of the linear or branched polymers obtained after degradation is preferably between 1.01 and 15, more preferably between 1.10 and 10 and still more preferably between 1.5 and 5.

These compositions include free molecules as defined previously for the compositions obtained by cross-linking of a polymer.

Another object of the invention is a copolymerisation process according to the steps described previously.

The object of the invention is a copolymerisation process of the following compounds:

(a) Precursor monomers to thermoplastic polymers comprising at least one pending boronic ester group, said pending boronic ester group not containing any polymerisable group;
(b) Cross-linking agent comprising at least one boronic ester group enabling the formation of a network of cross-linked polymer containing pending functions and cross-links that are exchangeable by boronic ester metathesis reactions;
said boronic esters being chosen from among the following dioxaborolane and dioxaborinane rings of formulas (EB1) and (EB2):

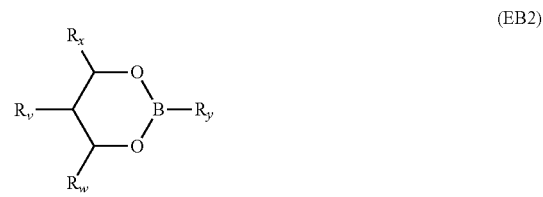

in which
Rx, Rw and Rv are identical or different and each represent a hydrogen atom or a hydrocarbon radical or form together, as a pair, an aliphatic or aromatic ring
Ry is a hydrocarbon radical linked to the boron atom of the dioxaborolane or dioxaborinane ring by a covalent bond through a carbon atom.
(c) if applicable monomers that are precursors to thermoplastic polymers that do not include a boronic ester group of formula (EB1) or (EB2).

The compositions obtained by this process may or may not include free molecules.

The operating conditions for carrying out the polymerisation correspond to the conditions usually used for the thermoplastic monomers considered.

3. Polymers and Compositions According to the Invention

The polymers and compositions according to the invention have the advantage of showing thermosetting and thermoplastic properties. In particular, the compositions according to the invention have at least one, more preferably several, still more preferably all, of the following properties:
thermal stability
three-dimensional network, meaning that the polymer can be as insoluble as a thermoset
polymer offcuts can be reused
reshaping at a temperature higher than the glass transition temperature (Tg) or the melting temperature (Tf), preferably higher than Tg or Tf+10° C., more preferably higher than Tg or Tf+20° C., still more preferably higher than Tg or Tf+40° C., still more preferably higher than Tg or Tf+80° C., if the glass transition temperature or the melting temperature is lower than 25° C.
once cooled, it does not flow more than the reference polymer
increase in chemical resistance
malleable at high temperature
possibility to reshape the polymer of the invention ability to relax all or some of the stresses present in the material objects may be manufactured by injection from these compositions objects may be manufactured by extrusion from these compositions objects may be manufactured by pressure moulding from these compositions objects may be manufactured by thermoshaping from these compositions objects may be manufactured by solvent casting from these compositions objects manufactured with these compositions may be repaired objects manufactured with these compositions may be welded objects manufactured with these compositions may be recycled degradable: degradation of the polymer leads to linear or branched polymer chains that may be reused.

When they are immersed in a solvent, preferably a good solvent, the polymers of the invention, preferably the cross-linked polymer networks of the invention, preferably show the remarkable property that they can be injected, notably through a syringe. When they are in the form of liquid formulations, the cross-linked polymer compositions according to the invention, preferably compositions forming a network of cross-linked linear or branched polymers, preferably show the remarkable property that they can be injected, notably through a syringe. Depending on the degree of cross-linking of the cross-linked linear or branched polymer networks, the cross-linked polymer compositions according to the invention, and likewise when immersed in a good solvent and depending on their degree of cross-linking, the cross-linked polymer networks of the invention, are injectable, notably through a syringe, while forming a network of cross-linked polymers that, when swollen by solvent, preferably a solvent other than water, can support its own weight and will not collapse on the scale of 30 seconds, preferably 1 minute, more preferably 2 minutes, still more preferably 5 minutes, still more preferably 10 minutes, still more preferably 30 minutes, still more preferably 1 hour, still more preferably 2 hours, still more preferably 4 hours, still more preferably 6 hours, still more preferably 8 hours, so more preferably 12 hours, still more preferably 1 day, without application of a strain.

When they are in the form of liquid formulations, preferably in a solvent other than water, the cross-linked linear or branched polymer networks according to the invention preferably show the property of self-agglomeration when they are left in contact.

When they are immersed in a solvent, preferably a good solvent, the cross-linked polymer networks of the invention, preferably show the property of aggregating together when they are left in contact.

The degree of cross-linking:
of the cross-linked polymer compositions according to the invention, preferably the compositions in the form of liquid formulations forming networks of cross-linked linear or branched polymers; or of the cross-linked polymers of the invention, preferably the cross-linked polymer networks of the invention immersed in a good solvent;

may be modulated by addition of free monofunctional boronic esters of formula (EB1) or (EB2) and/or of compounds of formula (Ia), and/or of compounds of formula (Ib), and/or of linear or branched polymers P2. Such a modulation of the cross-linking degree may enable the release of molecules and/or polymers in the formulation containing the cross-linked polymer compositions according to the invention. The following are among the non-limiting examples of molecules or polymers that could be released: active substances, proteins, nucleic acids, amino acids, vitamins, flavours, catalysts, chemical reagents, pigments or other additives. The modulation of the cross-linking degree may be carried further to perform uncrosslinking.

The cross-linked polymers of the invention, preferably the cross-linked polymer networks of the invention, including assembled compositions of the invention, can be uncross-linked, and thus recycled, by addition of a compound (small molecule or polymer) comprising a 1,3- or 1,2-diol function. The compound is preferably a monofunctional 1,3- or 1,2-diol, more preferably mono-substituted. The cross-linked polymers of the invention, preferably the cross-linked polymer networks of the invention, can be uncrosslinked, and thus recycled, using water under pressure, for example in an autoclave. The cross-linked polymers of the invention, preferably the cross-linked polymer networks of the invention, including assembled compositions of the invention, can be uncrosslinked, and thus recycled, by addition of a compound (small molecule or polymer) comprising a boronic ester function. Preferably, the boronic ester function is derived from 1,2- or 1,3-diol. The compound is preferably a monofunctional boronic ester, more preferably mono-Substituted.

When the modulation of the cross-linking degree is carried out to perform uncrosslinking of the cross-linked polymers of the invention, preferably of the cross-linked polymer networks of the invention, including assembled compositions of the invention, the compound used to modulate the cross-linking density, preferably a monofunctional boronic ester, preferably water under pressure, for example in a autoclave, preferably a 1,3- or 1,2-diol, is used in large excess as compared to the boronic ester cross-links present in the cross-linked polymers of the invention, preferably of the cross-linked polymer networks of the invention, including assembled compositions of the invention. By large excess, it should be understood that the molar ratio of [compound used to modulate the cross-linking density in order to perform uncrosslinking]/[cross-links containing boronic ester functions] is preferably greater than 50, more preferably greater than 100, more preferably greater than 150, more preferably greater than 200, more preferably greater than 500, and still more preferably greater than 1000.

The composition according to the invention can also include loads and/or fillers and/or additives. The loads and/or fillers and/or additives are in particular those normally used by the person skilled in the art.

Furthermore, the composition can include, in the mixture or in the network, (an)other compatible polymer(s). The person skilled in the art knows how to choose such a polymer.

The polymer network compositions comprising at least one polymer network whose composition has been described above may also include: one or more polymers, pigments, colourants, blueing agents, fillers, plasticizers, impact modifiers, fibres, flame retardants, antioxidants, lubricants, wood, glass and metal.

Among the polymers that can be mixed with the compositions all polymer networks of the invention, examples include elastomers, thermosets, thermoplastic elastomers and impact-resistant polymers.

The term "pigments" designates coloured particles that are insoluble in composition or in the polymer network among the pigments that may be the invention, titanium dioxide, carbon black, carbon nanotubes, metallic particles, silica, metal oxides, metallic sulfites or any other mineral pigments may be cited. Other pigments that may be mentioned are phthalocyanines, anthraquinones, quinacridones, dioxazines, azo dyes or any other organic pigment and natural pigments (madder, indigo, rose madder, carmine, etc.) and pigment mixtures. The pigments can represent between 0.05% and 70% of the composition of the formulation.

The term "colourants" designates molecules that are soluble in the composition all the polymer network and have the ability to absorb all or some of the visible light rays.

The term "blueing agent" designates a molecule that absorbs ultraviolet light rays and then re-emits this energy by fluorescence in the visible spectrum. Blueing agents are notably used to give a certain whiteness.

Examples of fillers that may be used in the compositions or polymer networks of the invention are: silica, clays, calcium carbonate, carbon black and kaolins.

Examples of fibres that may be used in the compositions or polymer networks of the invention are: glass fibre, carbon fibre, polyester fibre, polyamide fibre, aramide fibre, polyethylene fibre, cellulose fibre and nano-cellulose. Organic fibres (linen, hemp, sisal, bamboo, etc.) may also be envisaged.

The fact that thermally conducting pigments, colourants or fibres may be present in the compositions or polymer networks of the invention may be used to facilitate the heating of an object of obtained from the compositions or polymer networks of the invention and so to enable the manufacture, transformation recycling of an article obtained from these compositions or polymer networks of the invention as described below. As non-limiting examples of thermally conducting pigments, fibres or fillers, the following may be given: aluminium nitride (AlN), boron nitride (BN), MgSiN2, silicon carbide (SiC), graphite, graphene, carbon nanotubes, carbon fibres, metallic powders and stared combinations.

The presence in the compositions or polymer networks of the invention of pigments, colourants or fibres capable of absorbing radiation may be used to ensure the heating of an article obtained from these compositions or polymer networks of the invention by means of a radiation source, for example a laser. The presence in the compositions or polymer networks of the invention of electrically conducting pigments fibres or fillers such as carbon black, carbon nanotubes, carbon fibres, metallic powders, or magnetic particles, may be used to ensure the heating of an article obtained from these compositions or polymer networks of the invention by the Joule effect or by microwaves. Such heating procedures may enable the manufacture, transformation or recycling of an article obtained from the compositions or polymer networks of the invention as described below. Electrically conducting loads also enable electrostatic charges to be evacuated from the material or enable electrostatic painting Another object of the invention is a process for preparation of the compositions according to the invention. This process preferably includes the following steps:
Choosing a linear or branched polymer P1 with side-groups carrying:
boronic ester functional groups of formula (EB1) or (EB2) linked to the polymer by at least one carbon atom of the dioxaborolane or dioxaborinane ring; or
boronic ester functional groups of formula (EB1) or (EB2) linked to the polymer by the boron atom of the dioxaborolane or dioxaborinane ring.

Choosing at least one additive carrying at least two boronic ester groups of formula (EB1) or (EB2) that are capable of reacting with the side groups of the polymer P1 to form a cross-linked polymer composition, preferably a cross-linked network, containing links and cross-links that are exchangeable by boronic ester metathesis reactions.
mixing, in the molten state or in solution, said polymer P1 and said additive to obtain the said composition.

The choice of substitutions and of the additive is made according to the description given above for compositions. A free monofunctional boronic ester of formula (EB1) or (EB2) as described previously may be added.

The process may include a previous step to prepare polymer P1, comprising copolymerisation, for example by radical routes, by polymerisation by coordination, by ring-opening polymerisation, by polyaddition or by polycondensation, of a precursor monomer of P1 and a monomer carrying a boronic ester functional group of formula (EB1) or (EB2).

The process may include a previous step to prepare polymer P1, comprising grafting of pending boronic ester functions of formula (EB1) or (EB2) to a linear or branched polymer.

Another process according to the invention preferably includes the following steps:
choosing at least one linear or branched polymer P1' containing functions enabling grafting,
choosing a combination of molecules of which the molecules comprise at one end a functional group enabling covalent binding of the molecule to the polymer P1' and at the other end a functional group chosen from among a boronic ester function of formula (EB1) or (EB2) linked to the rest of the molecule by at least one carbon atom of the dioxaborolane or dioxaborinane ring (A), a boronic ester function of formula (EB1) or (EB2) linked to the rest of the molecule by its boron atom of the dioxaborolane or dioxaborinane ring (B), and/or molecules comprising at two of their extremities functional groups enabling covalent binding of the molecule to the polymer P1' and between these two extremities a boronic ester function of formula (EB1) or (EB2) (C), the combination enabling grafting and the creation of pending links and cross-links that are exchangeable by boronic ester metathesis reactions.
mixing, in the molten state or in solution, said polymer P1' and said composition to obtain the said composition.

The choice of substitutions and of the composition is made according to the description given above for compositions. A free monofunctional boronic ester of formula (EB1) or (EB2) as described previously may be added.

The process may include a previous step to prepare polymer P1', comprising copolymerisation, for example by radical routes, by polymerisation by coordination, by ring-opening polymerisation, by polyaddition or by polycondensation, of a precursor monomer of P1' and a monomer carrying a functional group enabling subsequent grafting of boronic ester functions.

The process may include a previous step to prepare polymer P1', comprising grafting of pending functions enabling grafting of boronic ester functions to a linear or branched polymer.

Another object of the invention is a process for preparation of the compositions according to the invention. This process includes the copolymerisation of the monomers described under the conditions appropriate to the polymerisable functional groups. The polymerisation is preferably a radical polymerisation, a polymerisation by coordination, a ring-opening polymerisation, a polyaddition or a polycondensation.

Another object of the invention is a material obtained from the composition according to the invention.

Another object of the invention is a preparation process of a material according to the invention, comprising the following steps:
Preparation of a composition according to the invention;
Shaping of the composition obtained therefrom.

The concept of shaping also includes the compounding of the composition in the form of granules or powder, for example in the preparation of finished products. The shaping may also be carried out by processes known to the person skilled in the art for the shaping of thermoplastic or thermosetting polymers. Notably, the processes of moulding, compression, injection, extrusion and thermoforming may be mentioned. Before having the form of the finished object, the material will usually be in the form of granules or powder.

Advantageously in the process according to the invention the preparation and forming steps may be concomitant. In particular, in the processes described above, it is possible to functionalise and cross-link a polymer, for example by extrusion or injection during its shaping or in a compounding step.

Another object of the invention is a process for recycling a material obtained comprising the following successive steps: a) reduction of the material to a powder by mechanical grinding; b) transformation of the particles from step a) by applying a mechanical stress to the particles at a temperature (T) higher than the glass transition temperature (Tg) or the melting temperature (Tf) of the polymer P1 or P1', if applicable P2, preferably higher than Tg or Tf+10° C., more preferably higher than Tg or Tf+20° C., still more preferably higher than Tg or Tf+40° C., still more preferably higher than Tg or Tf+80° C., if the glass transition temperature or the melting temperature is lower than 25° C.

Another object of the invention is a formulation comprising a composition according to the invention.

Another object of the invention is the use of an additive such as defined above, or the combination such as defined above, in the presence of a linear or branched polymer P1 or P1' for the formation of a composition comprising cross-linked polymers, preferably a cross-linked network, containing pending links and cross-links that are exchangeable by boronic ester metathesis reactions. The nature of the additive or the combination is chosen as a function of the polymer P1 or P1', in particular its functionalisation, according to the criteria detailed above.

A free monofunctional boronic ester of formula (EB1) or (EB2) as described previously may also be added to the composition.

Another object of the invention is a process to modify the rheology of a composition, such as an oil or a paint, comprising the said polymer P1 or P1' by addition to the composition of an additive according to the invention or a composition according to the invention. The rheology is modified by choosing the concentration of the said additive or composition.

The nature of the additive or the combination is chosen as a function of the polymer P1 or P1', in particular its functionalisation, according to the criteria detailed above.

A free monofunctional boronic ester of formula (EB1) or (EB2) as described previously may also be added to the composition.

Another object of the invention are combinations to cross-link linear or branched polymers, preferably P1 or P1', said combinations being chosen from among the combinations comprising:

A+B; A and B being as defined previously;

A and/or B+C; A, B and C being as defined previously;

A+compound of formula (Ia), as defined previously; or

B+compound of formula (Ib), as defined previously.

A, B and C are as defined previously.

These combinations can also include a free monofunctional boronic ester of formula (EB1) or (EB2).

EXAMPLES

The following examples illustrate the invention and are not limiting

The following examples illustrate the synthesis and the characterization of boronic ester compounds Example 1: General Procedure for the Synthesis of Boronic Esters, NMR Characterizations

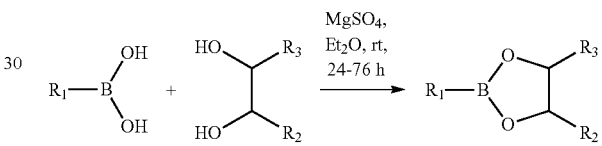

The boronic acid (1 eq.) and the diol (1.01 eq.) are mixed in diethyl ether (ca. 3 mL/1 mmol of the boronic acid). After five minutes, water (0.1 mL/3 mL Et$_2$O) is added. After complete dissolution of all reactants magnesium sulfate (0.5 g/3 mL Et$_2$O) is added gradually and the reaction mixture is stirred at room temperature for 24-76 hours. Then, the reaction mixture is filtered and concentrated under reduced pressure. The obtained product is introduced in heptane and the mixture is stirred at room temperature for ten minutes, filtered and concentrated under reduced pressure to yield the boronic ester as a white solid or transparent oil.

3,5-Dimethylphenylboronic acid 1,2-propanediol ester: MR 02-066

$^1$H NMR (CDCl$_3$, 400 MHz): δ 7.46 (s, 2H), 7.13 (s, 1H), 4.73 (m, 1H), 4.46 (dd, J=8.8 Hz, 1.2 Hz, 1H), 3.90 (dd, J=8.8 Hz, 1.2 Hz, 1H), 2.34 (s, 6H), 1.43 (d, J=6.0 Hz, 3H).

$^{13}$C NMR (CDCl$_3$, 100 MHz): δ 137.2, 133.2, 132.5, 73.72, 72.5, 21.8, 21.2.

MS: (100%) m/z: [M] Calculated for C11H15BO2 190.1165. found 190.07.

3,5-Dimethylphenylboronic acid 1,2-octanediol ester: MR 02-067

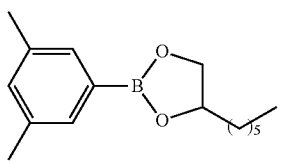

$^1$H NMR (CDCl$_3$, 400 MHz): δ 7.43 (s, 2H), 7.12 (s, 1H), 4.56 (m, 1H), 4.41 (dd, J=8.8 Hz, 1.2 Hz), 3.94 (dd, J=8.8 Hz, 1.2 Hz, 1H), 2.33 (s, 6H), 1.76-1.27 (m, 10H), 0.89 (t, J=6.8 Hz, 3H).

$^{13}$C NMR (CDCl$_3$, 100 MHz): δ 137.2, 133.0, 132.5, 77.5, 71.0, 36.2, 31.9, 28.9, 25.1, 22.5, 21.2, 14.0.

3,5-Dimethylphenylboronic acid 1,2-dodecanediol ester: MR 02-068

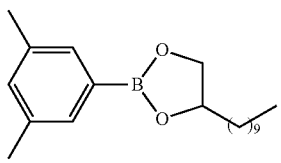

$^1$H NMR (CDCl$_3$, 400 MHz): δ 7.45 (s, 2H), 7.12 (s, 1H), 4.57 (m, 1H), 4.42 (dd, J=8.8 Hz, 1.2 Hz, 1H), 3.94 (dd, J=8.8 Hz, 1.2 Hz, 1H), 2.34 (s, 6H), 1.73-1.28 (m, 18H), 0.90 (t, J=6.8 Hz, 3H).

$^{13}$C NMR (CDCl$_3$, 100 MHz): δ 137.2, 133.1, 132.5, 77.5, 71.7, 36.2, 31.9, 29.7, 29.6, 29.5, 29.4, 24.9, 22.7, 21.2, 14.1.

3,5-Bis(trifluoromethyl)phenylboronic acid 1,2-propanediol ester: MR 02-069

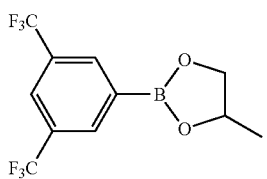 [SMILES: CC1COB(c2cc(C(F)(F)F)cc(C(F)(F)F)c2)O1]

$^1$H NMR (CDCl$_3$, 400 MHz): δ 8.24 (s, 2H), 7.96 (s, 1H), 4.79 (m, 1H), 4.54 (dd, J=8.8 Hz, 1.2 Hz, 1H), 3.95 (dd, J=8.8 Hz, 1.2 Hz, 1H), 1.46 (d, J=6.0 Hz, 3H).

$^{13}$C NMR (CDCl$_3$, 100 MHz): δ 134.7, 124.9, 124.8, 122.1, 74.3, 72.8, 21.6.

3,5-Bis(trifluoromethyl)phenylboronic acid 1,2-hexanediol ester: MR 02-070 et MR 04-007

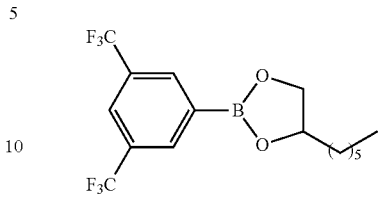

$^1$H NMR (DCCl$_3$, 400 MHz): δ 8.25 (s, 2H), 7.96 (s, 1H), 4.68-4.61 (m, 1H), 4.49 (dd, J=8.8 Hz, 1.2 Hz, 1H), 4.01 (dd, J=8.8 Hz, 1.2 Hz, 1H), 1.81-1.32 (m, 10H), 0.90 (t, J=6.8 Hz, 3H).

$^{13}$C NMR (CDCl$_3$, 100 MHz): δ 134.7, 131.1, 130.8, 124.8, 78.3, 71.6, 36.1, 31.7, 29.0, 25.0, 22.5, 13.9.

3,5-Bis(trifluoromethyl)phenylboronic acid 1,2-dodecanediol ester: MR 02-071

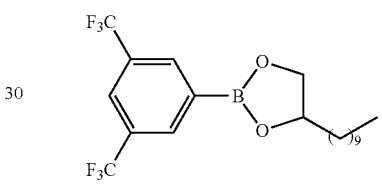

$^1$H NMR (CDCl$_3$, 400 MHz): δ 8.24 (s, 2H), 7.96 (s, 1H), 4.67-4.60 (m, 1H), 4.49 (dd, J=8.8 Hz, 1.2 Hz, 1H), 4.01 (dd, J=8.8 Hz, 1.2 Hz, 1H), 1.80-1.27 (m, 18H), 0.88 (t, J=6.8 Hz, 3H).

$^{13}$C NMR (CDCl$_3$, 100 MHz): δ 134.7, 131.2, 130.8, 124.8, 78.3, 71.6, 36.1, 31.9, 29.6, 29.5, 29.4, 29.3, 29.1, 24.9, 22.7, 14.1.

3,5-Dichlorophenylboronic acid 1,2-propanediol ester: MR 02-072

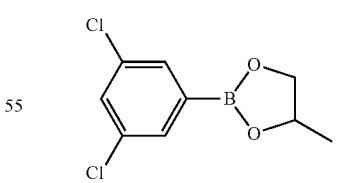

$^1$H NMR (CDCl$_3$, 400 MHz): δ 7.64 (s, 2H), 7.43 (s, 1H), 4.71 (m, 1H), 4.46 (dd, J=8.8 Hz, 1.2 Hz, 1H), 3.88 (dd, J=8.8 Hz, 1.2 Hz, 1H), 1.42 (t, J=6.8 Hz, 3H).

$^{13}$C NMR (CDCl$_3$, 100 MHz): δ 134.8, 132.9, 131.2, 74.0, 72.3, 21.3.

3,5-Dichlorophenylboronic acid 1,2-hexanediol ester: MR 02-073

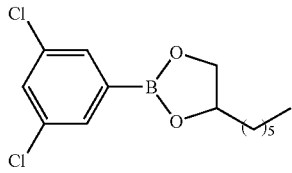

¹H NMR (CDCl₃, 400 MHz): δ 7.65 (d, J=2 Hz, 1H), 7.43 (t, J=2 Hz, 1H), 4.61-4.54 (m, 1H), 4.43 (dd, J=8.8, 1.2 Hz, 1H), 3.95 (dd, J=8.8 Hz, 1.2 Hz), 1.76-1.26 (m, 10H), 0.89 (t, J=6.8 Hz, 3H).

¹³C NMR (CDCl₃, 100 MHz): δ 134.8, 132.8, 131.2, 78.0, 71.5, 36.1, 31.7, 29.2, 25.0, 22.6, 14.1.

MS: (100%) m/z: [M] Calculated for C9H17BO2 168.1322. found [M+] 169.0.

3,5-Dichlorophenylboronic acid 1,2-dodecanediol ester: MR 02-074

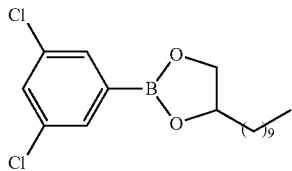

¹H NMR (CDCl₃, 400 MHz): δ 7.65 (d, J=2 Hz, 1H), 7.45 (t, J=2 Hz, 1H), 4.61-4.54 (m, 1H), 4.43 (dd, J=8.8, 1.2 Hz, 1H), 3.95 (dd, J=8.8 Hz, 1.2 Hz), 1.76-1.27 (m, 18H), 0.88 (t, J=6.8 Hz, 3H).

¹³C NMR (CDCl₃, 100 MHz): δ 134.8, 132.8, 131.2, 78.1, 71.5, 36.1, 31.9, 29.6, 29.5, 29.4, 29.3, 29.2, 24.9, 22.7, 14.1.

MS: (100%) m/z: [M] Calculated for C15H31BO2 254.2417. found [M] 254.05.

Phenylboronic acid pinacol ester: MR 03-072

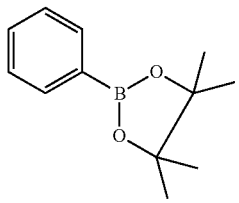

¹H NMR (CDCl₃, 400 MHz): δ 7.85 (m, 2H), 7.45 (m, 3H), 1.38 (m, 12H).

¹³C NMR (CDCl₃, 100 MHz): δ 134.8, 131.2, 127.8, 83.7, 25.0.

Cyclohexylboronic acid 1,2-propanediol ester: MR 03-073

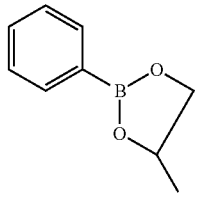

¹H NMR (CDCl₃, 400 MHz): δ 4.48 (m, 1H), 4.23 (m, 1H), 3.66 (m, 1H), 1.69-1.01 (m, 14H).

¹³C NMR (CDCl₃, 100 MHz): δ 73.0, 72.0, 28.1, 27.2, 26.7, 21.6.

Propylboronic acid 1,2-dodecanediol ester: MR 03-074

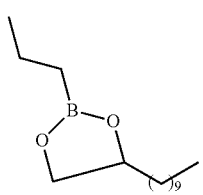

¹H NMR (CDCl₃, 400 MHz): δ 4.34 (m, 1H), 4.21 (m, 1H), 3.74 (m, 1H), 1.68-1.25 (m, 22H), 0.95-0.79 (m, 6H).

¹³C NMR (CDCl₃, 100 MHz): δ 76.8, 70.7, 36.2, 32.0, 29.6, 29.6, 29.5, 29.3, 25.0, 22.6, 17.5, 16.9, 14.0.

3,5-Bis(trifluoromethyl)phenylboronic acid pyrocatechol ester: MR 03-079

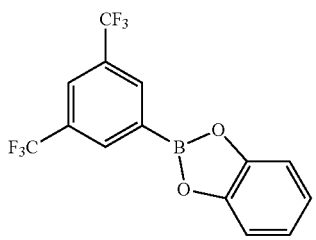 [SMILES: FC(F)(F)c1cc(B2Oc3ccccc3O2)cc(C(F)(F)F)c1]

¹H NMR (CDCl₃, 400 MHz): δ 8.52 (s, 2H), 8.01 (s, 1H), 7.38 (m, 2H), 7.19 (m, 2H).

¹³C NMR (CDCl₃, 100 MHz): δ 148.0, 134.8, 125.8, 124.4, 123.5, 121.9, 113.0.

MS: (100%) m/z: [M] Calculated for C14H7BF6O2 332.0443. found [M] 332.03.

Cyclohexylboronic acid 1,2-propanediol ester: MR 03-081

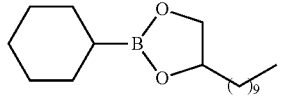

¹H NMR (CDCl₃, 400 MHz): δ 4.32 (m, 1H), 4.18 (t, J=8.4 Hz, 1H), 3.71 (t, J=8.4 Hz, 1H), 1.87-0.98 (m, 29H), 0.85 (t, J=6.8 Hz, 3H).
¹³C NMR (CDCl₃, 100 MHz): δ 76.7, 70.5, 65.8, 36.2, 31.9, 29.6, 29.5, 29.3, 28.0, 27.1, 26.7, 24.9, 22.7, 14.1.

Propylboronic acid 1,2-propanediol ester: MR 03-082

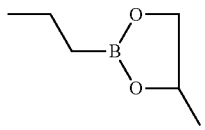

¹H NMR (CDCl₃, 400 MHz): δ 4.48 (m, 1H), 4.22 (t, J=8.4 Hz, 1H), 3.66 (t, J=8.4 Hz, 1H), 1.47-1.16 (m, 4H), 0.91 (t, J=7.2 Hz, 3H), 0.79 (t, J=7.2 Hz, 3H).
¹³C NMR (CDCl₃, 100 MHz): δ 72.9, 72.0, 21.9, 17.5, 16.8.

3,5-Dichlorophenylboronic acid pyrocatechol ester: MR 04-006

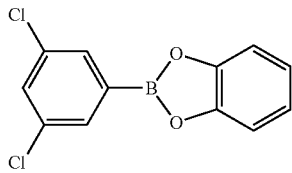 [SMILES: Clc1cc(Cl)cc(B2Oc3ccccc3O2)c1]

¹H NMR (CDCl₃, 400 MHz): δ 7.93 (s, 2H), 7.56 (s, 1H), 7.33 (m, 2H), 7.16 (m, 2H).
¹³C NMR (CDCl₃, 100 MHz): δ 143.4, 132.9, 132.3, 123.3, 121.4, 115.3, 112.9.

3,5-Dimethylphenylboronic acid 1,3-butanediol ester: MR 04-012

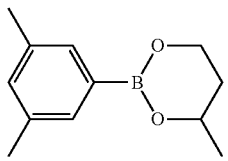

¹H NMR (CDCl₃, 400 MHz): δ 7.41 (s, 2H), 7.05 (s, 1H), 4.28 (m, 1H), 4.19 (m, 1H), 4.10 (m, 1H), 2.3 (s, 6H), 2.02 (m, 1H), 1.81 (m, 1H), 1.37 (d, J=6.4 Hz, 3H).

¹³C NMR (CDCl₃, 100 MHz): δ136.8, 132.2, 131.3, 67.6, 61.1, 34.3, 22.9, 21.3.
MS: (100%) m/z: [M] Calculated pour C₁₂H₁₇BO₂ 204.1322. found [M] 204.10.

4-Fluorophenylboronic acid 1,2-dodecanediol ester: MR X-002

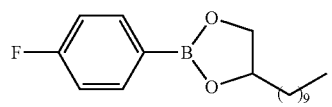

¹H NMR (CDCl₃, 400 MHz): δ 7.83 (d, 2H, J=6.4, 8.8 Hz), 7.08 (dd 2H, J=8.8, 8.8 Hz), 4.58 (ddt, 1H, J=5.6, 7.2, 7.2 Hz), 4.44 (dd, 1H, J=8.0, 8.8 Hz), 3.96 (dd, 1H, J=7.2, 8.8 Hz), 1.27-1.80 (m, 18H), 0.91 (t, 3H J=7.2 Hz).
¹³C NMR (CDCl₃, 100 MHz): δ 164.2, 137.1, 115.0, 77.7, 71.3, 36.2, 31.9, 29.6, 29.6, 29.6, 29.5, 29.4, 25.0, 22.7, 14.1.

4-Fluorophenylboronic acid 1,2-propanediol ester: MR X-010

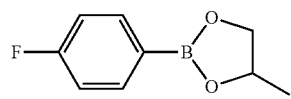

¹H NMR (CDCl₃, 400 MHz): δ 7.82 (dd 2H, J=6.2, 8.7 Hz), 7.05 (dd 2H, J=8.7, 8.8 Hz), 4.72 (ddt, 1H, J=6.4, 7.2, 8.8 Hz), 4.45 (dd, 1H, J=7.8, 8.8 Hz), 3.88 (dd, 1H, J=7.2, 8.8 Hz), 1.41 (d, 3H J=6.0 Hz).
¹³C NMR (CDCl₃, 100 MHz): δ 165.16 (d, 1JCF=249.5 Hz), 137.1 (CH, d 3JCF=8.0 Hz), 115.0 (CH, d, 2JCF=20.1 Hz), 73.9 (CH2), 72.6 (CH), 21.8 (CH3).

Cyclohexylboronic acid 1,3-butanediol ester: MR 04-014

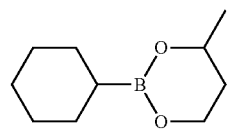

¹H NMR (CDCl₃, 400 MHz): δ 4.17-3.87 (m, 3H), 1.98-1.49 (m, 7H), 1.37-1.14 (m, 8H), 0.78 (t, J=8.8 Hz, 1H).
¹³C NMR (CDCl₃, 100 MHz): δ 67.0, 61.8, 60.9, 28.2, 27.4, 26.9, 23.0.

Phenylboronic acid 1,2-propanediol ester: MR 05-026

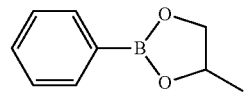

¹H NMR (CDCl₃, 400 MHz): δ 7.84 (d, J=5.6 Hz, 2H), 7.52-7.38 (m, 3H), 4.78-4.68 (m, 1H), 4.64 (dd, J=1.2 Hz, 8.8 Hz, 1H), 3.90 (dd, J=1.6 Hz, 8.8 Hz, 1H), 1.43 (d, J=6.4 Hz, 3H).
¹³C NMR (CDCl₃, 100 MHz): δ 134.7, 131.5, 127.9, 73.7, 72.4, 21.8.

Phenylboronic acid 1,2-butananediol ester: MR 2016a

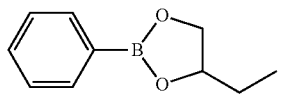

¹H NMR (CDCl₃, 400 MHz): δ 7.84 (d, J=6.4 Hz, 2H), 7.51-7.48 (m, 3H), 4.55 (m, 1H), 4.43 (dd, J=1.2 Hz, 8.8 Hz, 1H), 3.98 (dd, J=2 Hz, 8.8 Hz, 1H), 1.82-1.63 (m, 2H), 1.04 (t, J=7.6 Hz, 3H).
¹³C NMR (CDCl₃, 100 MHz): δ 134.9, 131.4, 127.8, 78.6, 70.8, 29.0, 9.0.

3,5-Dimethylphenylboronic acid 1,2-butanediol ester: MR 2016b

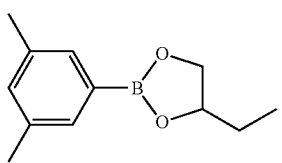

¹H NMR (CDCl₃, 400 MHz): δ 7.45 (s, 2H), 7.12 (s, 1H), 4.94-4.56 (m, 1H), 4.42 (dd, J=0.8 Hz, 8.8 Hz, 1H), 3.96 (dd, J=2.0 Hz, 8.8 Hz, 1H), 2.35 (s, 6H), 1.80-1.62 (m, 2H), 1.02 (t, J=7.6 Hz, 3H).
¹³C NMR (CDCl₃, 100 MHz): δ 137.4, 133.2, 132.9, 78.5, 70.7, 28.8, 20.9, 8.7.

Phenylboronic acid 1,3-butanediol ester: MR 05-033

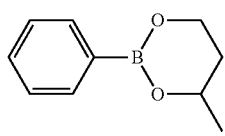

¹H NMR (CDCl₃, 400 MHz): δ 7.83 (d, J=8.0 Hz, 2H), 7.48-7.35 (m, 3H), 4.35-4.10 (m, 3H), 2.04-1.97 (m, 1H), 1.84-1.76 (m, 1H), 1.40 (d, J=6.4 Hz, 3H).
¹³C NMR (CDCl₃, 100 MHz): δ 133.7, 130.4, 127.6, 67.3, 61.4, 34.2, 23.0.

Example 2: Kinetic Study of the Metathesis Reaction of Boronic Esters

The following experiments aim to evaluate the conditions (time, temperature, catalyst) under which boronic ester metathesis is observed. These examples allow to illustrate the influence of substituents linked to the atoms of dioxaborolane or dioxaborinane rings, the size of boronic ester rings, the temperature, the polarity of the reaction medium, the presence of catalysts, on the reaction kinetics of boronic ester metathesis.

A solution of a boronic ester MR-X (0.1 mmol per g of solvent) in the anhydrous solvent chosen for the reaction and a solution of a boronic ester MR-Y (0.1 mmol per g of solvent) in the anhydrous solvent chosen for the reaction are mixed. The resulting solution is stirred at a fixed temperature and the evolution of the concentration of the different components of the mixture is monitored regularly by gas chromatography.

2.1 Metathesis Between Phenylboronic Esters

The examples were conducted in three solvents at 5° C.: anhydrous hexane, anhydrous chloroform and anhydrous tetrahydrofuran.

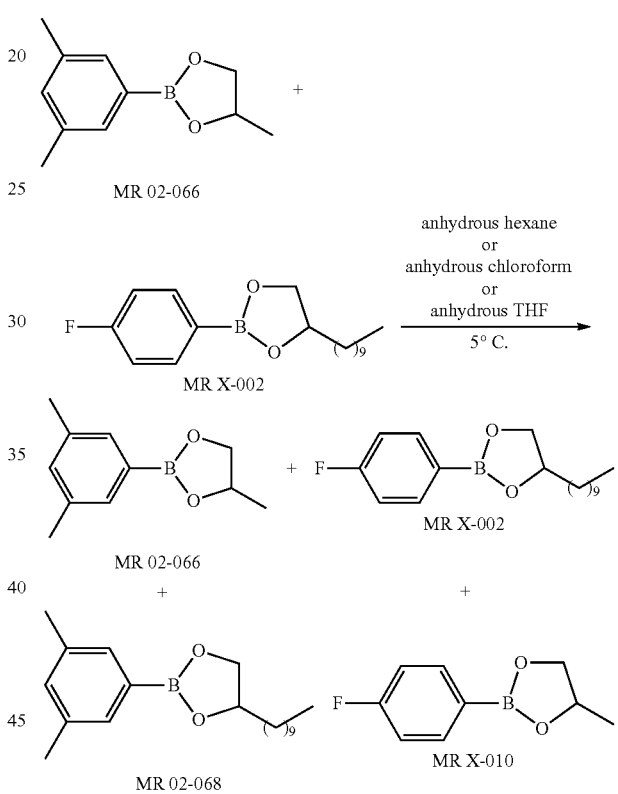

Figure 4:
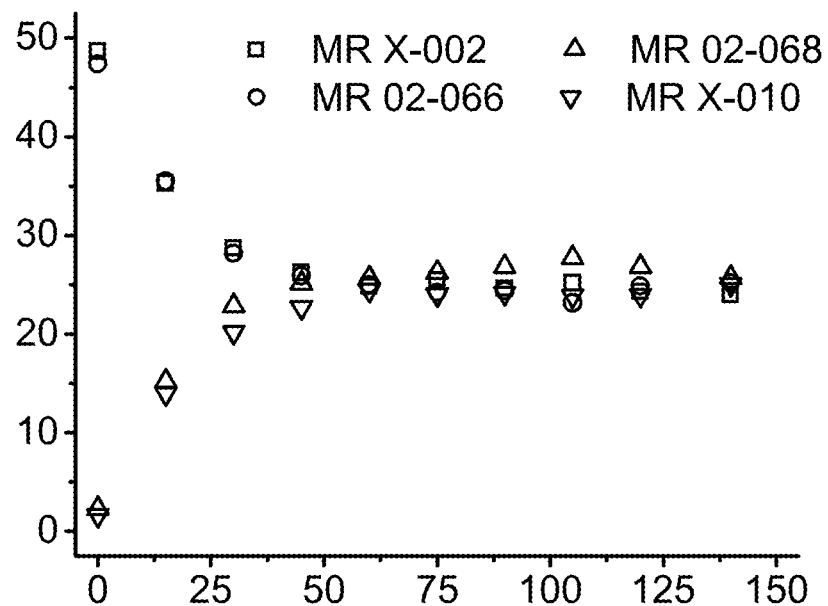
FIG. 4. Evolution of the molar percentage (ordinate; without unit) of the different boronic esters in time (abscissa; minutes) during the metathesis between the two phenylboronic esters in anhydrous hexane at 5° C.

The evolution of the molar percentage (ordinate; without unit) of the different boronic esters in time (abscissa; minutes) during the metathesis between the two phenylboronic esters in anhydrous hexane at 5° C. is displayed in FIG. 4. It is observed that after 50 minutes the mixture contains equimolar quantities of the compounds MR 02-066, MR X-002, MR 02-068, MR X-010.

Figure 5:
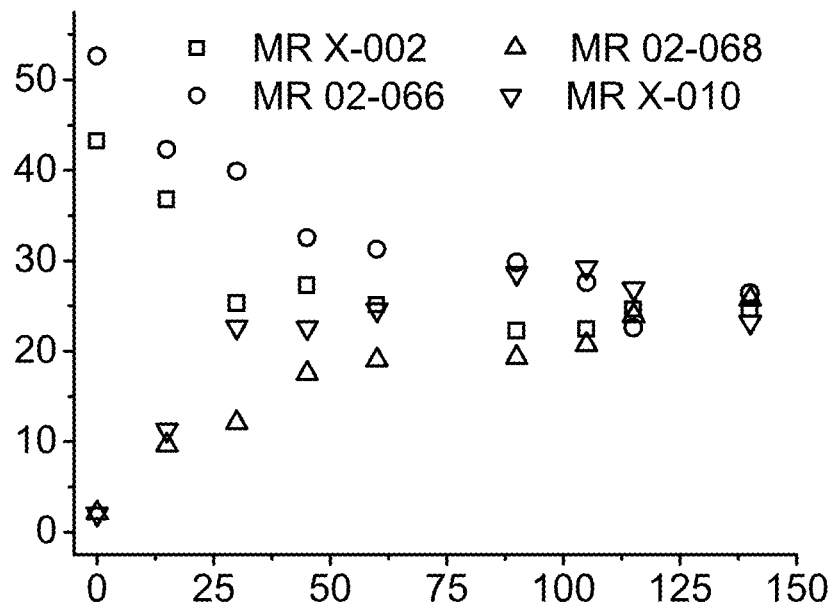
FIG. 5. Evolution of the molar percentage (ordinate; without unit) of the different boronic esters in time (abscissa; minutes) during the metathesis between the two phenylboronic esters in anhydrous chloroform at 5° C.

The evolution of the molar percentage (ordinate; without unit) of the different boronic esters in time (abscissa; minutes) during the metathesis between the two phenylboronic esters in anhydrous chloroform at 5° C. is displayed in FIG. 5. It is observed that after 120 minutes the mixture contains equimolar quantities of the compounds MR 02-066, MR X-002, MR 02-068, MR X-010.

Figure 6:
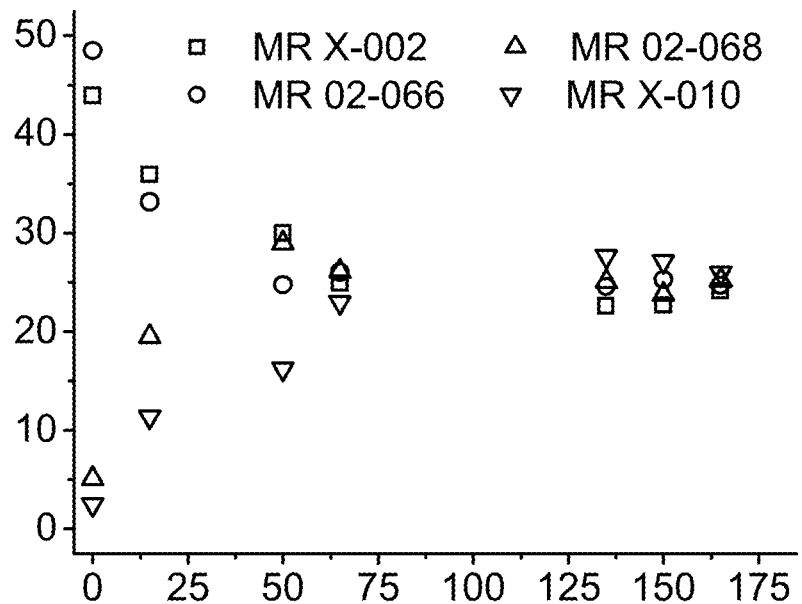
FIG. 6. Evolution of the molar percentage (ordinate; without unit) of the different boronic esters in time (abscissa; minutes) during the metathesis between the two phenylboronic esters in anhydrous tetrahydrofuran at 5° C.

The evolution of the molar percentage (ordinate; without unit) of the different boronic esters in time (abscissa; minutes) during the metathesis between the two phenylboronic esters in anhydrous tetrahydrofuran at 5° C. is displayed in FIG. 6. It is observed that after 175 minutes the mixture contains equimolar quantities of the compounds MR 02-066, MR X-002, MR 02-068, MR X-010.

2.2 Tests in Anhydrous Chloroform at 5° C. to Illustrate the Influence of Substituents Attached to the Aromatic Ring of Phenylboronic Esters; Results to be Compared to Those of FIG. 5.

Figure 7:
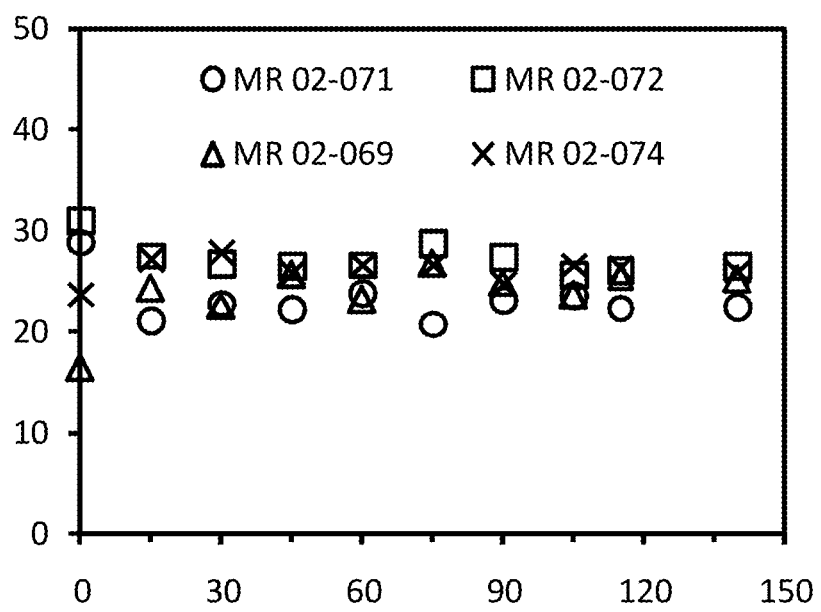
FIG. 7. Evolution of the molar percentage (ordinate; without unit) of the different boronic esters in time (abscissa; minutes) during the metathesis between the two phenylboronic esters in anhydrous chloroform at 5° C.

The evolution of the molar percentage (ordinate; without unit) of the different boronic esters in time (abscissa; minutes) during the metathesis between the two phenylboronic esters in anhydrous chloroform at 5° C. is displayed in FIG. 7.

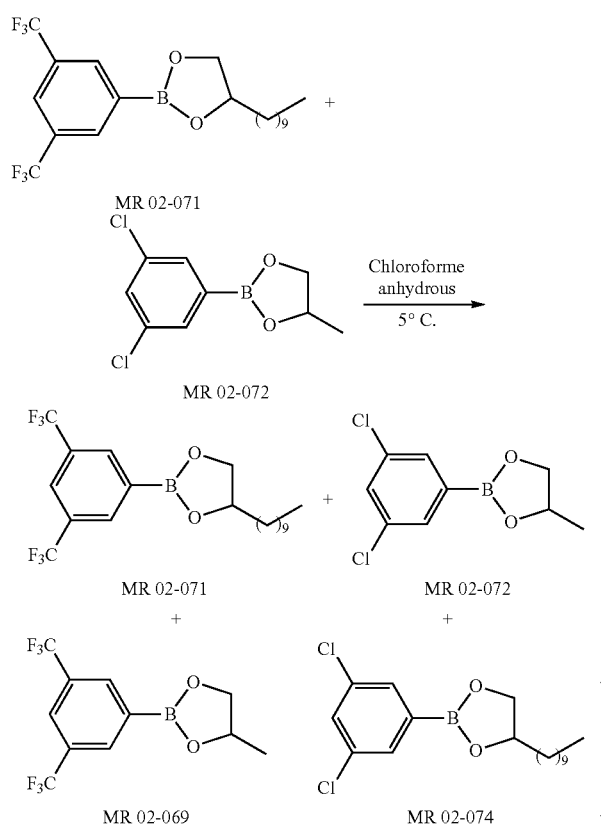

2.3 Metathesis Between Phenylboronic Esters in Anhydrous Tetrahydrofuran at 5° C. in the Presence of Organic Catalysts; Results to be Compared to Those in FIG. 6.

Remark: the catalysts used, e.g. benzoic acid and triethylamine, are anhydrous.

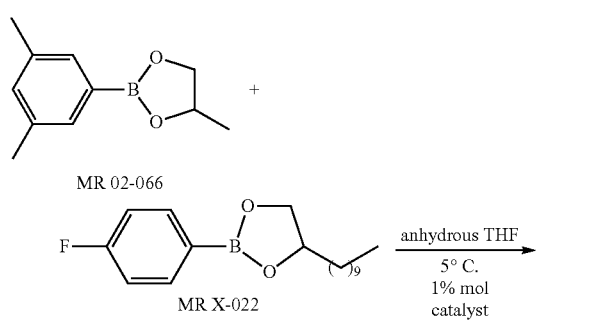

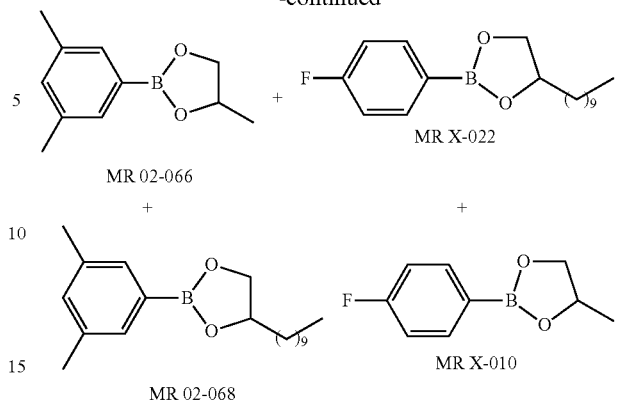

Figure 8:
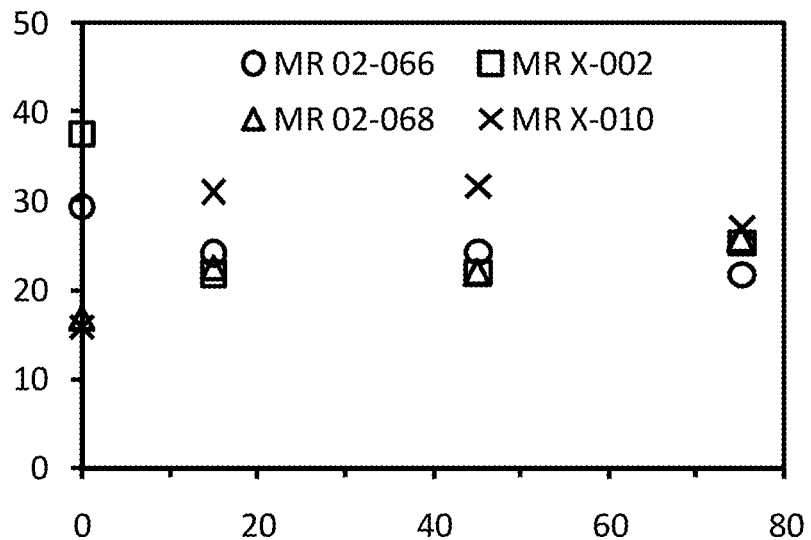
FIG. 8. Evolution of the molar percentage (ordinate; without unit) of the different boronic esters in time (abscissa; minutes) during the metathesis between the two phenylboronic esters in anhydrous tetrahydrofuran at 5° C. in the presence of 1 mol % of anhydrous triethylamine.

The evolution of the molar percentage (ordinate; without unit) of the different boronic esters in time (abscissa; minutes) during the metathesis between the two phenylboronic esters in anhydrous tetrahydrofuran at 5° C. in the presence of 1 mol % of anhydrous triethylamine is displayed in FIG. 8.

Figure 9:
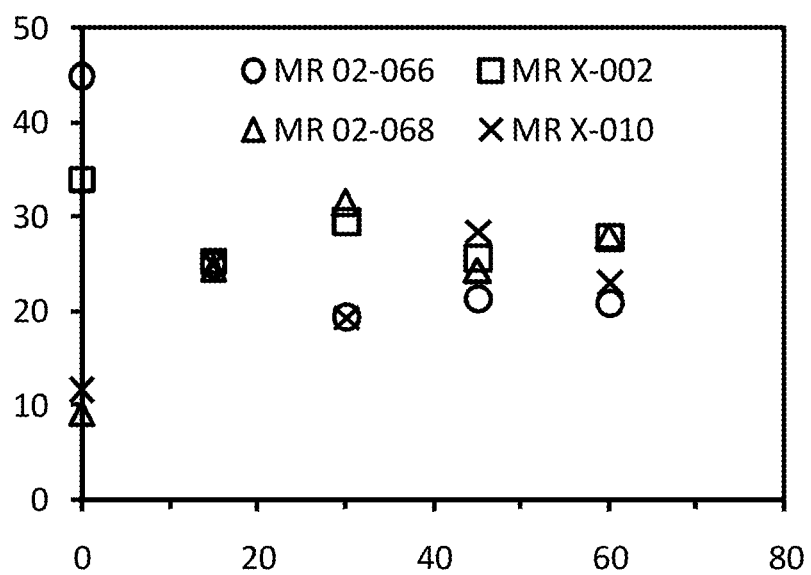
FIG. 9. Evolution of the molar percentage (ordinate; without unit) of the different boronic esters in time (abscissa; minutes) during the metathesis between the two phenylboronic esters in anhydrous tetrahydrofuran at 5° C. in the presence of 1 mol % of anhydrous benzoic acid.

The evolution of the molar percentage (ordinate; without unit) of the different boronic esters in time (abscissa; minutes) during the metathesis between the two phenylboronic esters in anhydrous tetrahydrofuran at 5° C. in the presence of 1 mol % of anhydrous benzoic acid is displayed in FIG. 9.

2.4 Metathesis Between Alkylboronic Esters

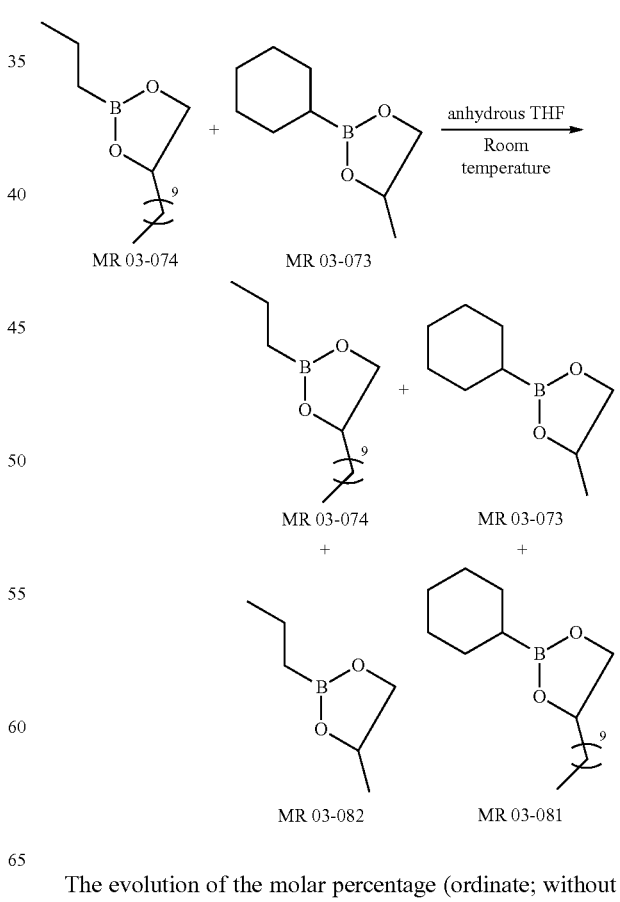

Figure 10:
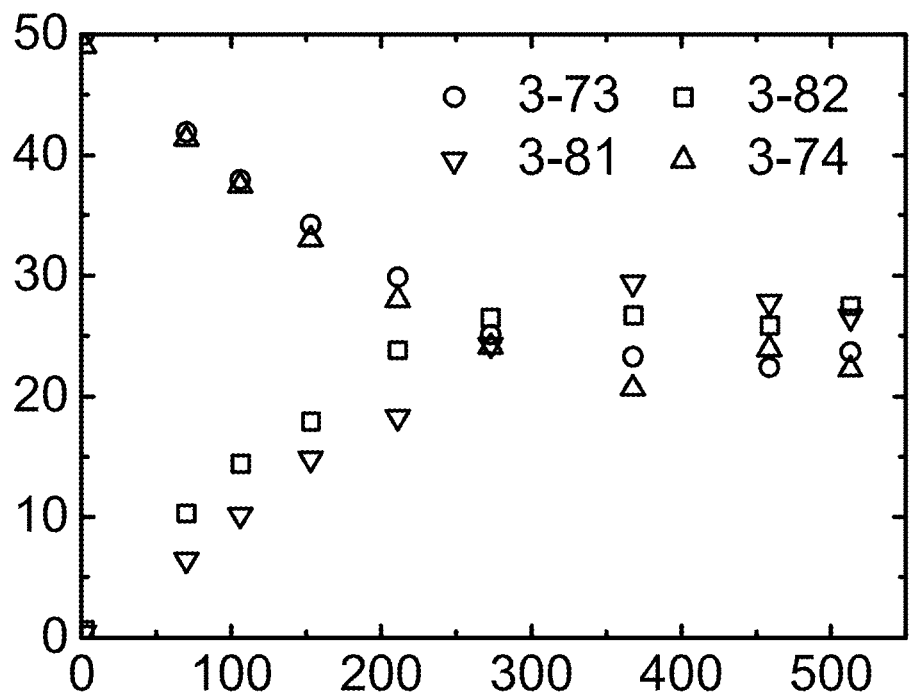
FIG. 10. Evolution of the molar percentage (ordinate; without unit) of the different boronic esters in time (abscissa; minutes) during the metathesis between the two alkylboronic esters in anhydrous tetrahydrofuran at room temperature FIG. 11. Evolution of the molar percentage (ordinate; without unit) of the different boronic esters in time (abscissa; minutes) during the metathesis between boronic esters containing respectively an aryldiol substituent and an alkyldiol substituent in anhydrous tetrahydrofuran at room temperature.

The evolution of the molar percentage (ordinate; without unit) of the different boronic esters in time (abscissa; minutes) during the metathesis between the two alkylboronic esters in anhydrous tetrahydrofuran at room temperature is displayed in FIG. 10.

2.5 Metathesis Between Boronic Esters Containing Respectively an Aryldiol Substituent and an Alkyldiol Substituent

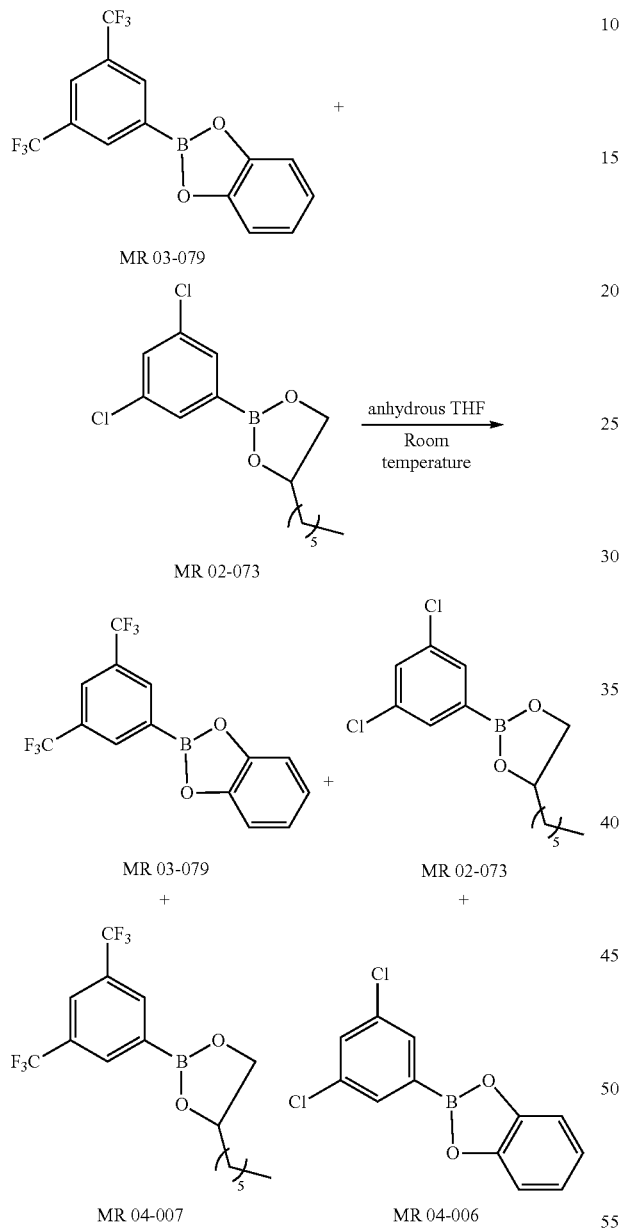

Figure 11:
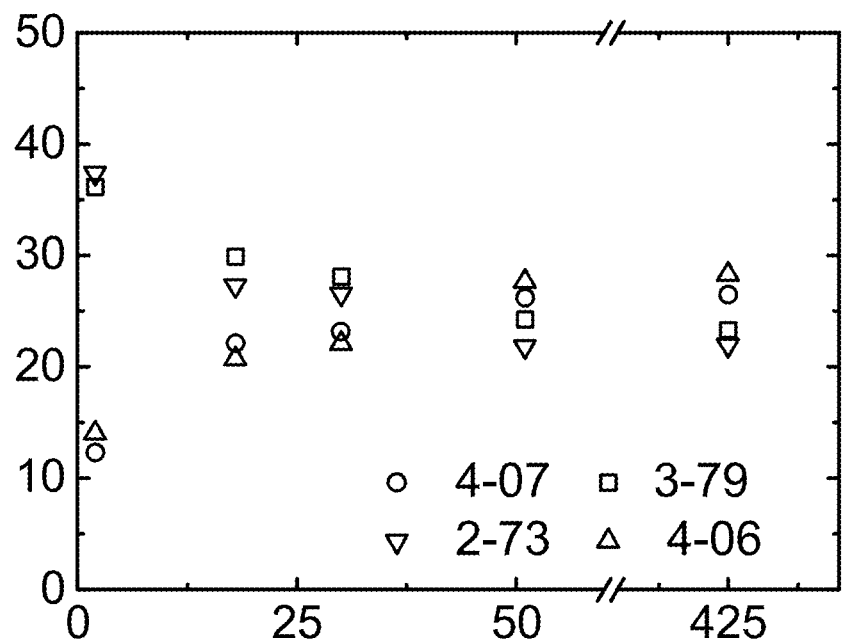

The evolution of the molar percentage (ordinate; without unit) of the different boronic esters in time (abscissa; minutes) during the metathesis between boronic esters containing respectively an aryldiol substituent and an alkyldiol substituent in anhydrous tetrahydrofuran at room temperature is displayed in FIG. 11.

2.6 Metathesis Between Boronic Esters Containing Respectively a 1,2-Alkydiol Substituent and a 1,3-Alkyldiol Substituent

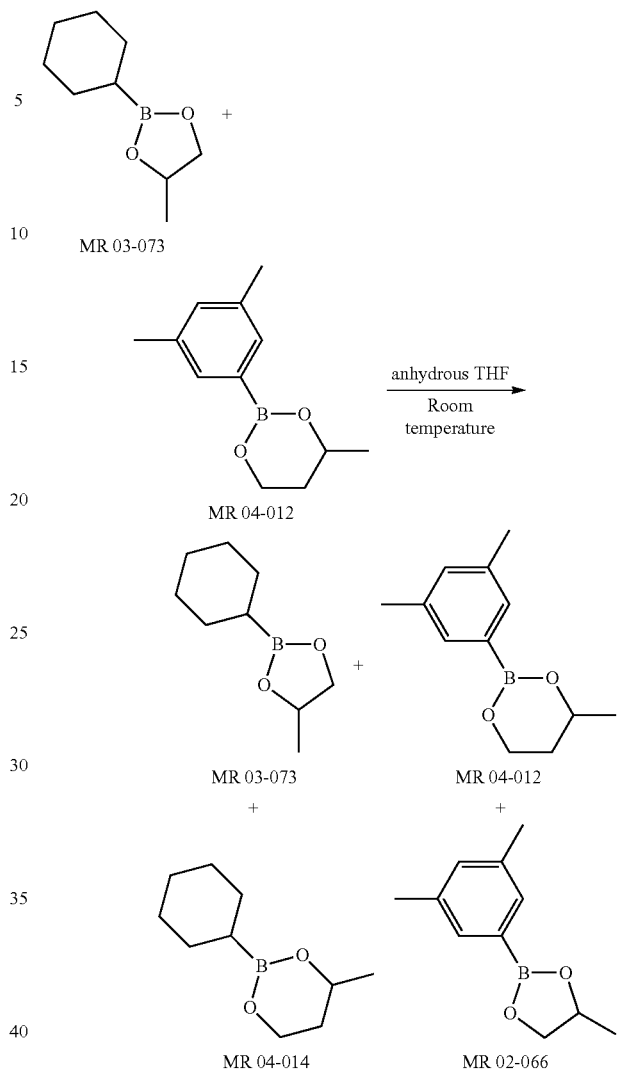

Figure 12:
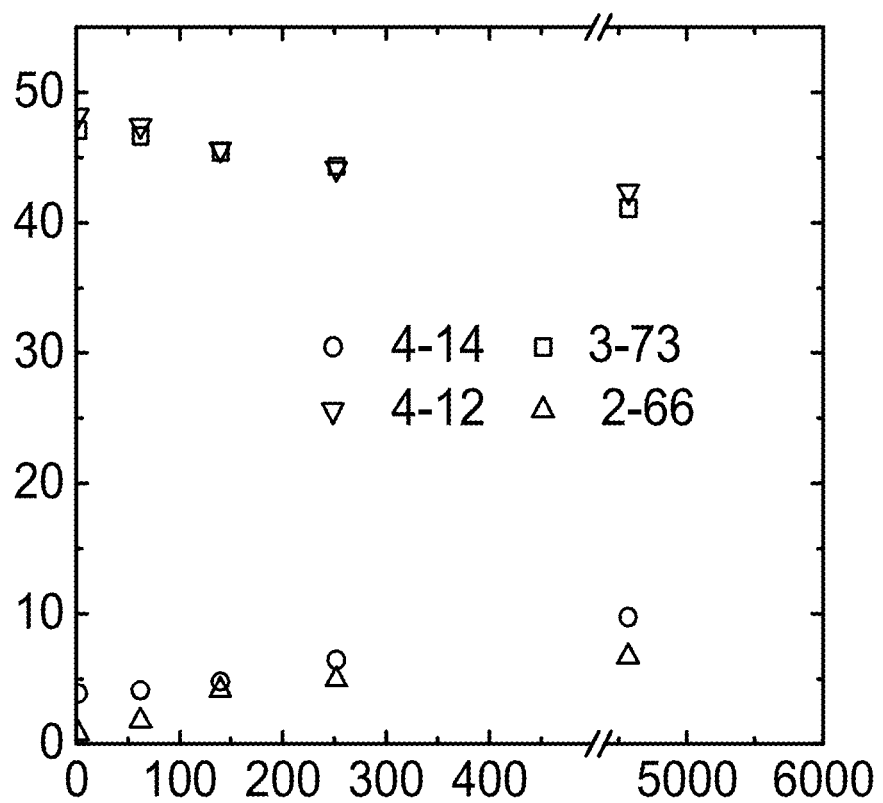
FIG. 12. Evolution of the molar percentage (ordinate; without unit) of the different boronic esters in time (abscissa; minutes) during the metathesis between boronic esters containing respectively a 1,2-alkyldiol substituent and a 1,3-alkyldiol substituent in anhydrous tetrahydrofuran at room temperature.

The evolution of the molar percentage (ordinate; without unit) of the different boronic esters in time (abscissa; minutes) during the metathesis between boronic esters containing respectively a 1,2-alkyldiol substituent and a 1,3-alkyldiol substituent in anhydrous tetrahydrofuran at room temperature is displayed in FIG. 12.

2.7 Metathesis Between Phenylboronic Esters in the Absence of Solvents and at Different Temperatures The following examples illustrate the fact that the metathesis of boronic esters can be conducted in bulk, i.e. in the absence of solvents, and in a large range of temperatures. The bulk metathesis of boronic esters was conducted at three different temperatures: 60° C., 85° C. and 150° C.

General Procedure for the Metathesis Reaction of Boronic Esters in Bulk and Kinetic Study by Gas Chromatography (GC):

Equimolar quantities of MR-2016a and MR-02-066 were mixed in an oven dried and argon-purged Schlenk flask and the reaction mixtures were kept under inert atmosphere and stirred at 60° C., respectively 85° C., respectively 150° C.

GC analysis was conducted on a Shimadzu gas chromatograph GC-2014 equipped with a Zebron-5HT "inferno" column and helium as carrier gas. Injection was done manually by injecting 1 μL sample volumes using a 10 μL syringe from Hamilton (gastight 1701). Before running analysis the entire set-up was pre-heated to 350° C. and kept at constant carrier gas flow of 5 mL/min and split ratio of 2.0 for at least 30 minutes. Samples were analyzed with a flame ionization detector (FID). The following GC method was used to follow of the exchange reaction between boronic esters: T(injection/detector)=350° C., T(column)=120° C., T(ramp)=30° C./min, carrier gas flow 5.0 mL/min and split ratio=2.0. Samples were taken with cleaned, dried and argon-purged needles and added to a small volume of dried DCM (dried, under argon) to dilute each sample mixture before injection.

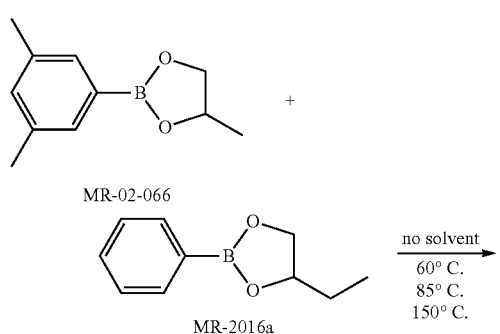

Figure 13:
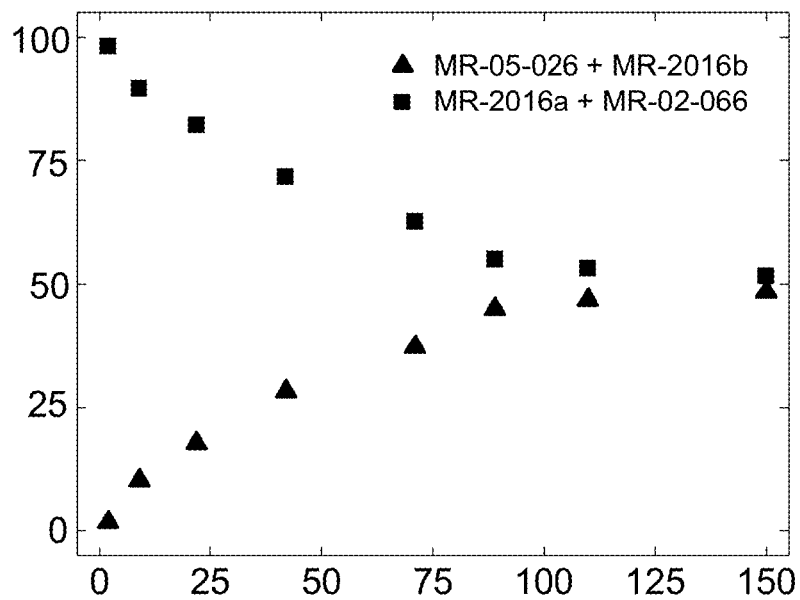
FIG. 13. Evolution of the molar percentage (ordinate; without unit) of the two starting boronic esters and of the two boronic esters formed during the metathesis reaction of phenylboronic esters MR-02-66 and MR-2016a in bulk at 60° C. as a function of time (abscissa; minutes)

The evolution of the molar percentage (ordinate; without unit) of the two starting boronic esters and of the two boronic esters formed during the metathesis reaction of phenylboronic esters MR-02-66 and MR-2016a in bulk at 60° C. is plotted as a function of time (abscissa; minutes) in FIG. 13.

Figure 14:
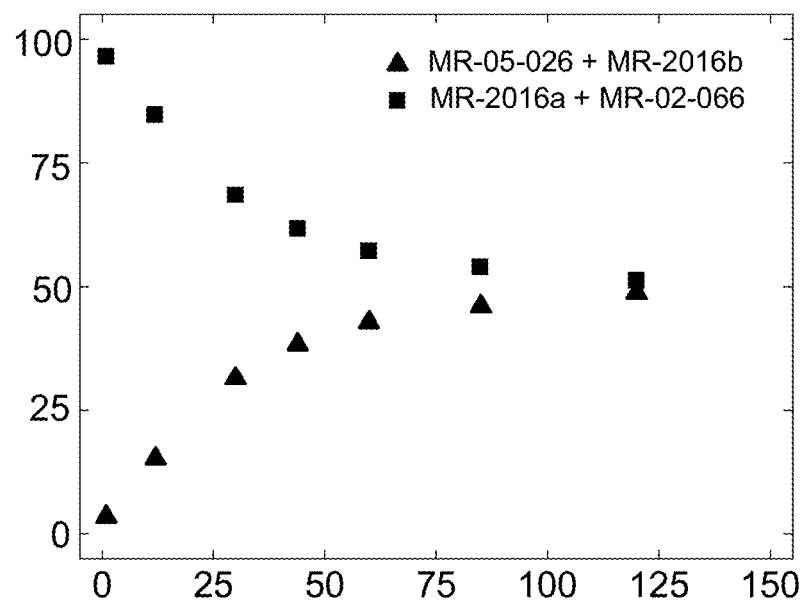
FIG. 14. Evolution of the molar percentage (ordinate; without unit) of the two starting boronic esters and of the two boronic esters formed during the metathesis reaction of phenylboronic esters MR-02-66 and MR-2016a in bulk at 85° C. as a function of time (abscissa; minutes)

The evolution of the molar percentage (ordinate; without unit) of the two starting boronic esters and of the two boronic esters formed during the metathesis reaction of phenylboronic esters MR-02-66 and MR-2016a in bulk at 85° C. is plotted as a function of time (abscissa; minutes) in FIG. 14.

Figure 15:
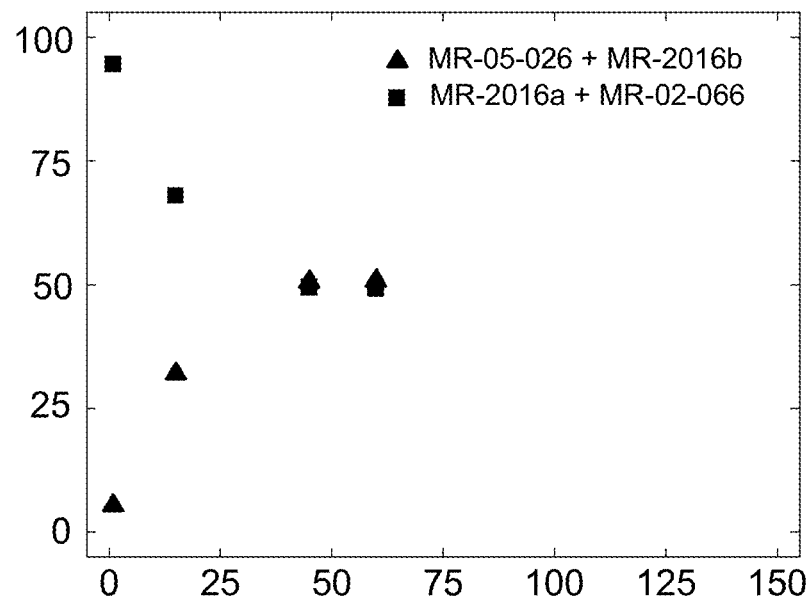
FIG. 15. Evolution of the molar percentage (ordinate; without unit) of the two starting boronic esters and of the two boronic esters formed during the metathesis reaction of phenylboronic esters MR-02-66 and MR-2016a in bulk at 150° C. as a function of time (abscissa; minutes)

The evolution of the molar percentage (ordinate; without unit) of the two starting boronic esters and of the two boronic esters formed during the metathesis reaction of phenylboronic esters MR-02-66 and MR-2016a in bulk at 150° C. is plotted as a function of time (abscissa; minutes) in FIG. 15.

Comparative Example 1: Boronic Esters that do not Undergo Metathesis Reaction; Boronic Acids Pinacol Esters

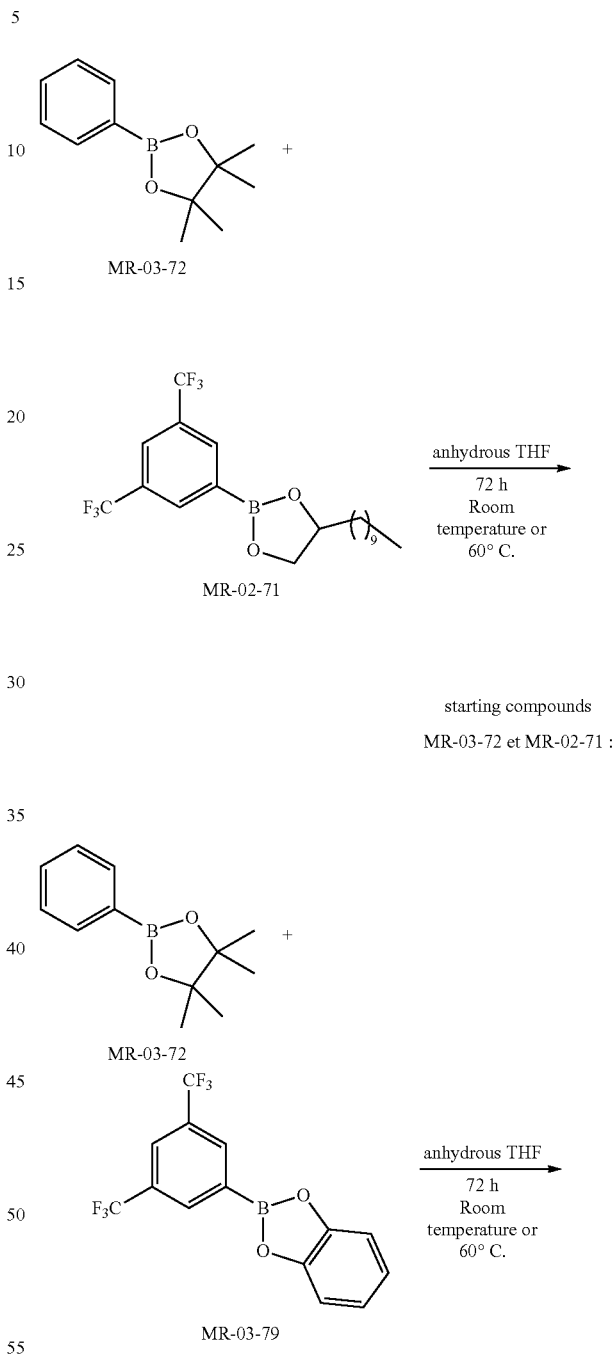

Example 3: Synthesis of Monomers (M1-M3), of Cross-Linking Agents (R1 and R2) and of Additives A1 and C1

3.1. Synthesis of Monomer M1

The following scheme represents the synthesis of monomer M1

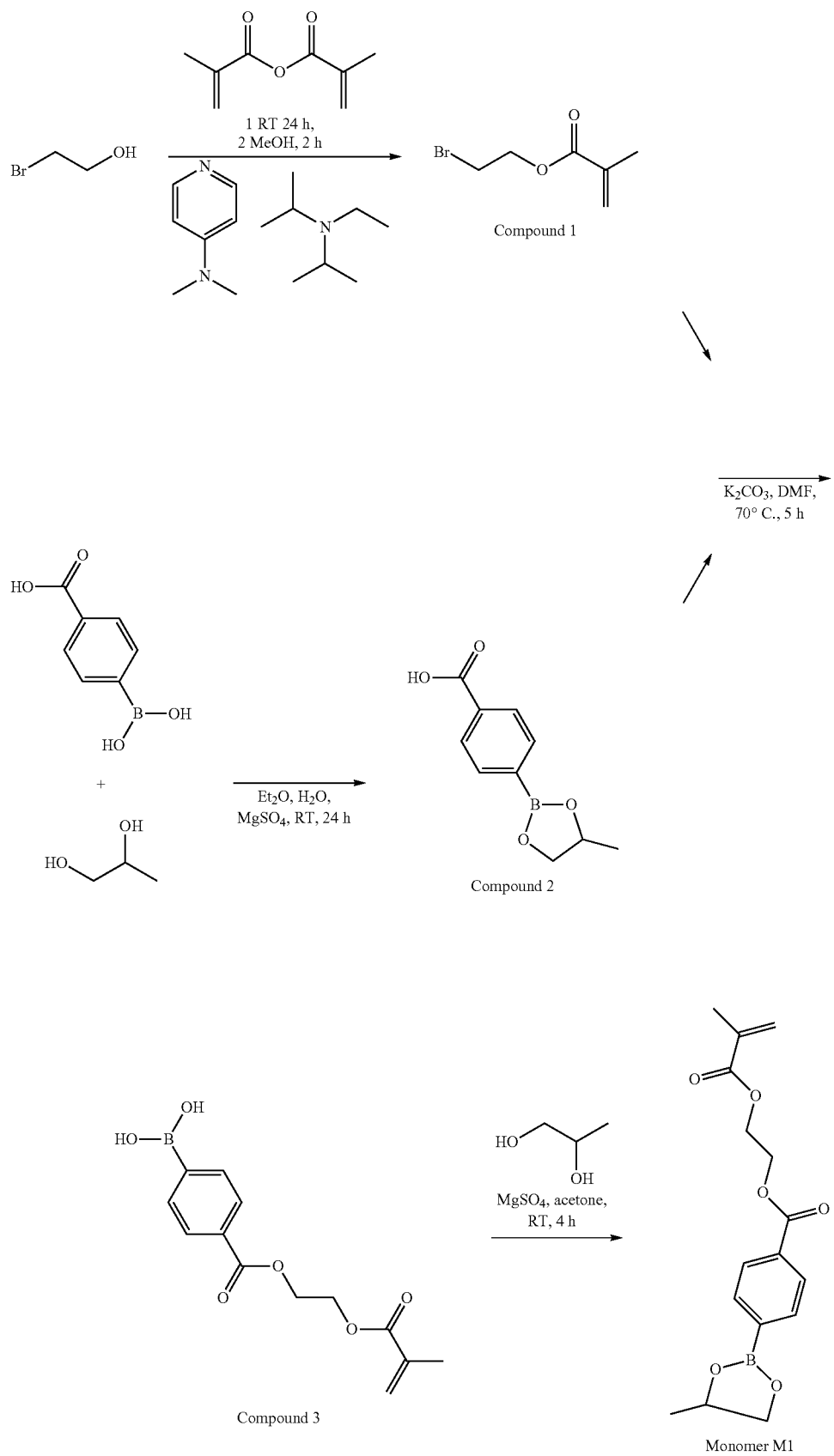

3.1.1 Synthesis of Compound 1

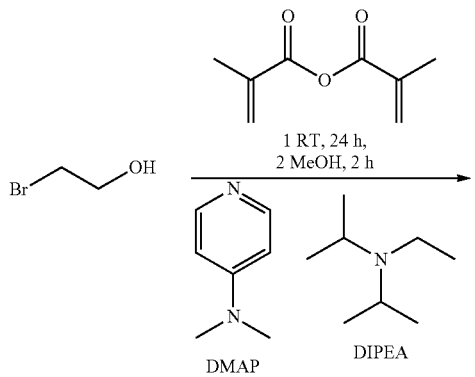

2-Bromoethanol (15 g, 120 mmol), DIPEA (17.1 g, 132 mmol), DMAP (147 mg, 1.2 mmol) and methacrylic anhydride (22.2 g, 144 mmol) are mixed (without the addition of any solvent) and stirred for 24 hours at room temperature (RT). Methanol (5 mL) is added and the resulting mixture is stirred for two additional hours at RT. Ethyl acetate (50 mL) and water (50 mL) are added. The resulting organic phase is washed with a 0.5 M HCl solution (3×50 mL), with a 0.5 M NaOH solution (3×50 mL) and with water (1×50 mL). The organic phase is dried over magnesium sulfate (MgSO$_4$), filtered and concentrated under reduced pressure at 50° C. to yield 18.3 g of a slightly yellow liquid. $^1$H-NMR analysis confirms the generation of compound 1 and the presence of ca. 13 mol % of ethylene glycol dimethacrylate.

$^1$H NMR (CDCl$_3$, 400 MHz): δ 6.17 (s, 1H), 5.62 (s, 1H), 4.44 (t, J=6.0 Hz, 2H), 3.56 (t, J=6.0 Hz, 2H), 1.95 (s, 3H).

3.1.2 Synthesis of Compound 2

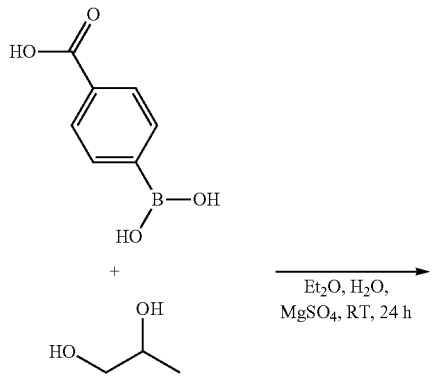

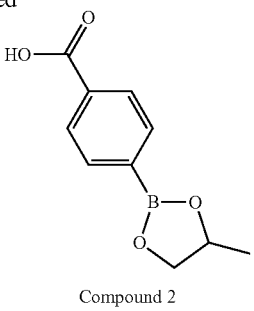

Compound 2

4-Carboxyphenylboronic acid (5 g, 30.1 mmol) and propane-1,2-diol (2.41 g, 31.7 mmol) are mixed in diethyl ether (Et$_2$O, 30 mL) and 0.1 ml of water is added. The resulting mixture is stirred until full dissolution of compounds. Magnesium sulfate (5 g) is added and the suspension is stirred for 24 hours at RT before filtration. The filtrate is concentrated under reduced pressure to yield compound 2 as a white solid (5.15 g).

$^1$H NMR (CDCl$_3$, 400 MHz): δ 7.97 (d, J=8.4 Hz, 2H), 7.78 (d, J=8.4 Hz, 2H), 4.79-4.68 (m, 1H), 4.44 (t, J=8.4 Hz, 1H), 3.87 (d, J=8.4 Hz, 1.6 Hz, 1H), 1.33 (d, J=6.4 Hz, 3H).

3.1.3 Synthesis of Compound 3

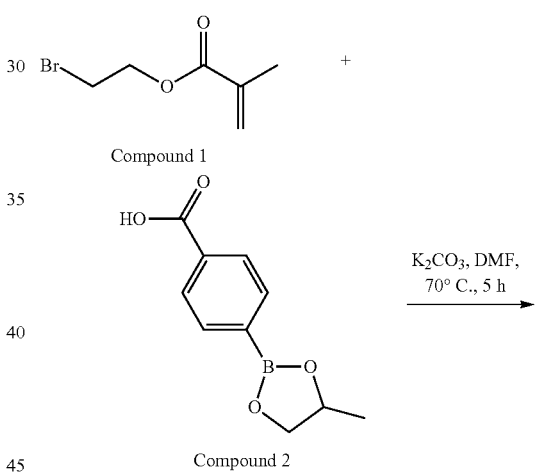

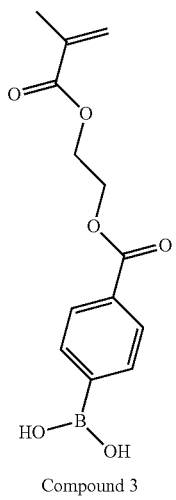

Compound 3

Compound 1 (5 g, 25.9 mmol), compound 2 (6.14 g, 29.8 mmol) and K$_2$CO$_3$ (10.7 g, 77.7 mmol) are mixed in 50 mL de N,N-dimethylformamide (DMF). The resulting mixture is stirred at 70° C. for 5 hours. Ethyl acetate (50 mL) and water (150 mL) are added and the organic phase is washed with water (3×150 mL). During washing, 300 mg of sodium chloride (NaCl) are added to the mixture to enhance phase separation. The organic phase is dried over magnesium sulfate, filtered and concentrated under reduced pressure at 50° C. to yield a white solid. The white solid is dissolved in 50 mL of ethyl acetate and the resulting solution is washed with HCl 0.5 M (3×25 mL) and water (1×50 mL). The organic phase is dried over magnesium sulfate, filtered and concentrated under reduced pressure at 50° C. to yield a white solid (4.73 g). A fraction of the white solid (1.15 g) is dissolved in ethyl acetate. The resulting mixture is heated to 50° C. and 8.5 mL heptane is added. The mixture is kept 5 minutes at 50° C. before being placed in a freezer at −18° C. After 16 hours, the precipitated white solid is collected via filtration and washed with 250 mL pentane. This procedure is repeated a second time to obtain compound 3 (529 mg) as a white solid.

$^1$H NMR (CDCl$_3$, 400 MHz): δ 8.31 (s, 2H), 7.91 (s, 2H), 6.02 (s, 1H), 5.67 (s, 1H), 4.57-4.45 (m, 4H), 1.87-1.79 (m, 3H).

3.1.4 Synthesis of Compound 4 or Monomer M1

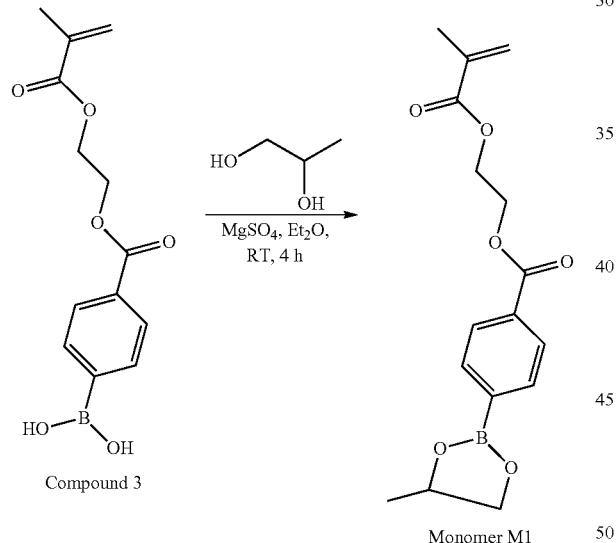

Compound 3

Monomer M1

Compound 3 (3 g, 10.8 mmol), propane-1,2-diol (0.86 g, 11.3 mmol) are mixed in 30 mL diethyl ether and 0.1 mL water is added. The resulting mixture is stirred until complete dissolution of compounds. Magnesium sulfate (4 g) is added and the mixture is stirred for 24 hours at RT before being filtered. The filtrate is concentrated under reduced pressure yielding compound 4 or monomer M1 as a white solid (3.18 g).

$^1$H NMR (CDCl$_3$, 400 MHz): δ 8.02 (s, 2H), 7.88 (s, 2H), 6.13 (s, 1H), 5.58 (s, 1H), 4.75-4.49 (m, 6H), 3.93 (s, 1H), 2.16 (s, 3H), 1.42 (s, 3H).

3.2. Synthesis of Monomer M2

The following scheme represents the synthesis of monomer M2.

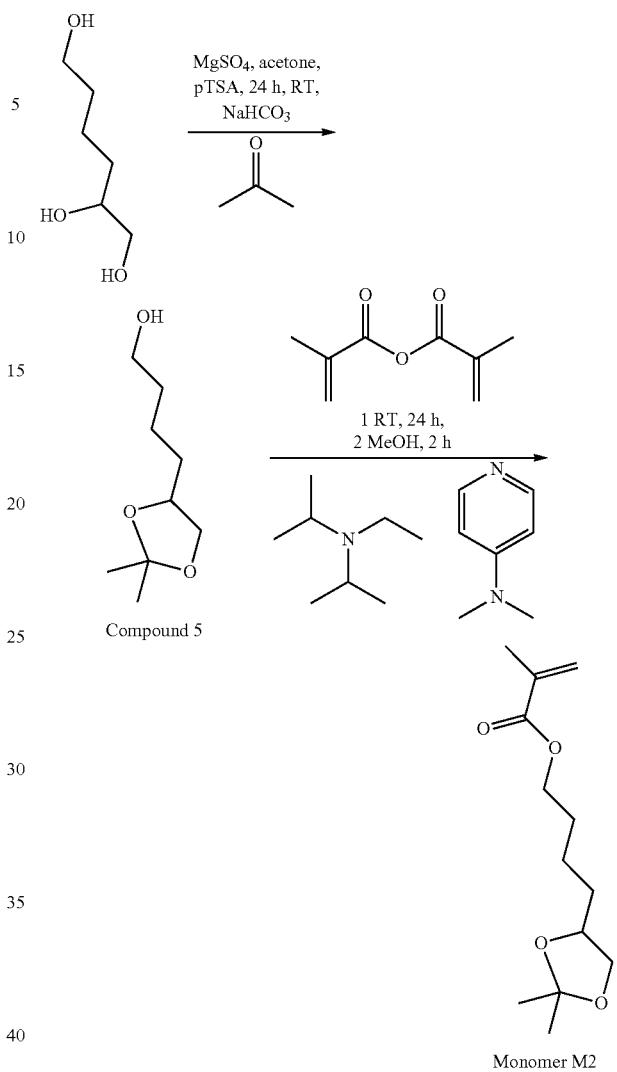

Compound 5

Monomer M2

3.2.1 Synthesis of Compound 5

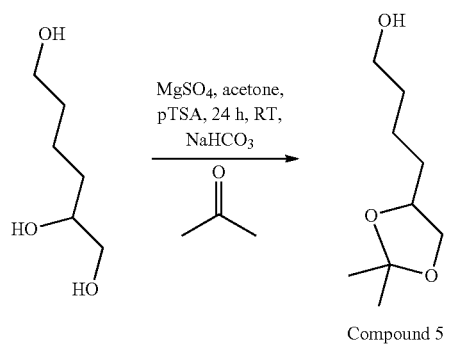

Compound 5

Hexane-1, 2, 6-triol (25 g, 186 mmol) is dissolved in 340 mL of acetone and 45 g of magnesium sulfate are added. p-Toluenesulfonic acid (pTSA, 2.99 g, 15.7 mmol) is added gradually while stirring. After complete addition, the reaction mixture is stirred for 24 hours at RT. NaHCO$_3$ (2.66 g, 31.7 mmol) is added and the mixture is stirred for 3 additional hours at RT. The suspension is filtered and the filtrate is concentrated under reduced pressure to yield a heterogeneous white mixture. Water (350 mL) is added and the resulting mixture is extracted with dichloromethane (4×200 mL). The combined organic phases is dried over magnesium sulfate, filtered and concentrated under reduced pressure to obtain compound 5 (28.7) as a slightly yellow liquid.

$^1$H NMR (CDCl$_3$, 400 MHz): δ 4.01-3.91 (m, 2H), 3.49 (t, J=6.4 Hz, 2H), 3.40 (t, J=7.2 Hz, 1H), 2.80 (s, 1H), 1.60-1.35 (m, 6H), 1.30 (s, 1H), 1.24 (s, 1H).

3.2.2 Synthesis of Compound 6 or Monomer M2

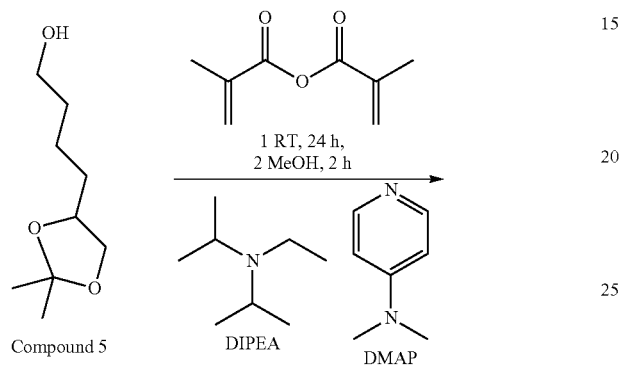

Monomer M2

Compound 5 (14.3 g, 82.2 mmol), DIPEA (11.7 g, 90.5 mmol), DMAP (100 mg, 0.82 mmol) and methacrylic anhydride (15.2 g, 98.8 mmol) are mixed (without any additional solvent) and stirred at RT for 24 hours. Methanol (5 mL) is added and the resulting mixture is stirred at RT for two additional hours. Heptane (50 mL) and water (50 mL) are added. The resulting organic phase is washed with HCl 0.5 M (3×50 mL) and water (1×50 mL). The organic phase is dried over magnesium sulfate, filtered and concentrated under reduced pressure at 50° C. to yield the monomer M2 (15.2 g) as a slightly yellow liquid.

$^1$H NMR (CDCl$_3$, 400 MHz): δ 6.03 (s, 1H), 5.49 (s, 1H), 4.09-3.95 (m, 4H), 3.43 (t, J=7.2 Hz, 1H), 1.88 (s, 3H), 1.68-1.28 (m, 12H).

3.3. Synthesis of Monomer M3

The following scheme represents the synthesis of monomer M3.

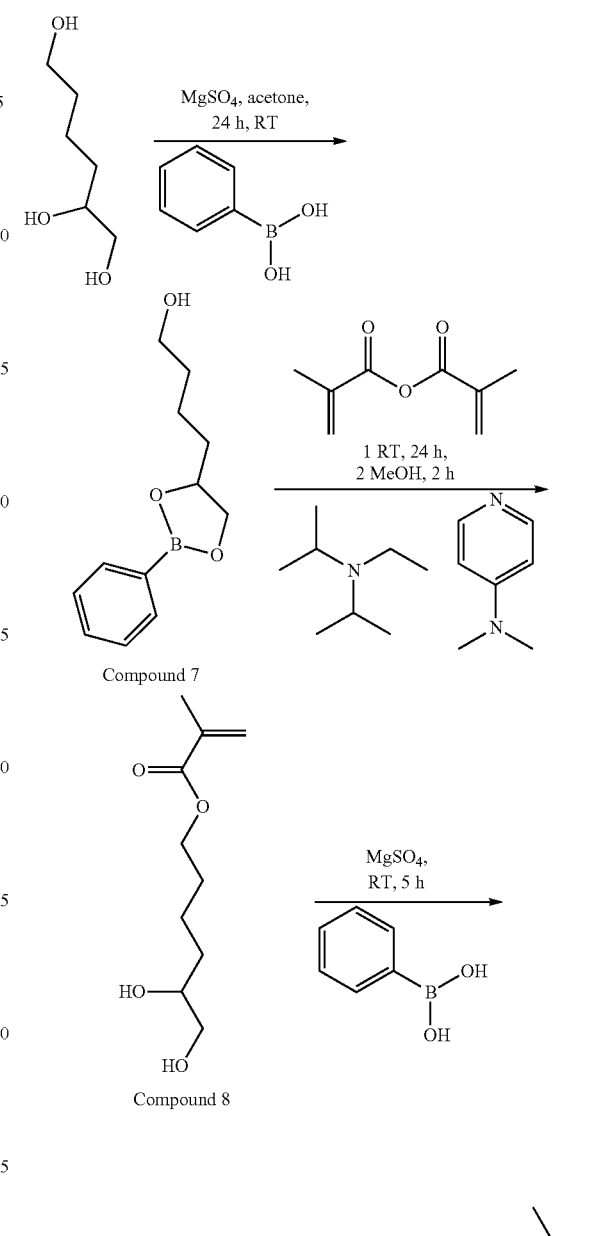

Monomer M3

3.3.1 Synthesis of Compound 7

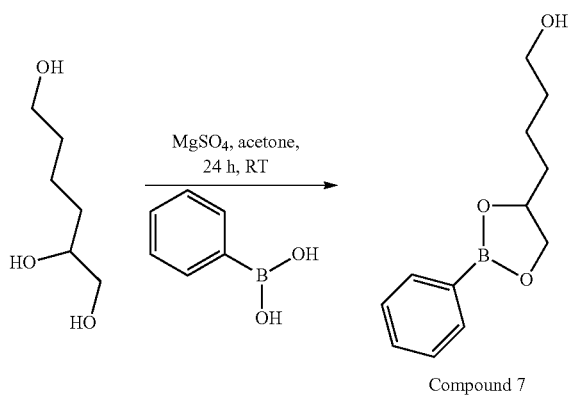

Compound 7

Hexane-1,2,6-triol (10 g, 74.5 mmol) and phenylboronic acid (9.55 g, 78.3 mmol) are mixed in a mixture of 50 mL of acetone and 0.2 mL of water. Magnesium sulfate (20 g) is added and the resulting suspension is stirred at RT for 24 hours before being filtered. The filtrate is concentrated under reduced pressure to yield compound 7 (13.6 g) as a colorless liquid.

$^1$H NMR (CDCl$_3$, 400 MHz): δ 7.82 (d, J=8.0 Hz, 2H), 7.50-7.46 (m, 1H), 7.40-7.36 (t, J=8.0 Hz, 2H), 4.61-4.54 (m, 1H), 4.43 (dd, J=8.8 Hz, 0.8 Hz, 1H), 3.95 (dd, J=8.8 Hz, 2.0 Hz, 1H), 3.67 (t, J=6.4 Hz, 2H), 1.76-1.47 (m, 6H).

3.3.2 Synthesis of Compound 8

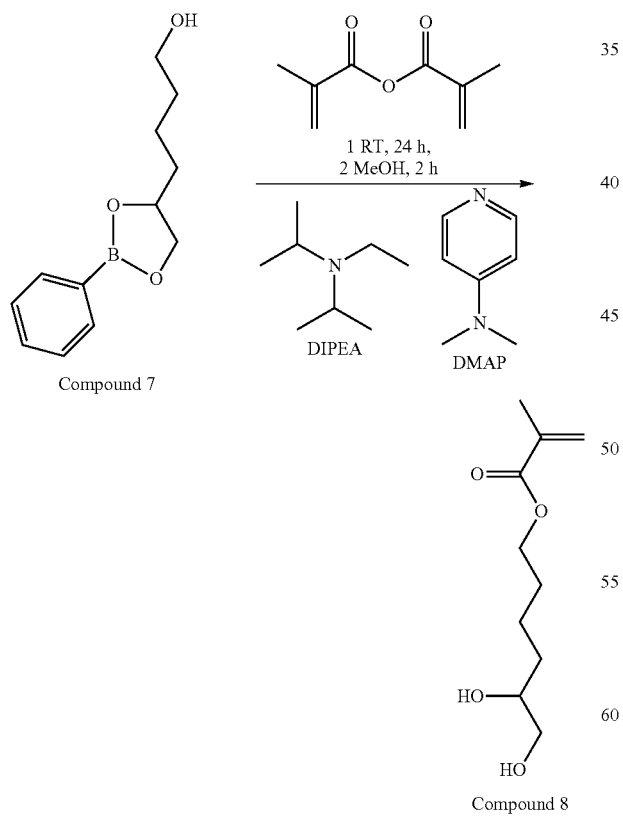

Compound 7 (5.0 g, 22.7 mmol), DIPEA (3.23 g, 25.0 mmol), DMAP (28 mg, 0.23 mmol) and methacrylic anhydride (4.2 g, 27.3 mmol) are mixed (without the addition of solvent) and stirred at RT for 24 hours. Methanol (1 mL) is added and the resulting mixture is stirred at RT for two additional hours. Ethyl acetate (50 mL) and water (50 mL) are added. The resulting organic phase is washed with a 0.5 M HCl solution of (3×50 mL), a 0.5 M NaOH solution (3×50 mL) and water (1×50 mL). The organic phase is dried over magnesium sulfate, filtered and concentrated under reduced pressure to yield compound 8 (3.03 g), with few impurities detectable by 1H NMR, as a slightly yellow liquid.

3.3.3 Synthesis of Compound 9 or Monomer M3

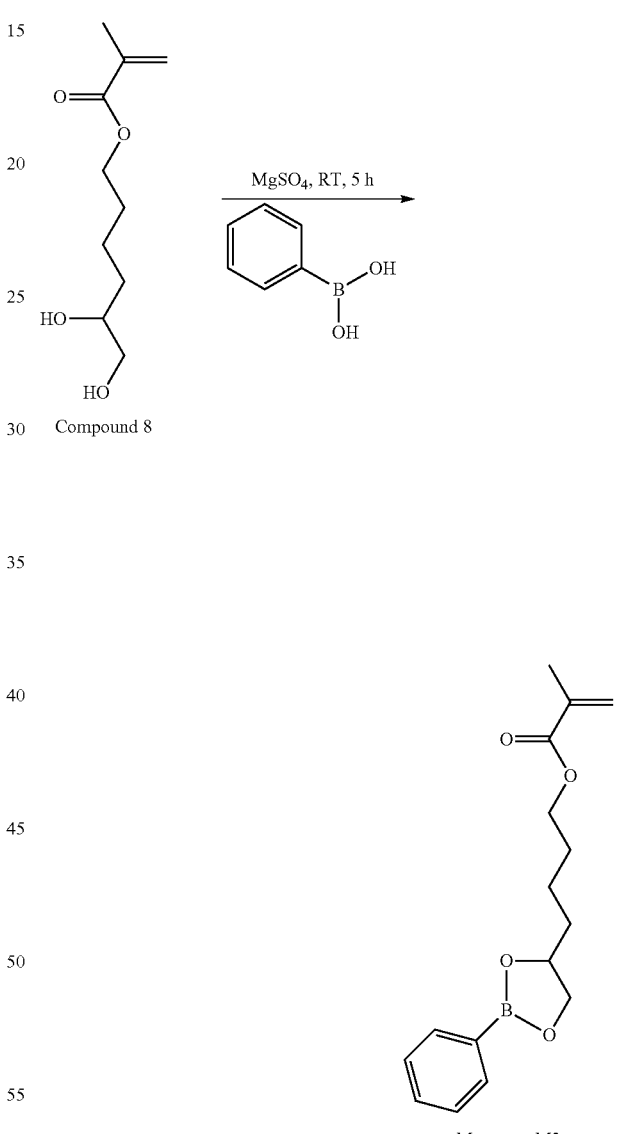

Compound 8 (700 mg, 3.46 mmol) and phenylboronic acid (443 mg, 3.63 mmol) are mixed in a mixture of 20 mL of diethyl ether and 0.1 mL of water. Magnesium sulfate (1 g) is added and the resulting suspension is stirred at RT for 5 hours before filtration. The filtrate is concentrated under reduced pressure to yield monomer M3 (864 mg), with few impurities detectable by 1H NMR, as a slightly yellow liquid that crystallizes rapidly.

3.4 Compound of Formula (Ia): Synthesis of Compound 10 or Cross-Linking Agent R1

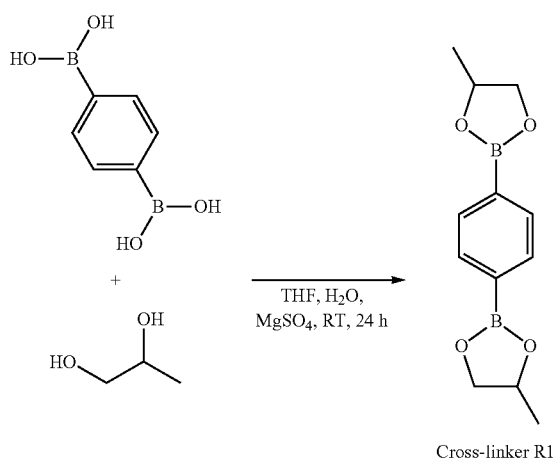

Cross-linker R1

1,4-Phenylenebisboronic acid (3.0 g, 18.1 mmol) and propane-1,2-diol (2.82 g, 37.1 mmol) are mixed in a mixture of 30 mL of THF and 0.1 mL of water. Magnesium sulfate (5 g) is added, the reaction mixture is stirred at RT for 24 hours, filtered and concentrated under reduced pressure to obtain a slightly yellow solid. The solid is put in heptane and the resulting suspension is stirred at 50° C. for 1 hour before filtration. The filtrate is concentrated under reduced pressure to obtain the cross-linking agent R1 (4.06 g, 1, 2 propanediol content <0.7 mol % by gas chromatography) as a white solid.

$^1$H NMR (CDCl$_3$, 400 MHz): δ 7.82 (s, 4H), 4.77-4.69 (m, 2H), 4.46 (dd, J=8.8 Hz, 1.2 Hz, 2H), 3.90 (dd, J=8.8 Hz, 1.2 Hz, 2H), 1.41 (d, J=6.4 Hz, 6H).

3.5 Compound of Formula (Ia): Synthesis of Compound 11 or Cross-Linking Agent R2

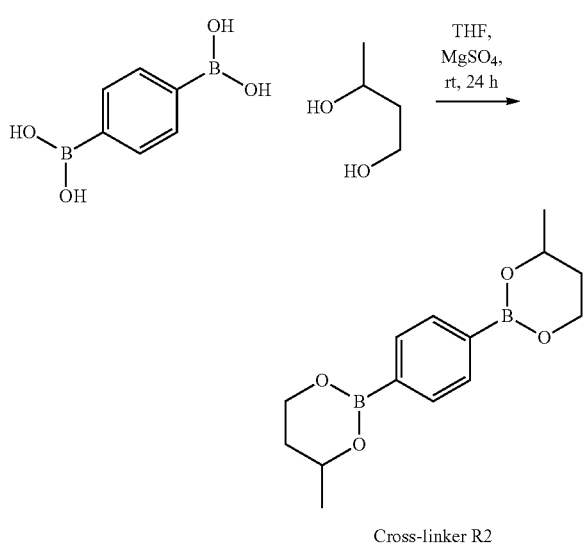

Cross-linker R2

1,4-Phenylenediboronic acid (3.0 g, 18.1 mmol) and butane-1,3-diol (3.43 g, 38.0 mmol) are mixed in a mixture of 30 mL THF and 0.1 mL water. Magnesium sulfate (6 g) is added, the reaction mixture is stirred at RT for 24 hours, filtered and concentrated under reduced pressure to obtain the cross-linking agent R2 as a white solid (3.97 g, 14.5 mmol).

$^1$H NMR (THF-d$_8$, 400 MHz): δ 7.65 p.p.m. (s, 4H), 4.28-4.23 (m, 2H), 4.14-4.03 (m, 4H), 2.02-1.97 (m, 2H), 1.79-1.74 (m, 2H), 1.31 (d, J=6.4 Hz, 6H).

$^{13}$C NMR (THF-d$_8$, 100 MHz): δ 130.5, 65.7, 59.1, 32.4, 20.4.

3.6. Synthesis of Compound 13 or Additive A1

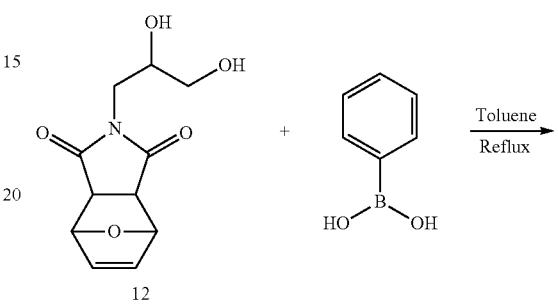

12

Additive A1

Compound 12 was synthesized according to literature (1). Compound 12 (5.5 g, 23.1 mmol) and phenylboronic acid (2.8 g, 23.1 mmol) were dissolved in toluene and heated for 6 hours under reflux conditions (T=135° C.) with Dean-Stark equipment to trap water. Afterwards, the mixture was cooled to room temperature and the solvent was removed under vacuum. The residue was dissolved in ethanol and the mixture stored at −5° C., after which the compound 13 or additive A1 crystallized as a yellow solid (m=4.8 g, 81%).

$^1$H-NMR (DMSO-d$_6$, 400 MHz): δ 7.66 (d, J=8 Hz, 2H), 7.51 (t, J=7.2 Hz, 1H), 7.40 (t, J=7.6 Hz, 2H), 7.07 (s, 2H), 4.75 (ddt, J=8.0, 6.0, 5.6 Hz, 1H), 4.39 (dd, J=9.6, 8.0 Hz, 1H), 4.11 (dd, J=9.6, 5.6 Hz, 1H), 3.67 (d, J=6 Hz, 2H).

$^{13}$C-NMR (DMSO-d$_6$, 100 MHz): δ 170.9, 134.6, 134.4, 131.5, 127.8, 74.4, 68.5, 41.3.

GC-ESI-MS: (m/z) calc for C13H12BNO4 257.09. found 257.

3.7. Synthesis of Compound 14 or Additive C1

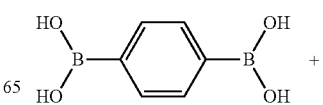

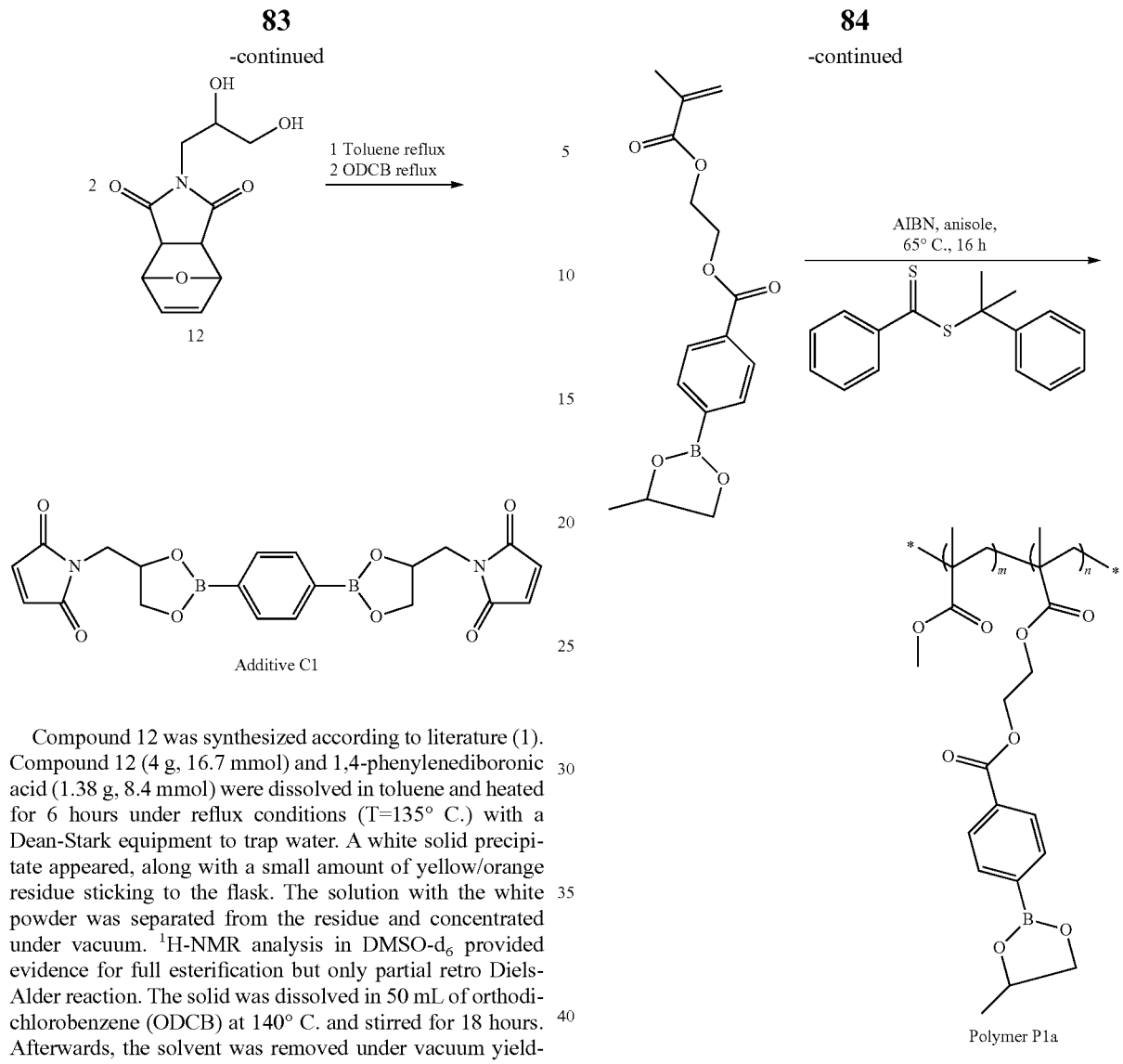

Compound 12 was synthesized according to literature (1). Compound 12 (4 g, 16.7 mmol) and 1,4-phenylenediboronic acid (1.38 g, 8.4 mmol) were dissolved in toluene and heated for 6 hours under reflux conditions (T=135° C.) with a Dean-Stark equipment to trap water. A white solid precipitate appeared, along with a small amount of yellow/orange residue sticking to the flask. The solution with the white powder was separated from the residue and concentrated under vacuum. $^1$H-NMR analysis in DMSO-$d_6$ provided evidence for full esterification but only partial retro Diels-Alder reaction. The solid was dissolved in 50 mL of orthodichlorobenzene (ODCB) at 140° C. and stirred for 18 hours. Afterwards, the solvent was removed under vacuum yielding compound 14 or additive C1 as an off-white solid. Yield=2.5 g. n=69.9%.

$^1$H NMR (DMSO-$d_6$, 400 MHz): δ 7.65 (s, 4H), 7.06 (s, 4H), 4.74 (ddt, J=7.6, 6.0, 5.6 Hz, 2H), 4.38 (t, J=8.8 Hz, 2H), 4.1 (dd, J=9.6 Hz, 6.0 Hz, 1H), 3.67 (d, J=5.6 Hz, 2H).

$^{13}$C NMR (DMSO-d6, 400 MHz): δ 170.9, 134.6, 132.1, 74.4, 68.5, 41.3.

Example 4: Synthesis of Polymers P1 and P2 of the Invention and Polymers for Comparative Examples 4.1. Example of Procedure for the Synthesis of a Polymer P1 Via RAFT-Polymerization ("Reversible Addition-Fragmentation Chain Transfer Polymerization"): Polymer P1a Methyl methacrylate (MMA, 1.26 g, 12.6 mmol), monomer M1 (1 g, 3.14 mmol), 2-phenyl 2-propyl benzodithioate (PPBDT, 17.2 mg, 0.063 mmol) and AIBN (4.1 mg, 0.025 mmol) are mixed in 1.5 mL of anisole. The resulting solution is bubbled with nitrogen at RT for 30 minutes. The reaction mixture is heated to 65° C. for 16 hours while keeping it under nitrogen atmosphere. After 16 hours, 2 mL of anhydrous THF is added and the polymer is precipitated into dry diethyl ether. The obtained polymer is redissolved in anhydrous THF and precipitated a second time into dry diethyl ether. The polymer P1a (Mn=43 kg/mol, Ip=1.32) is dried under high vacuum at 50° C. over night.

4.2. Example of Procedure for the Synthesis of a Polymer Polyacetal Via RAFT-Polymerization RAFT: Polymers P3a and P3b

-continued

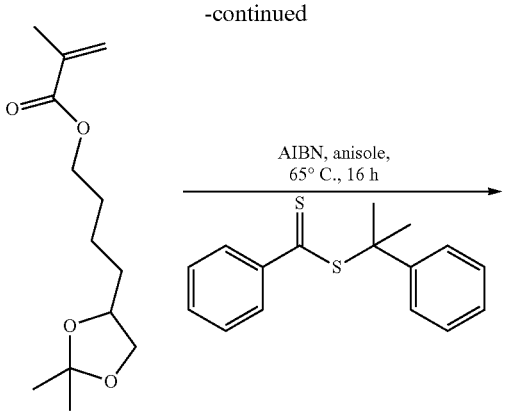

MMA (5.0 g, 49.9 mmol), monomer M2 (3.0 g, 12.5 mmol), 2-phenyl 2-propyl benzodithioate (PPBDT, 68.0 mg, 0.25 mmol) and AIBN (16.4 mg, 0.1 mmol) are mixed in 5 mL of anisole. The resulting solution is bubbled with nitrogen at RT for 30 minutes. The reaction mixture is heated to 65° C. for 16 hours while keeping it under nitrogen atmosphere. After 16 hours, 5 mL of anhydrous THF is added and the polymer is precipitated into dry diethyl ether. The obtained polymer is redissolved in anhydrous THF and precipitated a second time into dry diethyl ether. The polymer P3a (Mn=39 kg/mol, Ip=1.22) is dried under high vacuum at 50° C. over night.

Using the same polymerization temperature, time and initial ratio (volume) of monomers/anisole, but changing the initial molar ratio MMA/M2/PPBDT/AIBN=800/200/1/0.4 (instead of 200/50/1/0.4), a polymer P3b (Mn=86 kg/mol, Ip=1.53) is obtained.

4.3. Example of Procedure for the Elimination of the Dithioester Chain End of a Polymer Prepared by RAFT-Polymerization: Polymer P3a*

The polymer P3a (14 g) is dissolved in 300 mL anhydrous THF and n-butylamine (41.6 mg, 0.57 mmol) is added. The resulting mixture is stirred at RT for 24 hours, before addition of ethyl acrylate (120 mg, 1.2 mmol). The reaction mixture is stirred at RT for 24 hours. Polymer P3a* is then recovered by precipitation into methanol and filtration, before being dried under high vacuum at 50° C. over night. 12 g of polymer P3a* is thus obtained.

4.4. Functionalization of the Polyacetal P3a Polymer, Respectively P3b, to Prepare a Polymer P1 or P2 of the Invention, Named P2a, Respectively P2b, and Preparation of Polymer P5a (from P3a) Used for Comparative Examples.

The following scheme represents the synthesis of the polymers P2a, respectively P2b, P4a, respectively P4b, and P5a from polyacetal P3a, respectively P3b.

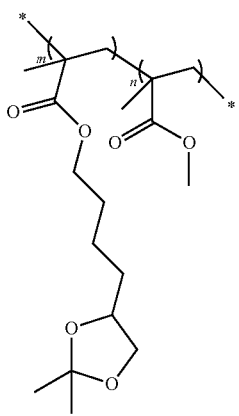

Polymer P3a or P3b

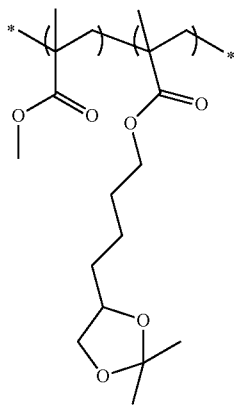

Polymer P3a or P3b

Dioxane, THF, HCl, RT, 48 h

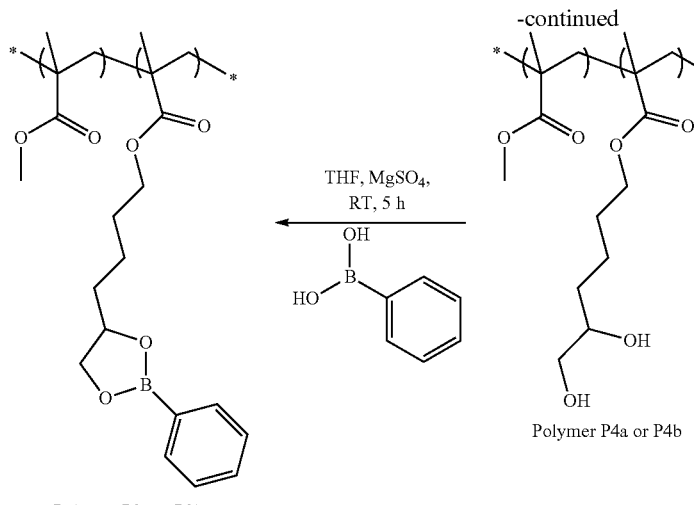
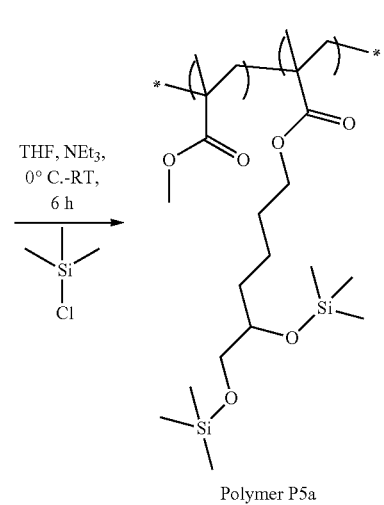

4.4.1. Example of Procedure for the Synthesis of a Polydiol Polymer from a Polyacetal Polymer: Polymer P4a and P4b

4.4.2 Example of Procedure for the Synthesis of Polymer P1 or P2 of the Invention from a Polydiol Polymer: Polymers P2a and P2b

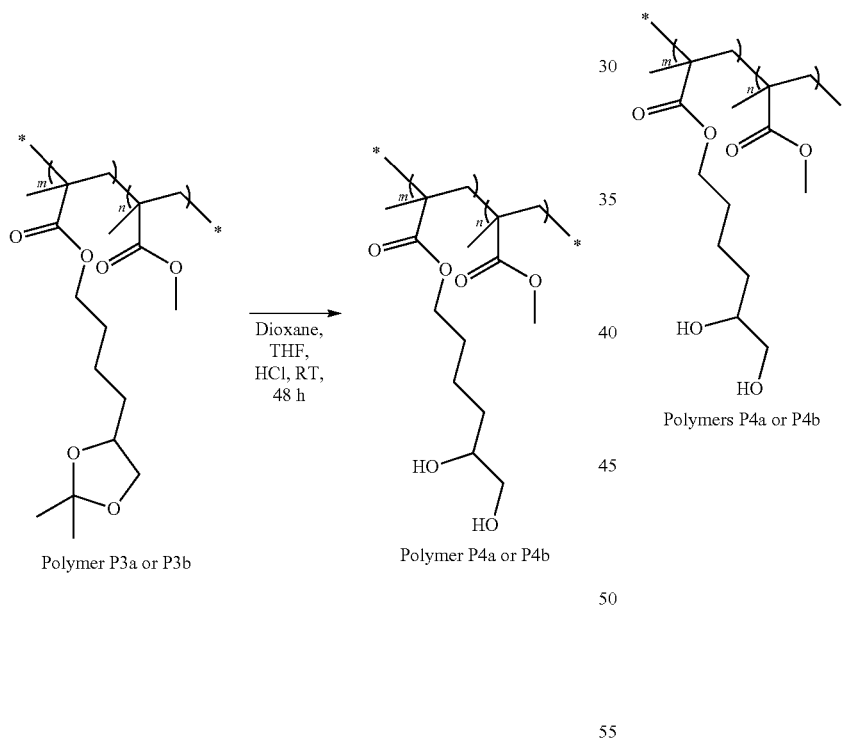

The polyacetal P3a (1.0 g) is dissolved in dioxane (50 mL) and 0.5 mL of a 1 M HCl solution and 0.4 mL of a 36 wt % HCl solution are added. THF (3 mL) is added and the reaction mixture is stirred at RT for 48 hours. The solution is concentrated under reduced pressure and the polymer is isolated by precipitation into dry diethyl ether. The resulting polymer is re-dissolved in THF and precipitated a second time into dried diethyl ether. The polydiol polymer P4a is dried under high vacuum at 50° C. over night. Via the same method, but using polyacetal P3b instead of P5a, the polydiol polymer P4b is obtained.

Phenylboronic acid (232 mg, 1.9 mmol) and polymer P4a (1.0 g) are mixed in 25 mL of anhydrous THF and water (0.1 mL) is added. The reaction mixture is stirred at RT until full dissolution. Magnesium sulfate (4 g) is added and the reaction mixture is stirred 5 hours at RT before being filtered. The filtrate is concentrated under reduced pressure (viscous solution). The polymer P2a is isolated by precipitation of this viscous solution into dried diethyl ether and then dried at 50° C. under high vacuum over night. Via the same procedure, but using the polydiol P4b instead of P4a, the polymer P2b is obtained.

4.4.3 Example of Procedure for the Synthesis of a Polydiol Polymer with its Hydroxyl-Functionalities Protected as Silyl Ethers, Used for Comparative Examples: Polymer P5a

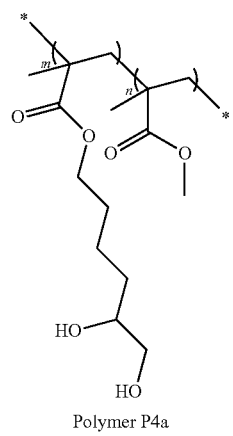

Polymer P4a

THF, NEt₃,
0° C.-RT,
6 h

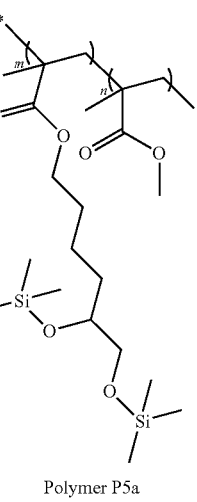

Polymer P5a

The polymer P4a (1 g) is dissolved in 20 mL of THF and the reaction mixture is cooled to 0° C. While keeping the temperature at 0° C., triethylamine (733 mg, 7.24 mmol) is added and then chlorotrimethylsilane (590 mg, 5.43 mmol) is added dropwise. The reaction mixture is allowed to warm to RT and stirred for 6 additional hours at RT. After filtration, the polymer P5a is isolated by precipitation into dried diethyl ether and dried under high vacuum at 50° C. over night.

4.5. Example of Procedure for the Synthesis of a Polymer P1 or P2 of the Invention Via RAFT-Polymerization: Polymer P2c, P2d, P2e and P2f 4.5.1. General Procedure for the Synthesis of a Polymer P1 or P2 of the Invention Via RAFT-Copolymerization of Monomer 3: Polymer 2c

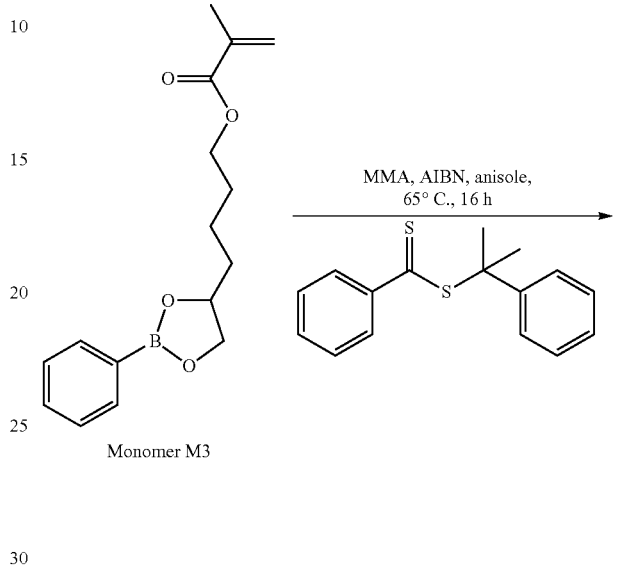

Monomer M3

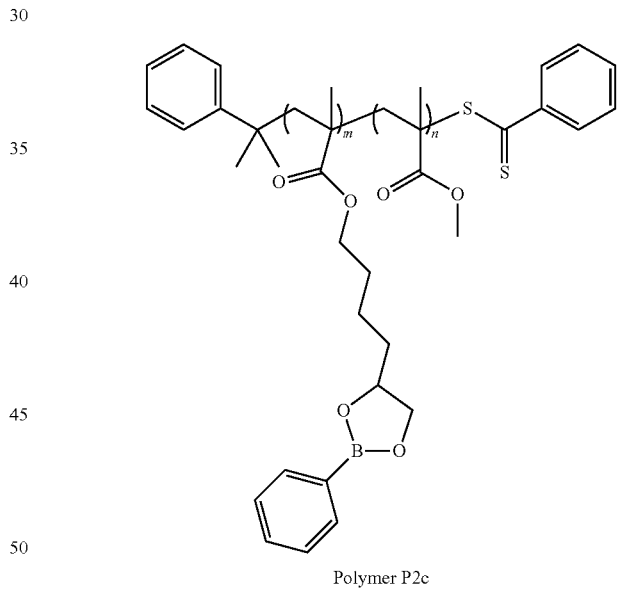

Polymer P2c

Synthesis of Poly(Methyl Methacrylate) with Pending Dioxaborolanes: Polymer 2c.

MMA (1.22 g, 12.2 mmol), the monomer M3 (880 mg, 3.05 mmol), 2-phenyl 2-propyl benzodithioate (16.7 mg, 0.061 mmol) and AIBN (4.0 mg, 0.024 mmol) were dissolved in anisole (1.2 mL). The resulting mixture was bubbled with nitrogen at room temperature for 30 minutes before being heated to 65° C. The reaction mixture was kept under nitrogen while being stirred at 65° C. After 16 hours, 1 mL of THF was added to the viscous oil and the mixture was precipitated into dry diethyl ether (Et₂O). The polymer 2c was dried at 100° C. under high vacuum for 16 hours. Yield=1.2 g. $M_n$=24 300 g/mol, $Đ$ =1.18.

4.5.2. General Procedure for the Synthesis of a Polymer P1 or P2 of the Invention Via RAFT-Copolymerization of Compound 8: Polymer 2d and Polymer P4e

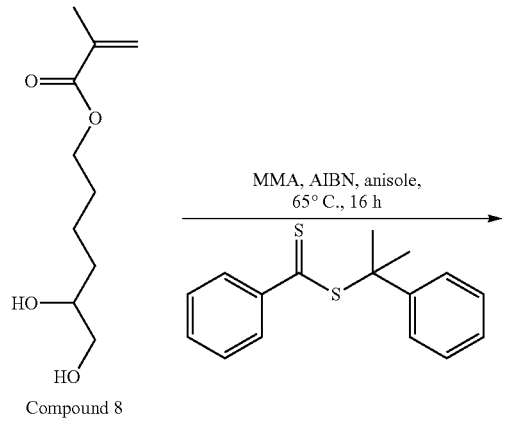

Compound 8

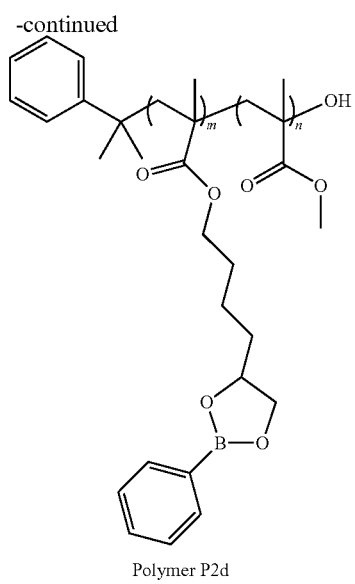

Polymer P2d

Synthesis of Poly(Methyl Methacrylate) with Pending Diol Functionalities: Polymer P4c.

MMA (15 g, 149.8 mmol), compound 8 (7.58 g, 37.5 mmol), 2-phenyl 2-propyl benzodithioate (51.0 mg, 0.187 mmol) and AIBN (12.3 mg, 0.075 mmol) were dissolved in anisole (15 mL). The resulting mixture was bubbled with nitrogen at room temperature for 30 minutes before being heated to 65° C. The reaction mixture was kept under nitrogen while being stirred at 65° C. After 16 hours, 10 mL of THF were added to the viscous oil and the mixture was precipitated into dry diethyl ether (Et$_2$O). Yield=17.5 g. Total monomer conversion: 77%. $M_n$=71 000 g/mol, Đ =1.35.

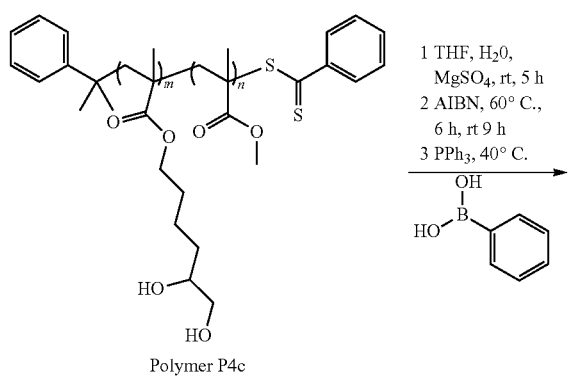

Polymer P4c

Synthesis of Poly(Methyl Methacrylate) with Pending Dioxaborolanes: Polymer 2d.

Polymer P4c (17 g, 31.9 mmol diols, 0.274 mmol chains) was dissolved in THF (250 mL) and phenylboronic acid (4.08 g, 33.5 mmol) and water (0.1 mL) were added. After 5 minutes, MgSO$_4$ (11.5 g) was added and the mixture was stirred at room temperature for 5 hours. AIBN (173 mg, 1.06 mmol) was added and the mixture heated for 6 hours at 60° C. and then 9 additional hours at room temperature. Triphenylphosphine (277 mg, 1.06 mmol) was added and the reaction mixture was stirred at 40° C. for 1 additional hour. The mixture was put in a centrifuge for 30 minutes at 8500 rpm, filtered, concentrated under reduced pressure and precipitated from dry Et$_2$O. The polymer 2d was dried at 100° C. under high vacuum for 16 hours. Yield=14.5 g. Ratio Diol/MMA 1/3.3 from monomer conversions. $M_n$=86 000 g/mol, Đ =1.40.

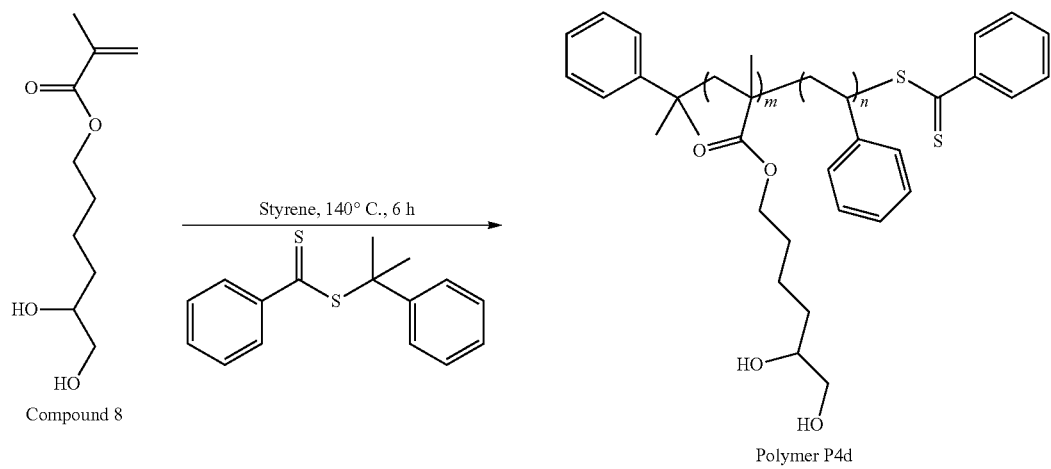

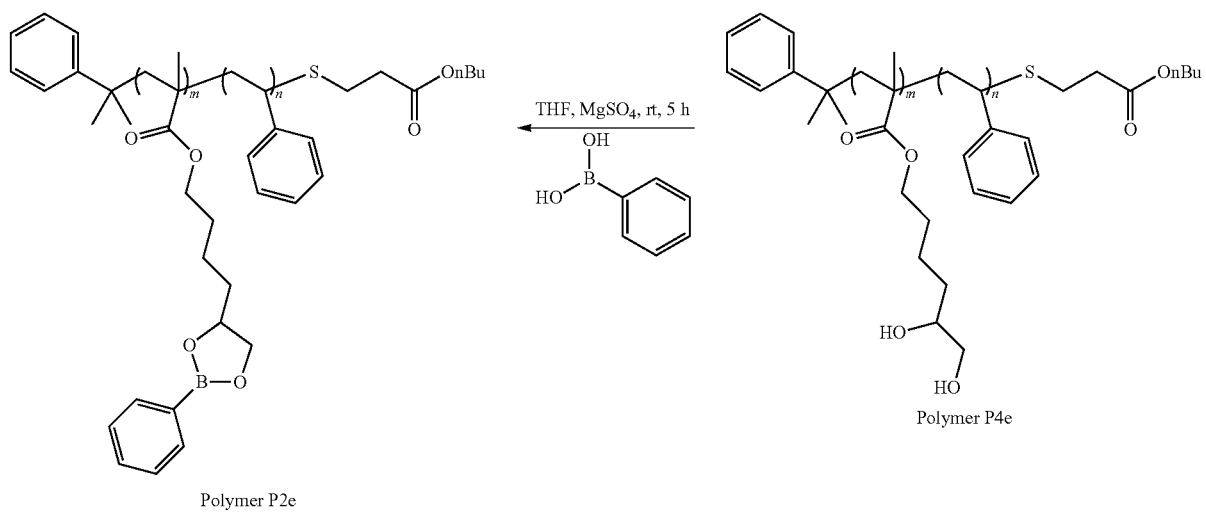

Synthesis of Polystyrene with Pending Diol Functionalities: Polymer P4d.

Styrene (43 mL, 376 mmol), compound 8 (7.6 g, 37.6 mmol) and 2-phenyl 2-propyl benzodithioate (102 mg, 0.376 mmol) were mixed with anisole (0.7 mL) and bubbled with argon at room temperature for 30 minutes. The mixture was heated to 140° C. for 6 hours and samples were taken to follow the reaction kinetics. After 6 hours, the mixture was diluted with THF and precipitated from methanol (MeOH). The polymer was filtered and dried under reduced pressure to obtain polymer P4e as a pink solid (35 g, yield 75%). Conversion of compound 8=85.7%, conversion of styrene=73.1%, ratio diol methacrylate/styrene from conversions: 1/8.5. $M_n$=75 000 g/mol, $Đ$=1.57.

Synthesis of Polystyrene with Pending Diol Functionalities without RAFT Chain-Ends: Polymer P4e.

Polymer P4d was dissolved in a 1/1 THF/DMF mixture (250 mL) and reacted with n-butyl amine (275 mg, 3.76 mmol) at room temperature under argon for 5 hours. n-Butylacrylate (4.8 g, 37.6 mmol) was added to the reaction mixture and stirring was continued for 18 hours at room temperature. The mixture was concentrated under reduced pressure and the colorless polymer P4e was precipitated from MeOH (ca 30 g). $M_n$=77 000 g/mol, $Đ$=1.60.

Synthesis of Polystyrene with Pending Dioxaborolanes: Polymer P2e.

The polymer P4e (25 g, 23.8 mmol pending diols) was dissolved in THF (50 mL) and phenylboronic acid (2.94 g, 24.1 mmol) and MgSO$_4$ (8.68 g, 72.4 mmol) were added. After 5 hours at room temperature, the mixture was centrifuged and then filtered, concentrated under reduced pressure and precipitated from dry Et$_2$O to yield polymer P2e. $M_n$=76 000 g/mol, $Đ$=1.71.

4.5.3. General Procedure for the Synthesis of a Polymer P1 or P2 of the Invention: Polymer 2f

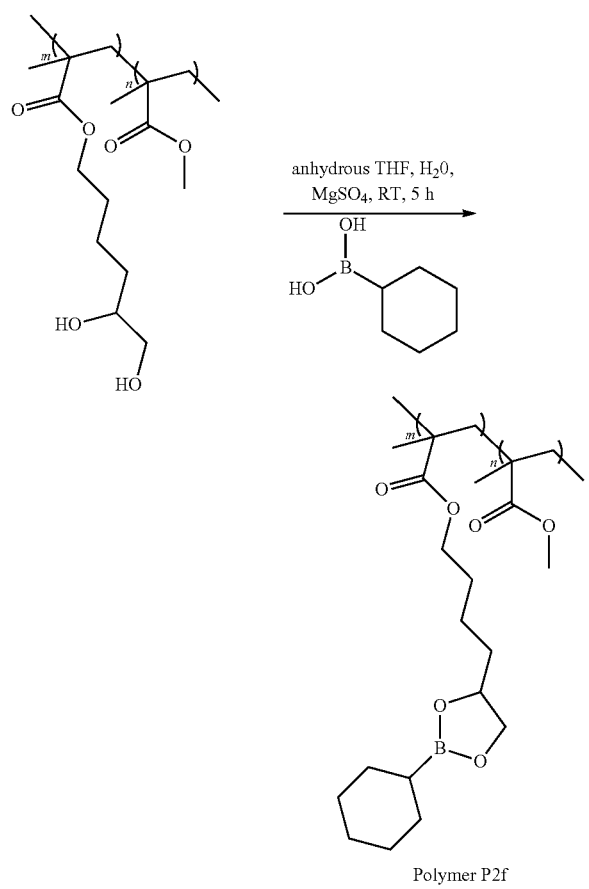

Polymer P2f

Synthesis of Poly(Methyl Methacrylate) with Pending Dioxaborolanes: Polymer 2f.

Cyclohexylboronic acid (1.20 g, 9.8 mmol) and 5.0 g of a polydiol PMMA with a $M_n$ of 100 kg/mol, a Đ of 1.2 and 17 mol % of monomer units carrying a diol function, which was prepared following a procedure based on the procedure used to prepare Polymer P4c, are mixed in 25 mL of anhydrous THF and 0.1 mL of water is added. The reaction mixture is stirred at RT until full dissolution of all compounds. Magnesium sulfate (5 g) is added and the reaction mixture is stirred 5 hours at RT before being filtered. The filtrate is concentrated under reduced pressure to give a viscous solution. The polymer P2f is then isolated by precipitation of the viscous solution into dried diethyl ether and filtration. The polymer P2f is subsequently dried at 50° C. under high vacuum over night. Yield=4 g. $M_n$=103 000 g/mol, Đ =1.25.

4.6. Functionalization of Commercial High-Density Polyethylene (HDPE) with Compound 13 or Additive A1 to Prepare a Polymer P1 or P2 of the Invention.

4.6.1. Melt Functionalization of Commercial High-Density Polyethylene (HDPE) with Compound 13 or Additive A1 to Prepare a Polymer P1 or P2 of the Invention, Named P2g.

Functionalization of commercial high-density polyethylene (HDPE) was carried out using a DSM Explore batch twin-screw extruder (5 cm³ capacity) equipped with co-rotating conical screw profile and recirculation channel to control the residence time. High-density polyethylene (HDPE) was purchased from Sigma Aldrich (referenced as 428078, melt index 2.2 g/10 min at 190° C. for 2.16 kg). Dry blends of HDPE, compound 13 or additive A1 (6 wt %) and dicumyl peroxide (0.3 wt %) were prepared prior to introduction in the extruder. Melt grafting was performed under nitrogen atmosphere with a barrel temperature of 200° C., a screw speed of 100 rpm and a residence time of 10 minutes. Extrudates were collected and let to cool down to room temperature. FTIR analysis of the polymer P2g indicates that this polymer contains approximately 4.5 weight % of compound 13 or additive A1.

4.6.2. Solution Functionalization of Commercial High-Density Polyethylene (HDPE) with Compound 13 or Additive A1 to Prepare a Polymer P1 or P2 of the Invention, Named P2i-P2l.

2 g of HDPE (purchased from Sigma Aldrich, referenced as 428078, melt index 2.2 g/10 min at 190° C. for 2.16 kg) was charged in a sample vial with orthodichlorobenzene (ODCB) (10 mL) and a stirrer bar. The vial was capped and heated to 140° C. under stirring to dissolve the polymer. 2 weight % (as compared to HDPE) of compound 13 or additive A1, respectively 4 wt %, respectively 6 wt %, respectively 8 wt %, respectively 10 wt %, was added to the mixture and stirred until everything was dissolved. The mixture was then heated to 160° C. A solution of ditertbutyl peroxide (75 µL in 2 mL ODCB) was prepared and 0.2 mL of this solution was added to the polymer solution to initiate the grafting process. After 1 hour at 160° C., the reaction mixture was precipitated from acetone. The crude polymer was boiled in acetone and filtered twice, after which it was dried under vacuum to constant weight to yield the polymer P2h, respectively P2i, respectively P2j, respectively P2k, respectively P2l. FTIR analysis of the polymer P2h, respectively P2i, respectively P2j, respectively P2k, respectively P2l, indicates that this polymer contains approximately 0.5 weight %, respectively approximately 2.5 weight %, respectively approximately 4.2 weight %, respectively approximately 5.7 weight %, respectively approximately 7 weight %, of compound 13 or additive A1.

Example 5: Formation and Characterization of Cross-Linked Polymer Networks Containing Pending Exchangeable Bonds and Cross-Links Exchangeable by Metathesis Reaction of Boronic Esters According to the Invention and Formulations Serving as Comparative Examples

5.1.1 Example of Liquid Formulation Yielding a Cross-Linked Polymer Network from Polymers P1 (P1a) and P2 (P2a) According to the Invention.

The following example represents a liquid formulation according to the invention and illustrates the formation of a cross-linked polymer network in solution.

0.1 g of polymer P1a is dissolved at RT in 0.6 mL of anhydrous THF. 0.1 g of polymer P2a is dissolved at RT in anhydrous THF. The two solutions containing the dissolved polymers in anhydrous THF are mixed at RT and the formation of a gel, or cross-linked polymeric network swollen with THF, is observed in less than 5 minutes after mixing.

5.1.2 Comparative Examples of Liquid Formulations Containing a Polymer P1 (P1a) and a Polymer Containing Pending Acetal Groups, P3a, or a Polymer Containing Pending Silyl Ether Groups Obtained from Diols, P5a.

The following comparative examples illustrate the fact that the cross-linking reaction proceeds by metathesis reaction of boronic esters.

0.1 g of polymer P1a is dissolved in 0.6 mL of anhydrous THF at RT. 0.1 g of polymer P3a is dissolved in 0.6 mL of anhydrous THF at RT. The two solutions containing the dissolved polymers in anhydrous THF are mixed at RT. Gel formation is not observed at RT, neither after 5 minutes nor after 24 hours after mixing.

0.1 g of polymer P1a is dissolved in 0.6 mL of anhydrous THF at RT. 0.1 g of polymer P5a is dissolved in 0.6 mL of anhydrous THF at RT. The two solutions containing the dissolved polymers in anhydrous THF are mixed at RT. Gel formation is not observed at RT, neither after 5 minutes nor after 24 hours after mixing.

5.1.3 Example of a Liquid Formulation of a Cross-Linked Polymer Network from Polymers P1 (P2a) and a Compound of Formula (Ia) (Cross-Linking Agent R1) According to the Invention.

The following example presents a liquid formulation and illustrates the formation of a cross-linked polymer network in solution according to the invention.

0.1 g of polymer P2a and 4.5 mg of the cross-linking agent R1 are dissolved in 1.2 mL of anhydrous THF at RT in a closed glass vial. The reaction mixture is heated to 50° C. After 1 hour at 50° C. the formation of a gel, or a cross-linked polymer network swollen with THF, is observed.

5.1.4 Comparative Examples of Liquid Formulations Containing a Compound of Formula (Ia) (Cross-Linking Agent R1) According to the Invention and a Polymer Containing Pending Acetal Functionalities, P3a, or a Polymer Containing Pending Silyl Ether Functionalities Obtained from Diols, P5a.

The following comparative examples illustrate the fact that the cross-linking reaction proceeds by metathesis reaction of boronic esters.

0.1 g of polymer P3a and 4.5 mg of the cross-linking agent R1 are dissolved in 1.2 mL of anhydrous THF at RT in a closed glass vial. The reaction mixture is heated to 50° C. After 1 hour at 50° C. gel formation is not observed.

0.1 g of polymer P5a and 4.5 mg of the cross-linking agent R1 are dissolved in 1.2 mL of anhydrous THF at RT in a closed glass vial. The reaction mixture is heated to 50° C. After 1 hour at 50° C. gel formation is not observed.

5.2. Example of a Solid Formulation, Processing Via Compression Molding, Insolubility and Recycling Tests of a Cross-Linked Polymer Network The following example represents a solid formulation and illustrates the formation of a cross-linked polymer network according to the invention, its processing via compression molding and its insolubility in a good non-reactive solvent of the polymer constituting the cross-linked polymer network.

Formation, Processing Via Compression Molding of a Cross-Linked Polymer Network: N1, N2, N3, N4, N5 and N6

10.0 g of polymer P2a are dissolved in 10 mL of anhydrous THF at RT and 220 mg of formula (Ia) R1 compound are added. The reaction mixture is stirred slowly at RT during 30 minutes before being concentrated under reduced pressure at 120° C. and then dried under high vacuum for 3 to 5 hours at 120° C. The resulting polymer is ground into powder and compression molded during 1 hour at 150° C. under a pressure of 3 to 5 tons. The resulting cross-linked polymer network is named N1.

Via the same procedure, but using polymer P2b (instead of P2a), the cross-linked polymer network N2 is obtained.

Via the same procedure, but using polymer P2b (instead of P2a) and using 100 mg of formula (Ia) R1 compound (instead of 220 mg), the cross-linked polymer network N3 is obtained.

Via the same procedure, but using polymer P2c (instead of P2a), the cross-linked polymer network N4 is obtained.

Via the same procedure, but using polymer P2d (instead of P2a) and using 100 mg of formula (Ia) R1 compound (instead of 220 mg), the cross-linked polymer network N5 is obtained.

Via the same procedure, but using polymer P2d (instead of P2a), the cross-linked polymer network N6 is obtained.

Solubility Tests of the Cross-Linked Polymer Network N2 at RT in THF

A sample of the cross-linked polymer network N2 is added to 10 mL of anhydrous THF and swollen for 24 hours at RT. The sample is weighted, dried under high vacuum at 100° C. until constant weight (ca. 24 hours). The swelling ratio (SR) and the soluble fraction (SF) of the cross-linked polymer network N2 are calculated. This experiment is done on three samples and the results are reported in table 1, below.

Swelling ratio=(mass of the swollen sample−mass of the dried sample after swelling)/(mass of the dried sample after swelling)

Soluble fraction=(mass of the dry sample before swelling−mass of the dried sample after swelling)/(mass of the dried sample after swelling)

TABLE 1

| Sample | Mass before swelling [mg] | Mass swollen [mg] | Swelling ratio | Mass dried after swelling [mg] | Soluble fraction [%] |
|---|---|---|---|---|---|
| 1 | 73 | 352 | 4.1 | 69 | 5.8 |
| 2 | 102 | 496 | 4.1 | 97 | 5.2 |
| 3 | 146 | 601 | 3.26 | 141 | 3.5 |

5.3. Recycling of a Cross-Linked Polymer Network after Processing Via Compression Molding/Mechanical Testing/Grinding to Powder The following example represents a solid formulation, its mechanical characterization, its processing via compression molding, and illustrates the aptitude of the cross-linked polymer networks described in the invention to be recycled several times without significant degradation of their mechanical properties.

Samples obtained from the cross-linked polymer network N1 with the a dumbbell shape were tested in traction using a tensile testing device Instron 5564. The samples were elongated until rupture with a cross-head speed of 1.5 mm/min, ground into powder and re-processed via compression molding under a pressure between 3 to 5 tons for 30 minutes at 150° C. This procedure was repeated 3 times on 4 samples.

Figure 16:
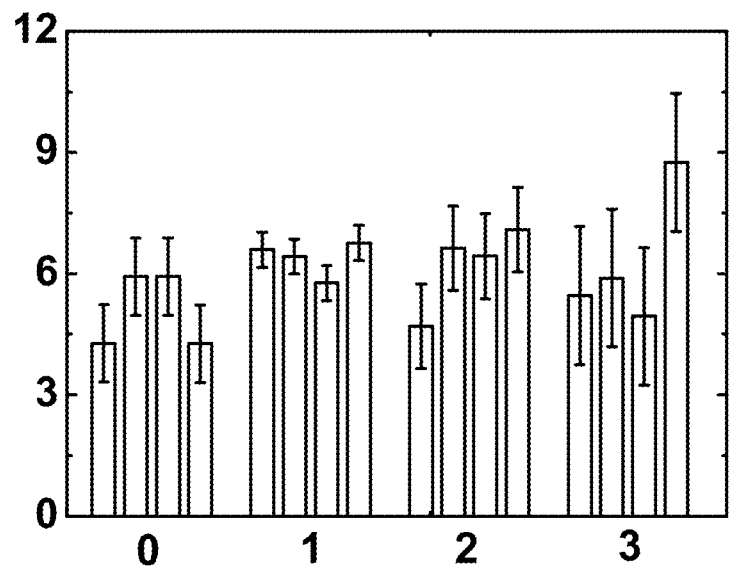
FIG. 16. Stress at break (ordinate, MPa) of samples of the cross-linked polymer network N1 not recycled (abscissa, 0), of samples of the cross-linked polymer network N1 recycled 1 time (abscissa, 1), of samples of the cross-linked polymer network N1 recycled 2 times (abscissa, 2), of samples of the cross-linked polymer network N1 recycled 3 times (abscissa, 3).

FIG. 16 represents the stress at break (ordinate, MPa) of samples of the cross-linked polymer network N1 not recycled (abscissa, 0), of samples of the cross-linked polymer network N1 recycled 1 time (abscissa, 1), of samples of the cross-linked polymer network N1 recycled 2 times (abscissa, 2), of samples of the cross-linked polymer network N1 recycled 3 times (abscissa, 3).

This analysis indicates that the stress at break of the cross-linked polymer network N1 does not decrease significantly after several recycling and re-processing cycles.

Figure 17:
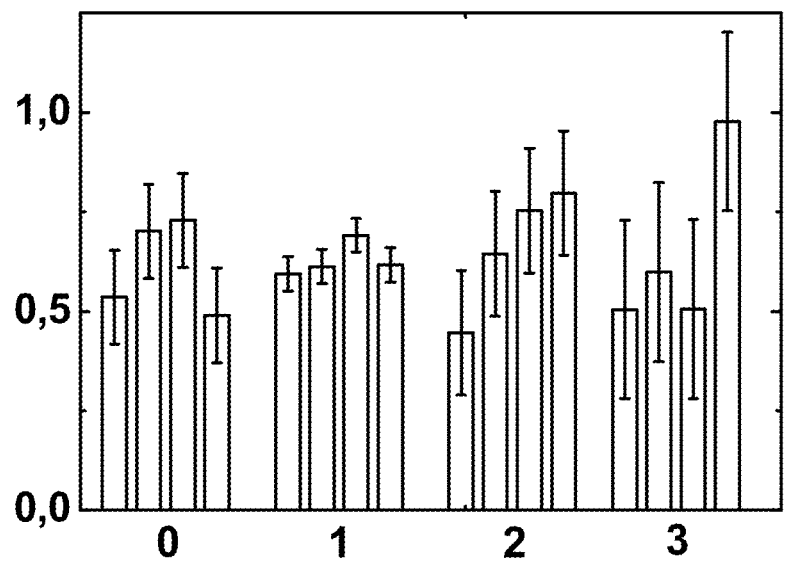
FIG. 17. Elongation at break (ordinate, %) of samples of the cross-linked polymer network N1 not recycled (abscissa, 0), of samples of the cross-linked polymer network N1 recycled 1 time (abscissa, 1), of samples of the cross-linked polymer network N1 recycled 2 times (abscissa, 2), of samples of the cross-linked polymer network N1 recycled 3 times (abscissa, 3).

FIG. 17 represents the elongation at break (ordinate, %) of samples of the cross-linked polymer network N1 not recycled (abscissa, 0), of samples of the cross-linked polymer network N1 recycled 1 time (abscissa, 1), of samples of the cross-linked polymer network N1 recycled 2 times (abscissa, 2), of samples of the cross-linked polymer network N1 recycled 3 times (abscissa, 3).

This analysis indicates that the elongation at break of the cross-linked polymer network N1 does not decrease significantly after several recycling and re-processing cycles.

5.4. Creep Tests of Cross-Linker Polymer Networks N1 and N2

The following example illustrates the possibility to reshape the cross-linked polymer networks described in the invention after processing via compression molding.

Samples of the cross-linked polymer network N1 and of the cross-linked polymer network N2 were tested for creep in an ARES G2 rheometer from TA Instruments. The samples with disc shape of the cross-linked polymer network N1 were put under a stress of 1000 Pa at 4 different temperatures (160° C., 150° C., 140° C., 130° C.) for ca. 20 minutes. After ca. 20 minutes, the stress was released and the samples were kept at the respective temperature for ca. 10 minutes.

A sample of the cross-linked polymer network N2 with a disc shape was put under a stress of 1000 Pa at 160° C. for ca. 30 minutes. After ca. 30 minutes, the stress was released and the sample was kept at 160° C. for ca. 30 minutes.

Figure 18:
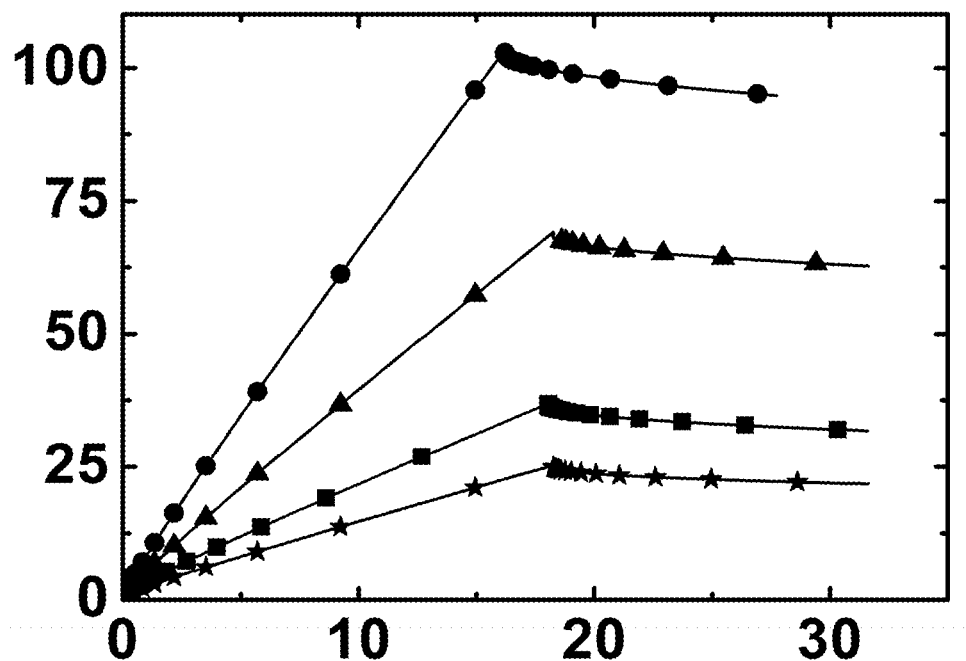
FIG. 18. Deformation (ordinate, %) as a function of time (abscissa, min), for 4 temperatures (160° C. circles; 150° C. triangles; 140° squares; 130° C. stars), of samples of the cross-linked polymer network N1.

FIG. 18 represents the deformation (ordinate, %) as a function of time (abscissa, min), for 4 temperatures (160° C. circles; 150° C. triangles; 140° C. squares; 130° C. stars), of samples of the cross-linked polymer network N1.

Figure 19:
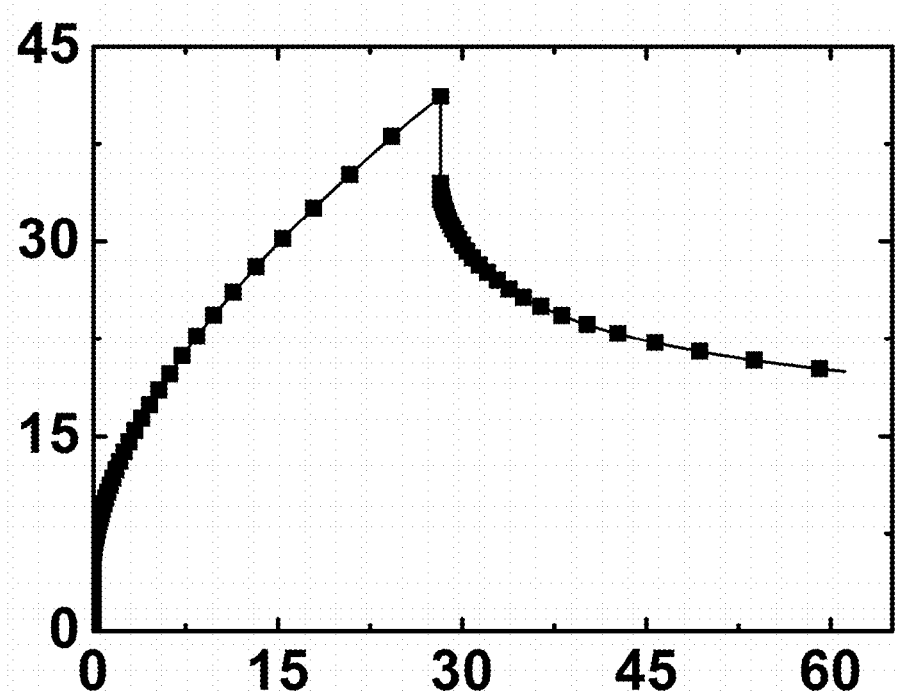
FIG. 19. Deformation (ordinate, %) in time (abscissa, min), at 160° C. of samples of the cross-linked polymer network N2.

FIG. 19 represents the deformation (ordinate, %) in time (abscissa, min), at 160° C. of samples of the cross-linked polymer network N2.

These experiments indicate that the cross-linked polymer networks N1 and N2 flow at a temperature greater than the glass transition temperature (Tg) or fusion (Tf), advantageously greater than Tg or Tf+10° C., more advantageously greater than Tg or Tf+20° C., even more advantageously greater than Tg or Tf+40° C., even more advantageously greater than Tg or Tf+80° C., if the glass transition temperature or the fusion temperature is lower than 25° C.

These experiments also indicate that after releasing the stress, the samples present a permanent deformation of several % that corresponds to their new equilibrium state. It is thus possible to give new shapes to cross-linked polymer networks N1 and N2.

5.5. Stress Relaxation Tests of Cross-Linked Polymer Networks N1, N2 and N3

The following examples illustrate the ability of the cross-linked polymer networks described in the invention to totally or partially relax the stresses present in the material at a temperature greater than the glass transition temperature (Tg) or fusion (Tf), advantageously greater than Tg or Tf+10° C., more advantageously greater than Tg or Tf+20° C., even more advantageously greater than Tg or Tf+40° C., even more advantageously greater than Tg or Tf+80° C., if the glass transition temperature or the fusion temperature is lower than 25° C.

The stress relaxation experiments were performed in an Ares G2 rheometer with parallel plate geometry with a diameter of 25 mm. The rheometer is heated to 150° C. and equilibrated at this temperature for 5 minutes. The samples are placed between the two plates, equilibrated for 5 minutes and a normal force of 10-15 N is applied. After 5 minutes, a deformation of 3% is applied and the evolution of the stress as a function of time is monitored.

Figure 20:
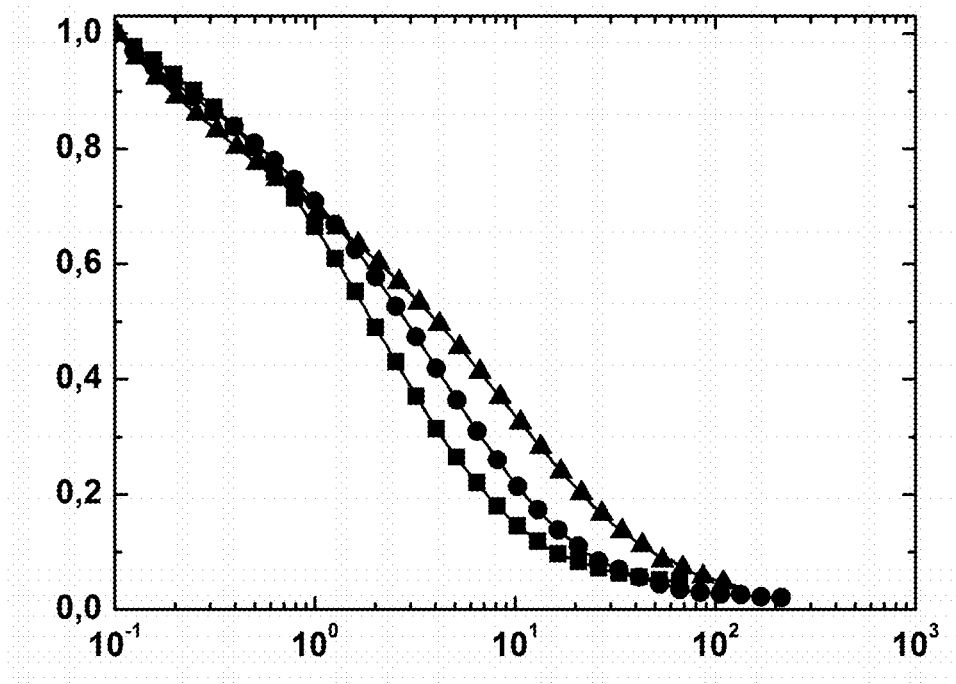
FIG. 20. Shear relaxation modulus normalized by the initial modulus at t=0 (ordinate, without unit) as a function of time (abscissa, seconds) of samples of the cross-linked polymer network N1 at 170° C. (square), at 150° C. (circle), at 130° C. (triangle).

FIG. 20 represents the shear relaxation modulus normalized by the initial modulus at t=0 (ordinate, without unit) as a function of time (abscissa, seconds) of samples of the cross-linked polymer network N1 at 170° C. (square), at 150° C. (circle), at 130° C. (triangle).

Figure 21:
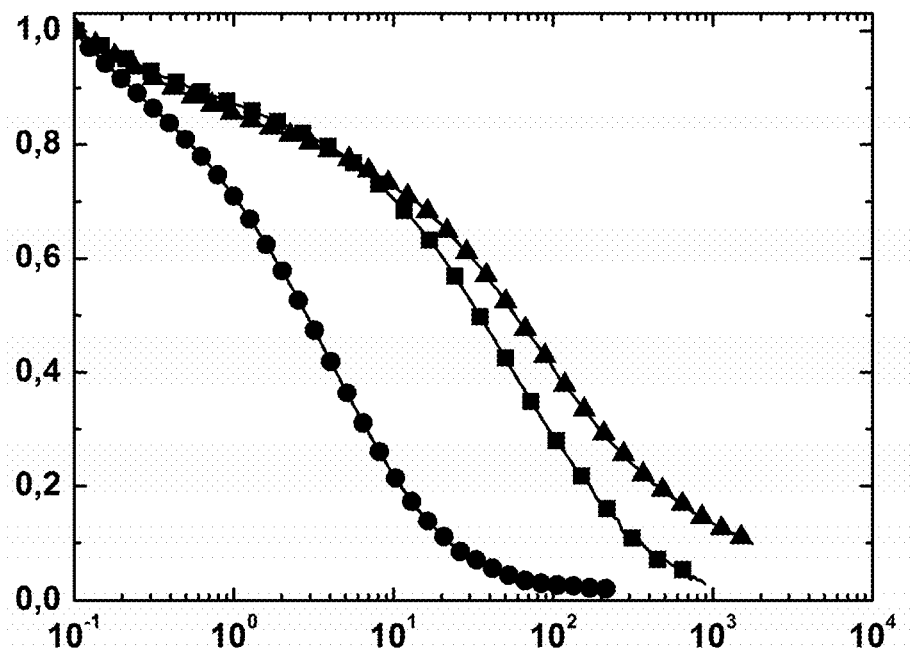
FIG. 21. Shear relaxation modulus normalized by the initial modulus at t=0 (ordinate, without unit) as a function of time (abscissa, seconds) at 150° C., of samples of the cross-linked polymer network N1 (circle), of samples of the cross-linked polymer network N2 (triangle), of samples of the cross-linked polymer network N3 (square).

FIG. 21 represents the shear relaxation modulus normalized by the initial modulus at t=0 (ordinate, without unit) as a function of time (abscissa, seconds) at 150° C., of samples of the cross-linked polymer network N1 (circle), of samples of the cross-linked polymer network N2 (triangle), of samples of the cross-linked polymer network N3 (square).

These experiments indicate that the cross-linked polymer networks described in the invention can entirely or partially relax stress present in the material at a temperature greater than the glass transition temperature of the polymers.

5.6. Processing of the Cross-Linked Polymer Network N2 Via Injection Molding

The following example illustrates the possibility to process the cross-linked polymer networks described in the invention via injection molding.

1 g of the cross-linked polymer network N2 is injection molded using an injection molding machine DSM Xplore micro 10 cc and a mold with a dumbbell geometry (length ca 7 cm). The mold is heated to 200° C. before injection. The cross-linked polymer network N2 to be injected is introduced as a powder at RT into the injection molding machine. The polymer is heated to 200° C. (5 minutes) and equilibrated for 5 minutes. Injection molding proceeds in 5 steps: 2×30 seconds at 10 bar pressure, followed by 2×30 seconds at 12 bar pressure and release of the pressure. After injection, the mold containing the injected cross-linked polymer network N2 is hold at 200° C. for 1 minute before cooling with a water system for 5-10 minutes.

The object hence prepared by this injection molding is insoluble in anhydrous THF (75 mL of anhydrous THF per g of material; immersed 24 hours at RT).

5.7. Example of a Solid Formulation, Processing Via Compression Molding: Network NX1 and NX2

The following examples represent solid formulations and illustrate the formation of cross-linked polymer networks according to the invention, their processing via compression molding and their ability to totally or partially relax the stresses present in the material at a temperature greater than the glass transition temperature (Tg) or fusion (Tf), advantageously greater than Tg or Tf+10° C., more advantageously greater than Tg or Tf+20° C., even more advantageously greater than Tg or Tf+40° C., even more advantageously greater than Tg or Tf+80° C., if the glass transition temperature or the fusion temperature is lower than 25° C.

5.7.1. Formation of a Cross-Linked Polymer Network: NX1

Synthesis from the PMMA Containing Pending Cyclohexylboronic Ester Functions (Polymer P2f) and the Cross-Linking Agent R1

2 g of polymer P2f are dissolved in 10 mL anhydrous THF at RT and 44 mg of cross-linking agent R1 (compound of formula (Ia)) are added. The reaction mixture is stirred slowly at RT during 30 minutes before being concentrated under reduced pressure at 120° C. for 3 hours. The resulting polymer is ground into powder and compression molded during 1 hour at 150° C. under a pressure of 3 to 5 tons. The resulting cross-linked polymer network is called NX1.

5.7.2. Formation of a Cross-Linked Polymer Network: NX2

Synthesis from the PMMA Containing Pending Phenylboronic Ester Functions (Polymer P2c) and the Cross-Linking Agent R2

2 g of polymer P2c are dissolved in 10 mL of anhydrous THF at RT and 44 mg of cross-linking agent R2 (compound of formula (Ia)) are added. The reaction mixture is stirred slowly at RT during 30 minutes before being concentrated under reduced pressure at 120° C. for 3 hours. The resulting polymer is ground into powder and compression molded during 1 hour at 150° C. under a pressure of 3 to 5 tons. The resulting cross-linked polymer network is called NX2.

5.8. Stress Relaxation Tests of the Cross-Linked Polymer Networks NX1 and NX2

The stress relaxation experiments were performed in an Ares G2 rheometer in parallel plate geometry with a diameter of 25 mm. The rheometer is heated to 150° C. and equilibrated for 5 minutes. The samples are placed between the plates, equilibrated for 5 minutes and a normal force of 10-15 N is applied. After 5 minutes, a deformation of 3% is applied and the evolution of the stress in time is monitored.

Figure 22:
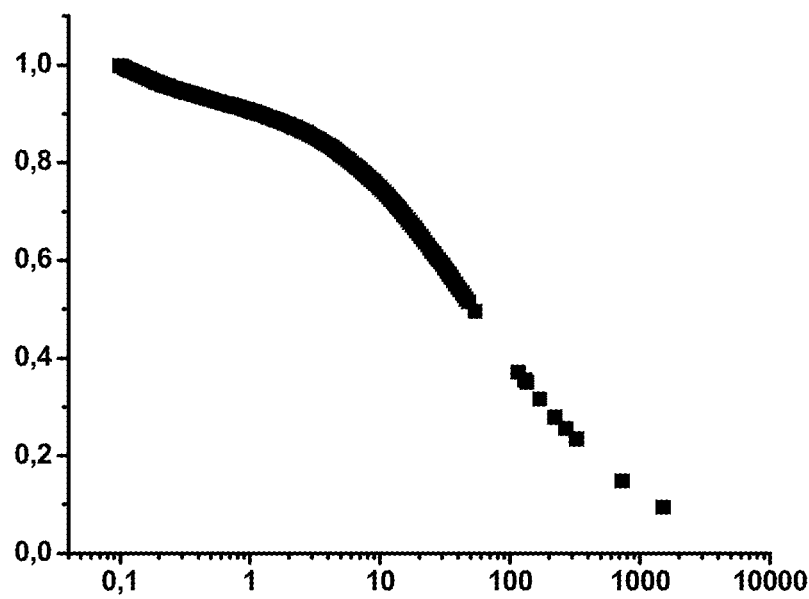
FIG. 22. Shear relaxation modulus normalized by the initial modulus at t=0 (ordinate, without unit) as a function of time (abscissa, seconds) of the samples of the cross-linked polymer networks NX1 at 150° C. (square)

FIG. 22 represents the shear relaxation modulus normalized by the initial module at t=0 (ordinate, without unit) as a function of time (abscissa, seconds) of the samples of the cross-linked polymer networks NX1 at 150° C. (square)

Figure 23:
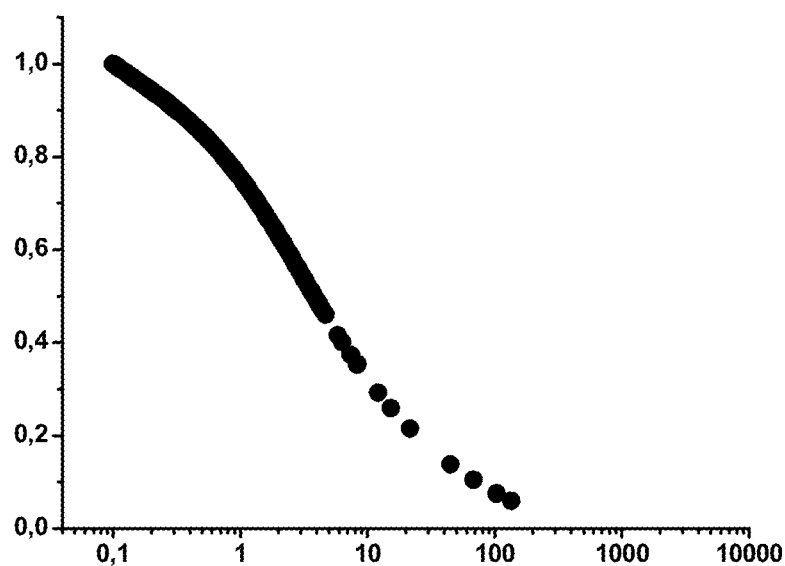
FIG. 23. Shear relaxation modulus normalized by the initial modulus at t=0 (ordinate, without unit) as a function of time (abscissa, seconds) of the samples of the cross-linked polymer networks NX2 at 150° C. (circle)

FIG. 23 represents the shear relaxation modulus normalized by the initial module at t=0 (ordinate, without unit) as a function of time (abscissa, seconds) of the samples of the cross-linked polymer networks NX2 at 150° C. (circle).

These experiments indicate that the cross-linked polymer networks described in the invention can relax stress, present in the material, totally or partially at a temperature superior to the glass transition temperature of the polymers.

5.9. Example of Solid Formulations: Network NY1 and NY2

The following examples represent two solid formulations and illustrate the formation of cross-linked polystyrene networks according to the invention as well as their insolubility in a good non-reactive solvent of the polymer constituting the cross-linked polymer network.

5.9.1. Formation of a Cross-Linked Polystyrene Network: NY1

Synthesis from the PSt with Pending Dioxaborolane Functions (Polymer P2e) and the Cross-Linking Agent R1

10 g of polystyrene with pending dioxaborolane functions, Polymer P2e, are dissolved in 25 mL of anhydrous THF and a solution of cross-linking agent R1 (compound of formula (Ia)) (220 mg) in anhydrous THF (0.5 mL) is added. Gel formation is observed after 10-30 minutes at room temperature. The gel is dried under vacuum at 120° C. for 5 hours, ground and further dried for 16 additional hours at 120° C. under vacuum. The resulting cross-linked polymer network is called NY1.

5.9.2. Formation of a Cross-Linked Polystyrene Network: NY2

Synthesis from the PSt with Pending Dioxaborolane Functions (Polymer P2e) and the Cross-Linking Agent R1 by Reactive Extrusion The formation of the cross-linked polystyrene network NY2 was carried out using a DSM Explore batch twin-screw extruder (5 cm3 capacity) equipped with co-rotating conical screw profile and recirculation channel to control the residence time. Dry blends of polystyrene with pending dioxaborolane functions, Polymer P2e, and cross-linking agent R1 (compound of formula (Ia)) (2.2 wt % as compared to Polymer 2e) were introduced in the extruder. Cross-linking was performed under nitrogen atmosphere with a barrel temperature of 200° C., a screw speed of 100 rpm and a residence time of 6 min. Extrudates were collected and let to cool down to room temperature. The resulting cross-linked polymer network is called NY2.

Solubility Tests of the Cross-Linked Polymer Network NY2 at RT in Dichloromethane (DCM)

A sample of the cross-linker polymer network NY2 is added to 6 mL of anhydrous dichloromethane and swollen for 24 hours at RT. The sample is weighted, dried under high vacuum at 100° C. until constant weight (ca. 24 hours). The swelling ratio (SR) and the soluble fraction (SF) of the cross-linked polymer network NY2 are calculated. This experiment is done on three samples and the results are reported in table 2, below.

Swelling ratio=(mass of the swollen sample−mass of the dried sample after swelling)/(mass of the dried sample after swelling)

Soluble fraction=(mass of the dry sample before swelling−mass of the dried sample after swelling)/(mass of the dried sample after swelling)

TABLE 2

| Sample | Mass before swelling [mg] | Mass swollen [mg] | Swelling ratio | Mass dried after swelling [mg] | Soluble fraction [%] |
|---|---|---|---|---|---|
| 1 | 81.5 | 2131 | 27 | 76 | 7.2 |
| 2 | 184 | 3874 | 21.7 | 171 | 7.6 |
| 3 | 151 | 3610 | 23.1 | 150 | 0.7 |

5.10. Recycling of a Cross-Linked Polymer Network after Processing Via Injection Molding/Mechanical Testing/Grinding to Powder The following example represents a solid formulation, its mechanical characterization, its processing via injection molding, and illustrates the aptitude of the cross-linked polymer networks described in the invention to be recycled several times without significant degradation of their mechanical properties.

A DSM Xplore micro 10 cm$^3$ injection molding machine was used to prepare dumbbell shape samples (length ca 7 cm). 3 g of the cross-linked polymer network NY1 are introduced into the injection molding machine as a powder or as small fragments at RT. The cross-linked polymer network NY1 is then injected at 200° C. under 12 bar of pressure into the preheated mold (180° C.) during a total of 15 to 30 seconds, before cooling down to 45° C. by using a water circuit (ca. 3 minutes).

Samples obtained from the cross-linked polymer network NY1 with the a dumbbell shape were then tested in traction using an Instron 5564 tensile machine mounted with a 2 kN cell. Specimens were tested in quintuplicate at a fixed crosshead speed of 1.5 mm/min. The samples were elongated to rupture, cut down to small fragments and re-processed via injection molding following the procedure described in the previous paragraph. This procedure was repeated 3 times. The Young's modulus was determined as the initial slope of the stress-strain curves.

Figure 24:
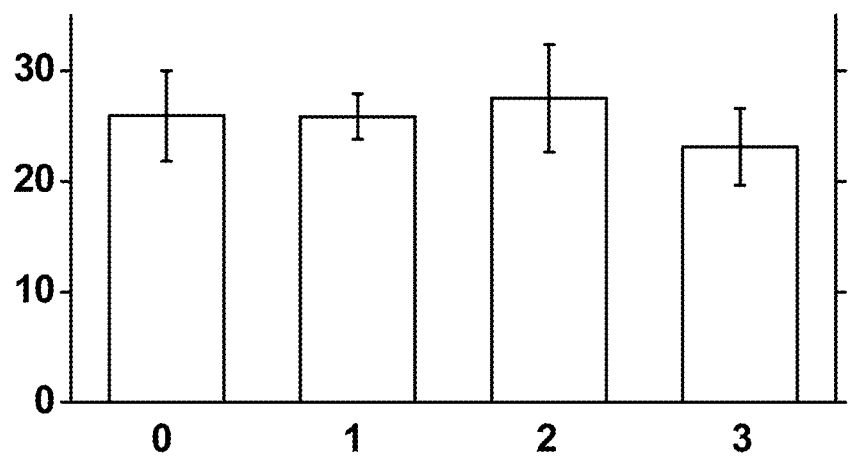
FIG. 24. Average stress at break (ordinate, MPa) of samples of the cross-linked polymer network NY1 not recycled (abscissa, 0), of samples of the cross-linked polymer network NY1 recycled 1 time (abscissa, 1), of samples of the cross-linked polymer network NY1 recycled 2 times (abscissa, 2), of samples of the cross-linked polymer network NY1 recycled 3 times (abscissa, 3).

FIG. 24 represents the average stress at break (ordinate, MPa) of samples of the cross-linked polymer network NY1 not recycled (abscissa, 0), of samples of the cross-linked polymer network NY1 recycled 1 time (abscissa, 1), of samples of the cross-linked polymer network NY1 recycled 2 times (abscissa, 2), of samples of the cross-linked polymer network NY1 recycled 3 times (abscissa, 3).

This analysis indicates that the stress at break of the cross-linked polymer network NY1 does not decrease significantly after several recycling and re-processing cycles.

Figure 25:
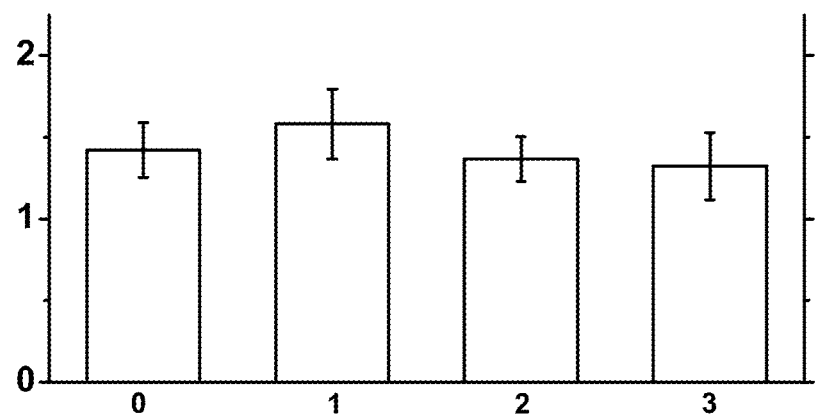
FIG. 25. Average Young's modulus (ordinate, GPa) of samples of the cross-linked polymer network NY1 not recycled (abscissa, 0), of samples of the cross-linked polymer network NY1 recycled 1 time (abscissa, 1), of samples of the cross-linked polymer network NY1 recycled 2 times (abscissa, 2), of samples of the cross-linked polymer network NY1 recycled 3 times (abscissa, 3).

FIG. 25 represents the average Young's modulus (ordinate, GPa) of samples of the cross-linked polymer network NY1 not recycled (abscissa, 0), of samples of the cross-linked polymer network NY1 recycled 1 time (abscissa, 1), of samples of the cross-linked polymer network NY1 recycled 2 times (abscissa, 2), of samples of the cross-linked polymer network NY1 recycled 3 times (abscissa, 3).

This analysis indicates that the Young's modulus of the cross-linked polymer network NY1 does not decrease significantly after several recycling and re-processing cycles.

5.11. Environmental Stress Cracking on a PSt with Pending Dioxaborolane Functions (Polymer P2e) and on a Polystyrene Cross-Linked Network (NY2)

The following example represents a solid formulation and illustrates the superior solvent resistance and mechanical properties of the cross-linked polymer networks described in the invention as compared to thermoplastic polymers of similar chemical nature.

Environmental stress cracking of polystyrene with pending dioxaborolane functions, Polymer P2e, and of cross-linked polystyrene network NY2 was performed using a TA Instruments Q800 in three point bending geometry. Rectangular samples prepared by compression molding at 150° C. under a pressure of 3 to 5 tons for 5 minutes were used. Their dimensions were: length of 30 mm, width of 15.8 mm, thickness of 1.4 mm. Environmental conditions were simulated by placing the samples on the two lower tips of a demounted three point bending set-up in a closed beaker containing a mixture of 300 mL of ethanol/water (9/1). Stress was applied by positioning a weight of 41 g on the center of the samples for different time intervals. The samples were removed, dried on both sides with a paper towel and left at room temperature for 20 more minutes before testing their mechanical resistance. To do so, the samples were subsequently placed in a three point bending set-up and the force was ramped at 3 N/min to a maximum force of 18 N (maximum limit of the machine) at 35° C.

The results are reported in table 3, below.

TABLE 3

| Sample | Immersion time in a 9/1 ethanol/water mixture under a weight of 41 g (min) | Stress at break in three point bending (MPa) |
| --- | --- | --- |
| Polystyrene P2e | 0 | No rupture |
| Polystyrene P2e | 2 | 26.8 |
| Polystyrene P2e | 10 | 23.9 |
| Polystyrene P2e | 20 | 18.0 |
| Polystyrene network NY2 | 0 | No rupture |
| Polystyrene network NY2 | 2 | No rupture |
| Polystyrene network NY2 | 30 | No rupture |
| Polystyrene network NY2 | 180 | No rupture |

5.12. Example of a Solid Formulation Using Compound 14 or Additive C1: Network NZ1

The following examples represent a solid formulation and illustrate the formation of cross-linked high-density polyethylene network according to the invention using the additive C1.

The formation of the cross-linked high-density polyethylene network NZ1 was carried out using a DSM Explore batch twin-screw extruder (5 cm3 capacity) equipped with co-rotating conical screw profile and recirculation channel to control the residence time. Dry blends of HDPE, compound 14 or additive C1 (4 wt %) and dicumyl peroxide (0.3 wt %) were prepared prior to introduction in the extruder. Melt grafting was performed under nitrogen atmosphere with a barrel temperature of 200° C., a screw speed of 100 rpm and a residence time of 6 minutes. Extrudates were collected and let to cool down to room temperature. The resulting cross-linked polymer network is called NZ1.

5.13. Recycling of a Cross-Linked Polymer Network after Processing Via Compression Molding/Mechanical Testing/Grinding to Powder The following example represents a solid formulation, its mechanical characterization, its processing via compression molding, and illustrates the aptitude of the cross-linked polymer networks described in the invention to be recycled several times without significant degradation of their mechanical properties.

Samples Preparation by Compression Molding

HDPE dumbbell specimen (ISO 527-2 type 5B) were prepared via compression molding of the cross-linked high-density polyethylene network NZ1 at 200° C. under a pressure of 3 to 5 tons for 5 minutes. Samples were generated using a film shape (thickness of 1.5 mm) frame and a punch cutter.

Uniaxial tensile tests were performed at room temperature on the dumbbell-shaped specimens of the cross-linked high-density polyethylene network NZ1 using an Instron 5564 tensile machine mounted with a 2 kN cell. Specimens were tested in quintuplicate at a fixed crosshead speed of 10 mm/min. Engineering stress-strain curves were obtained through measurements of the tensile force F and crosshead displacement $\Delta l$ by defining the engineering stress as $\sigma = F/S_0$ and the strain as $\gamma = \Delta l/l_0$, where $S_0$ and $l_0$ are the initial cross-section and gauge length of the specimens, respectively. The Young's modulus was determined as the initial slope of the engineering stress-strain curves. The ultimate tensile strength was determined as the local maximum in engineering stress at the elastic-plastic transition. In order to test their recyclability, the specimens of the cross-linked high-density polyethylene network NZ1 were cut down to small fragments after tensile testing and reshaped via compression molding, following the procedure described in the previous paragraph. This procedure was repeated 3 times.

Figure 26:
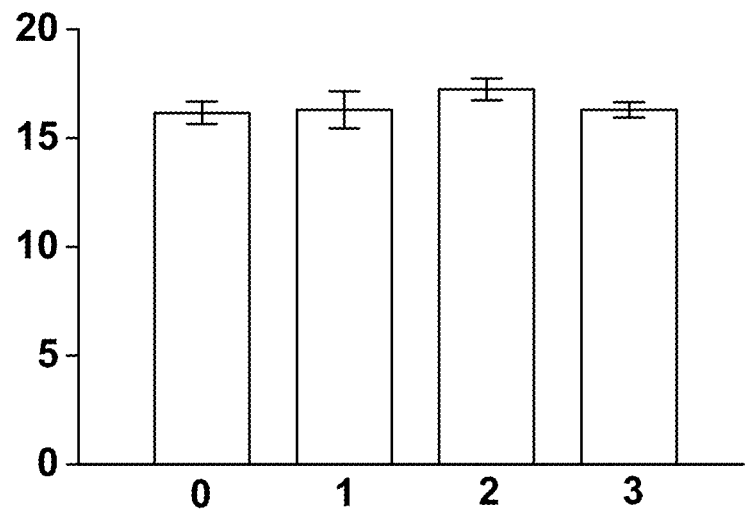
FIG. 26. Average tensile strength (ordinate, MPa) of samples of the cross-linked polymer network NZ1 not recycled (abscissa, 0), of samples of the cross-linked polymer network NZ1 recycled 1 time (abscissa, 1), of samples of the cross-linked polymer network NZ1 recycled 2 times (abscissa, 2), of samples of the cross-linked polymer network NZ1 recycled 3 times (abscissa, 3).

FIG. 26 represents the average tensile strength (ordinate, MPa) of samples of the cross-linked polymer network NZ1 not recycled (abscissa, 0), of samples of the cross-linked polymer network NZ1 recycled 1 time (abscissa, 1), of samples of the cross-linked polymer network NZ1 recycled 2 times (abscissa, 2), of samples of the cross-linked polymer network NZ1 recycled 3 times (abscissa, 3).

This analysis indicates that the tensile strength of the cross-linked polymer network NZ1 does not decrease significantly after several recycling and re-processing cycles.

Figure 27:
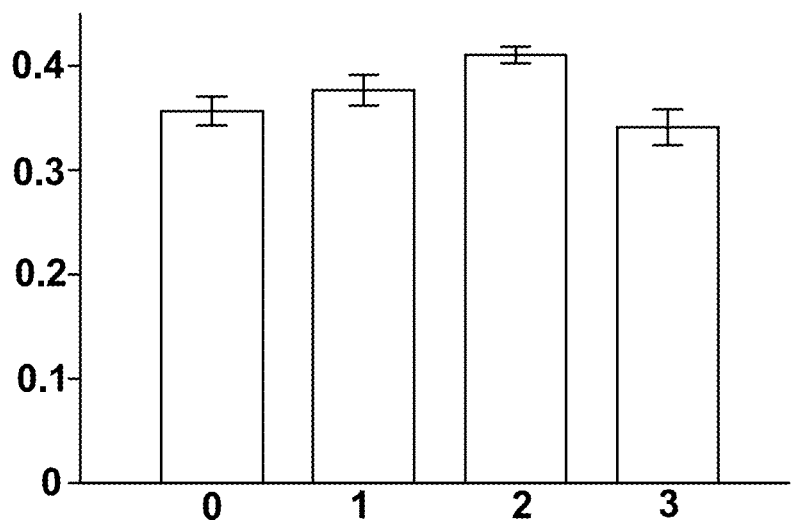
FIG. 27. Average Young's modulus (ordinate, GPa) of samples of the cross-linked polymer network NZ1 not recycled (abscissa, 0), of samples of the cross-linked polymer network NZ1 recycled 1 time (abscissa, 1), of samples of the cross-linked polymer network NZ1 recycled 2 times (abscissa, 2), of samples of the cross-linked polymer network NZ1 recycled 3 times (abscissa, 3).

FIG. 27 represents the average Young's modulus (ordinate, GPa) of samples of the cross-linked polymer network NZ1 not recycled (abscissa, 0), of samples of the cross-linked polymer network NZ1 recycled 1 time (abscissa, 1), of samples of the cross-linked polymer network NZ1 recycled 2 times (abscissa, 2), of samples of the cross-linked polymer network NZ1 recycled 3 times (abscissa, 3).

This analysis indicates that the Young's modulus of the cross-linked polymer network NZ1 does not decrease significantly after several recycling and re-processing cycles.

Example 6: Chemical Uncrosslinking/Recycling of Solid Compositions Containing Cross-Linked Polymer Networks of the Invention Containing Pending Exchangeable Bonds and Cross-Links Exchangeable by Metathesis Reaction of Boronic Esters. Recovery of the Polymers Used to Generate the Cross-Linked Networks The following examples illustrate the possibility to chemically recycle and/or to uncrosslinked the cross-linked polymer networks of the invention.

Samples of the cross-linked polymer network N6 and of the cross-linked polymer network NY2 (50-250 mg polymer, n equivalent of boronic ester functions, either pending or in the cross-links) were placed in anhydrous tetrahydrofuran and 1,2-propanediol (50-150×n equivalents) was added. After one night at room temperature, all samples were completely dissolved. The resulting solution were analyzed by size exclusion chromatography and compared to the linear polymers used to generate the cross-linked polymer networks containing pending exchangeable bonds and cross-links exchangeable by metathesis reaction of boronic esters. The results are reported in table 4, below.

GPC results of linear precursors, of cross-linked polymer network N6 after chemical uncrosslinking (processed once by injection molding and processed and recycled three times by successive injection molding/grinding) and of cross-linked polymer network NY2 after chemical uncrosslinking

TABLE 4

| # | $M_n$ (g/mol) | $M_w$ (g/mol) | Đ | Processing |
|---|---|---|---|---|
| Cross-linked polymer network N6 | | | | |
| Precursor: Polymer P2d | 86 000 | 120 000 | 1.40 | — |
| Cleaved network N6 | 75 000 | 105 000 | 1.40 | 1 injection/molding. |
| Cleaved network N6 | 76 000 | 108 000 | 1.42 | 3 injection/molding |
| Cross-linked polymer network NY2 | | | | |
| Parent 11 | 76 000 | 130 000 | 1.71 | — |
| Cleaved network NY2 | 76 000 | 129 000 | 1.70 | |

This examples illustrates the fact that the cross-linked polymer networks of the invention containing pending exchangeable bonds and cross-links exchangeable by metathesis reaction of boronic esters can be chemically uncrosslinked to recover the polymer with pending exchangeable boronic ester bonds. This property is of great interest to remove/detach, recover and recycle the cross-linked polymer network of the invention.

Example 7: Adhesion Between Cross-Linked Polymer Networks of the Invention Containing Pending Exchangeable Bonds and Cross-Links Exchangeable by Metathesis Reaction of Boronic Esters The following example illustrates the possibility to stick/glue together two cross-linked polymer networks of the invention containing pending exchangeable bonds and cross-links exchangeable by metathesis reaction of boronic esters. The polymer constituting the two polymer networks can be of the same nature or of different nature, as exemplified in the following example between the cross-linked PMMA network N6 and the cross-linked HDPE network NZ1.

Films of the cross-linked PMMA network N6 were compression molded at 180° C. for 10 minutes under a pressure of 3 to 5 tons and cut into strips of 25 mm in length (L), 16 mm in width (w) and 1.5 mm in thickness (h). Films of the cross-linked HDPE network NZ1 were compression molded at 200° C. for 5 minutes under a pressure of 3 to 5 tons and cut into strips of 25 mm in length (L), 16 mm in width (w) and 1.5 mm in thickness (h). Lap joints consisting of two single laps were prepared by placing one strip of cross-linked PMMA network N6 onto two separated strips of cross-linked HDPE network NZ1, with both overlap lengths $l_0$ equal to 1 cm. The lap joints were heated at 190° C. in an oven with a weight of 450 g placed on top of the strip of cross-linked PMMA network N6 in order to ensure contact in both overlap areas for 10 minutes, respectively 20 minutes. The weight was then removed and the lap joints were allowed to cool down to room temperature prior to testing. Lap-shear tests were performed with a speed of 10 mm/min using an Instron 5564 tensile machine mounted with a 2 kN cell. The distance between grips was 27 mm. Three lap joints were prepared and tested for each contact time.

Figure 28:
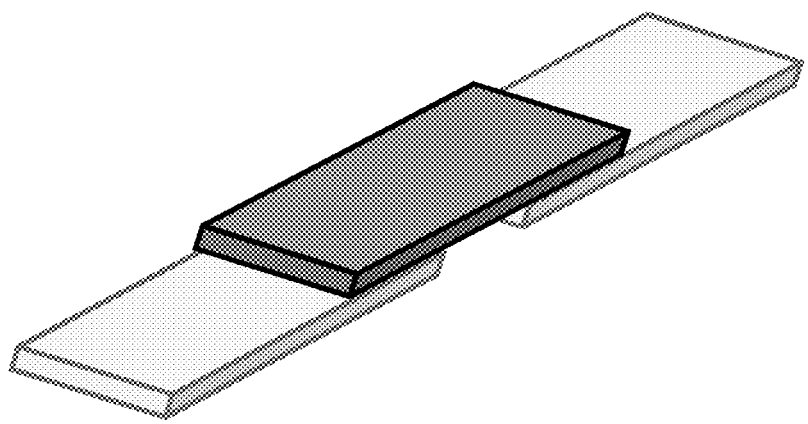
FIG. 28. Schematic representation of the lab joints consisting of two single laps obtained by placing one strip of cross-linked PMMA network N6 (dark grey) onto two separated strips of cross-linked HDPE network NZ1 (light grey), with both overlap lengths $l_0$ equal to 1 cm.

FIG. 28 shows a schematic representation of the lab joints consisting of two single laps obtained by placing one strip of cross-linked PMMA network N6 (dark grey) onto two separated strips of cross-linked HDPE network NZ1 (light grey), with both overlap lengths $l_0$ equal to 1 cm.

Figure 29:
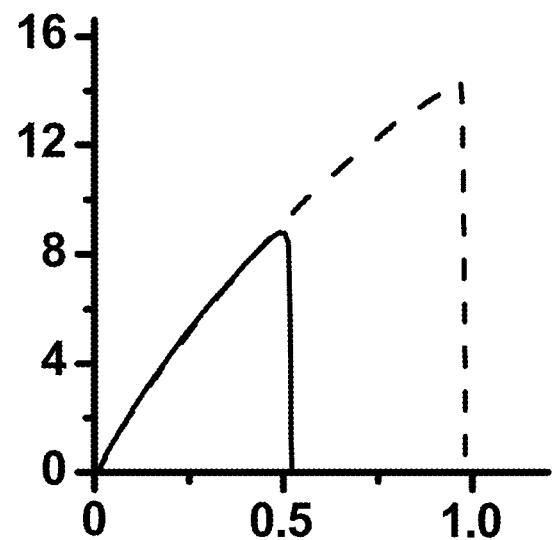
FIG. 29. Force normalized by the width (ordinate, kN/m) as a function of displacement (abscissa, mm) during the lap-shear testing of the cross-linked HDPE network NZ1/cross-linked PMMA network N6/cross-linked HDPE network NZ1 lap joints glued for 10 min (solid line), respectively 20 min (dash line), at 190° C.

FIG. 29 represents the force normalized by the width (ordinate, kN/m) as a function of displacement (abscissa, mm) during the lap-shear testing of the cross-linked HDPE network NZ1/cross-linked PMMA network N6/cross-linked HDPE network NZ1 lap joints glued for 10 min (solid line), respectively 20 min (dash line), at 190° C.

This experiment illustrates the possibility to stick/glue together two cross-linked polymer networks of the invention containing pending exchangeable bonds and cross-links exchangeable by metathesis reaction of boronic esters.

Example 8: Dimensional Stability and Mechanical Property at High Temperature of Cross-Linked Polymer Networks of the Invention Containing Pending Exchangeable Bonds and Cross-Links Exchangeable by Metathesis Reaction of Boronic Esters as Compared to Commercial Thermoplastics Used to Prepare the Cross-Linked Polymer Network The following example illustrates the superior dimensional stability and mechanical properties at high temperature of the cross-linked polymer networks of the invention as compared to linear or branched thermoplastics of similar chemical nature.

The dimensional stability of a commercial HDPE (purchased from Sigma Aldrich, referenced as 428078, melt index 2.2 g/10 min at 190° C. for 2.16 kg) and of a crosslinked HDPE network (prepared from this commercial HDPE), network NZ1, above their melting temperatures were compared. A strip (49 mm in length, 16 mm in width and 1.5 mm in thickness) of the commercial HDPE and of the cross-linked polymer network NZ1 were subjected to extensional creep by fixing their top part between grips and attaching a weight of 258 g (stress of 105.4 kPa) to their bottom part. Heat was applied to the each strip using two heat guns (one on each side, with the same tip-to-sample distance, ca. 5-5.5 cm), and the temperature of the strip was monitored using a thermocouple in contact with the strip' surface. The melt temperature (~130° C.) was attained approximately 10 s after the ignition of the heat guns and the temperature measured by the thermocouple was kept between 170° C. and 200° C. during the rest of the experiment. The strip of commercial HDPE melted and broke after ca. 20 seconds above 130° C. (ca. 30 seconds overall), while the strip of cross-linked HDPE network is NZ1 did not break even after 10 minutes and only elongated of about 1.5 cm.

The invention allows the preparation of vinylic networks These vinylic networks can be obtained by copolymerization:

Example 9: Example of Compositions Containing a Cross-Linked Polymer Network Containing Pending Exchangeable Bonds and Cross-Links Exchangeable by Metathesis Reaction of Boronic Esters, the Network is Obtained by Copolymerization The following two examples represent compositions containing a cross-linked polymer network containing pending exchangeable bonds and cross-links exchangeable by metathesis reaction of boronic esters. In these two examples, the polymer network is prepared either by radical copolymerization of a monomer c and a monomer a in the presence of a cross-linking agent of formula (Ia), or by radical copolymerization of a monomer c, a monomer a and a monomer b according to the invention.

9.1. Example of Compositions Containing a Cross-Linked Polymer Network Containing Pending Exchangeable Bonds and Cross-Links Exchangeable by Metathesis Reaction of Boronic Esters, the Described being Prepared by Radical Copolymerization of a Monomer a and a Monomer c in the Presence of a Cross-Linking Agent of Formula (Ia) According to the Invention.

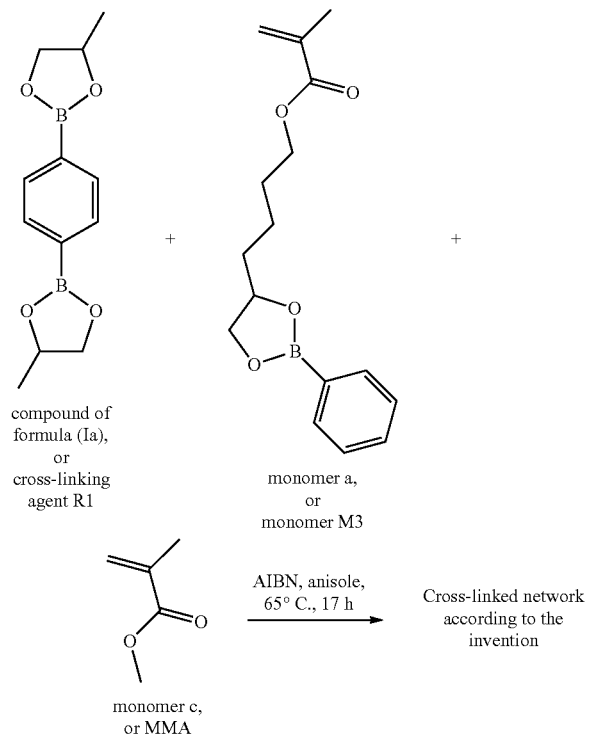

The monomer a, or monomer M3 (220 mg, 0.763 mmol), the compound of formula (Ia), or cross-linking agent R1 (37.6 mg, 0.153 mmol), methyl methacrylate, MMA, or monomer c, (1.53 g, 15.27 mmol) and AIBN (2.63 mg, 0.016 mmol) are mixed in 0.4 mL of anisole and the reaction mixture is bubbled with nitrogen for 10 minutes at RT. The mixture is then stirred at 65° C. for 17 hours. A cross-linked polymer network according to the invention is thus obtained.

9.2. Example of Compositions Containing a Cross-Linked Polymer Network Containing Pending Exchangeable Bonds and Cross-Links Exchangeable by Metathesis Reaction of Boronic Esters, the Described Network is Obtained by Radical Copolymerization of a Monomer a, a Monomer b and a Monomer c According to the Invention.

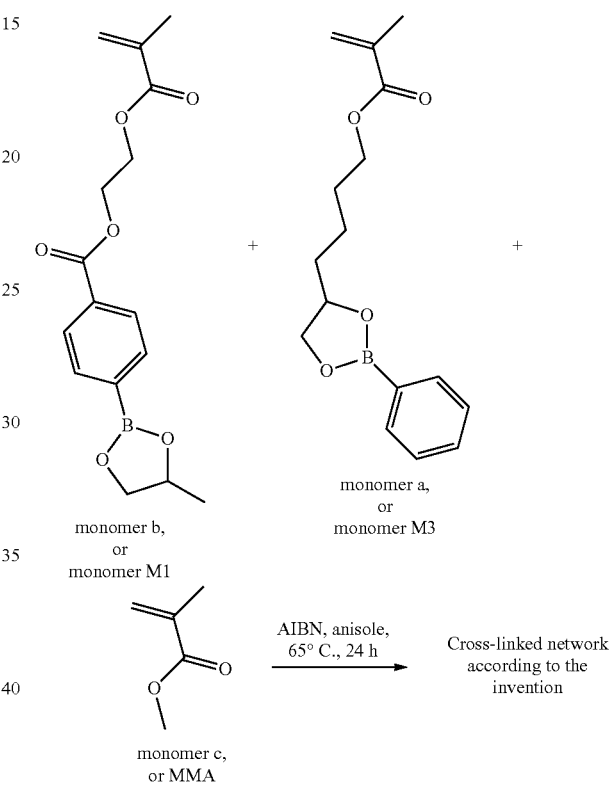

The monomer a, or monomer M3 (288 mg, 0.99 mmol), the monomer b, or monomer M1, (318 mg, 0.99 mmol), methyl methacrylate, MMA, or monomer c, (2.0 g, 19.9 mmol) and AIBN (3.6 mg, 0.022 mmol), are mixed in 0.9 mL of anisole and the reaction mixture is bubbled with nitrogen for 10 minutes. The mixture is then stirred at 65° C. for 24 hours. A cross-linked polymer network according to the invention is thus obtained.

REFERENCES

1 S. Yu, R. Zhang, Q. Wu, T. Chen, P. Sun, Bio-inspired high-performance and recyclable cross-linked polymers. Adv. Mater. 25, 4912-4917 (2013)

The invention claimed is:
1. A composition comprising (a) cross-linked polymers containing exchangeable pending links and exchangeable cross links, by boronic ester metathesis reactions; and (b) free monofunctional boronic esters, said boronic esters being chosen from among the following dioxaborolane and dioxaborinane rings of formulas (EB1) and (EB2) below:

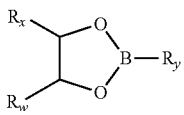
(EB1)

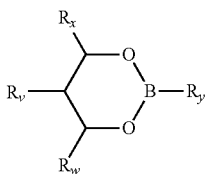
(EB2)

in which

Rx, Rw and Rv are identical or different and each represent a hydrogen atom or a hydrocarbon radical or form together, as a pair, an aliphatic or aromatic ring;

Ry is a hydrocarbon radical linked to the boron atom of the dioxaborolane or dioxaborinane ring by a covalent bond through a carbon atom.

2. The composition according to claim 1 comprising (a) cross-linked polymers containing exchangeable pending links and exchangeable cross links, by boronic ester metathesis reactions, obtained by cross-linking of linear or branched polymers; and (b) free monofunctional boronic esters, said boronic esters being chosen from among the dioxaborolane and dioxaborinane rings of formulas (EB1) and (EB2).

3. The composition according to claim 2, wherein the linear or branched polymers contain less than 1 mmol of 1,2-diol and 1,3-diol functions per gram of polymer before cross-linking and in which the composition contains less than 0.5 mmol of 1,2-diol and 1,3-diol functions per gram of polymer after cross-linking.

4. The composition according to claim 2, in which the polymers, before cross-linking, are linear or branched polymers with side groups carrying boronic ester functional groups of formula (EB1) or (EB2) linked to the polymer by at least one carbon atom of the dioxaborolane or dioxaborinane ring.

5. The composition according to claim 2, in which the polymers, before cross-linking, are linear or branched polymers with side groups carrying boronic ester functional groups of formula (EB1) or (EB2) linked to the polymer by the boron atom of the dioxaborolane or dioxaborinane ring.

6. The composition according to claim 2, that arises from the mixture, in the molten state or in solution, of:
of at least one linear or branched polymer P1 with side-groups carrying:
boronic ester functional groups of formula (EB1) or (EB2) linked to the polymer by at least one carbon atom of the dioxaborolane or dioxaborinane ring; or
boronic ester functional groups of formula (EB1) or (EB2) linked to the polymer by the boron atom of the dioxaborolane or dioxaborinane ring;
of at least one additive carrying at least two boronic ester groups of formula (EB1) or (EB2) that are capable of reacting with the side groups of the polymer P1 to form a cross-linked polymer composition with links and cross-links exchangeable by boronic ester metathesis reactions.

7. The composition according to claim 6, wherein the additive is chosen from among:
a compound of formula (Ia) or (Ib) below:

Compound of formula (Ia)

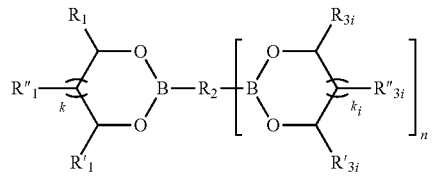

Compound of formula (Ib1)

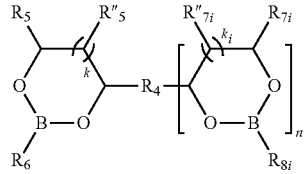

Compound of formula (Ib2)

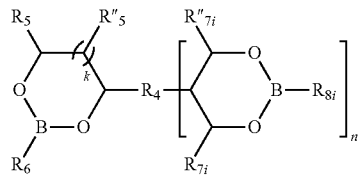

in which n is a whole number between 1 and 6;
i is a whole number between 1 and n;
k equals 0 or 1;
each ki equals 0 or 1;
$R_1$, $R'_1$, $R''_1$, $R_{3i}$, $R'_{3i}$, $R''_{3i}$, $R_5$, $R''_5$, $R_{7i}$, $R''_{7i}$, identically or differently, each represent, independently from one another, a hydrogen atom or a hydrocarbon group;
$R_6$, each $R_{8i}$ identical or different, each represent a hydrocarbon group;
$\{R_1, R'_1, R''_1\}$ can together form, in pairs, an aliphatic or aromatic ring;
$\{R_{3i}, R'_{3i}, R''_{3i}\}$ can together form, in pairs, an aliphatic or aromatic ring;
$\{R_5, R''_5\}$ can together form an aliphatic or aromatic ring;
$\{R_{7i}, R''_{7i}\}$ can together form an aliphatic or aromatic ring;
$R_2$ and $R_4$, identical or different, each represent a hydrocarbon group;
$R_2$, is linked to the boron atom by a covalent bond through a carbon atom;
$R_6$, each $R_{8i}$ is linked to the boron atom by a covalent bond through a carbon atom;
a linear or branched polymer P2 carrying:
boronic ester functional groups of formula (EB1) or (EB2) linked to the polymer by at least one carbon atom of the dioxaborolane or dioxaborinane ring; or
boronic ester functional groups of formula (EB1) or (EB2) linked to the polymer by the boron atom of the dioxaborolane or dioxaborinane ring;
and their mixtures.

8. The composition according to claim 2, that arises from the mixture, in the molten state or in solution, of:
of at least one linear or branched polymer P1' containing functions enabling grafting, a combination of molecules of which the molecules comprise at one end a functional group enabling covalent binding of the molecule to the polymer P1' and at the other end a functional group chosen from among a boronic ester function of formula (EB1) or (EB2) linked to the rest of the molecule by at least one carbon atom of the dioxaborolane or dioxaborinane ring, a boronic ester function of formula (EB1) or (EB2) linked to the rest of the molecule by its boron atom, and/or molecules comprising at two of their extremities functional groups enabling covalent binding of the molecule to the polymer P1' and between these two extremities a boronic ester function of formula (EB1) or (EB2), the combination enabling grafting and the creation of pending links and cross-links that are exchangeable by boronic ester metathesis reactions.

9. The composition according to claim 6, wherein the linear or branched polymer is a polymer chosen from among vinyl polymers, polyolefins, polyamides, polysiloxanes or silicones, and polysaccharides.

10. The composition according to claim 7, wherein the linear or branched polymer is a polymer chosen from among vinyl polymers, polyolefins, polyamides, polysiloxanes or silicones, and polysaccharides.

11. The composition according to claim 8, wherein the linear or branched polymer is a polymer chosen from among vinyl polymers, polyolefins, polyamides, polysiloxanes or silicones, and polysaccharides.

12. A process for preparing the cross-linked polymer composition according to claim 1, said process comprising the following steps:
choosing a linear or branched polymer P1' containing functions enabling grafting;
choosing a combination of molecules of which the molecules comprise at one end a functional group enabling covalent binding of the molecule to the polymer P1' and at the other end a functional group chosen from among a boronic ester function of formula (EB1) or (EB2) linked to the rest of the molecule by at least one carbon atom of the dioxaborolane or dioxaborinane ring, a boronic ester function of formula (EB1) or (EB2) as defined in claim 1 linked to the rest of the molecule by its boron atom, and/or molecules comprising at two of their extremities functional groups enabling covalent binding of the molecule to the polymer P1' and between these two extremities a boronic ester function of formula (EB1) or (EB2), the combination enabling grafting and the creation of pending links and cross-links that are exchangeable by boronic ester metathesis reactions;
mixing, in the molten state or in solution, said polymer P1' and said composition to obtain the said composition.

13. A material obtained from the composition according to claim 1.

14. A formulation comprising a composition according to claim 1.

15. A method for preparing a composition comprising (a) cross-linked polymers containing exchangeable pending links and exchangeable cross links, by boronic ester metathesis reactions; and (b) free monofunctional boronic esters, said boronic esters being chosen from among the following dioxaborolane and dioxaborinane rings of formulas (EB1) and (EB2) below:

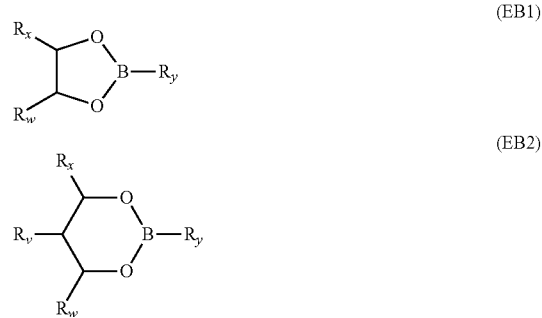

in which
$R_x$, $R_w$ and $R_v$ are identical or different and each represent a hydrogen atom or a hydrocarbon radical or form together, as a pair, an aliphatic or aromatic ring;
$R_y$ is a hydrocarbon radical linked to the boron atom of the dioxaborolane or dioxaborinane ring by a covalent bond through a carbon atom, which comprises
adding at least one additive to a linear or branched polymer,
wherein the additive is chosen from among:
a compound of formula (Ia) or (Ib) below:

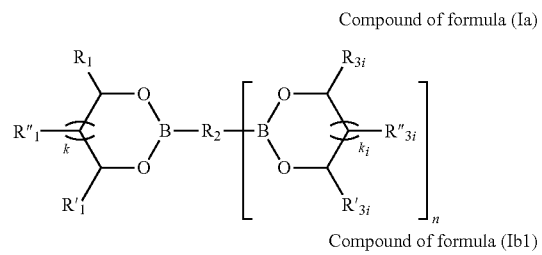

Compound of formula (Ia)

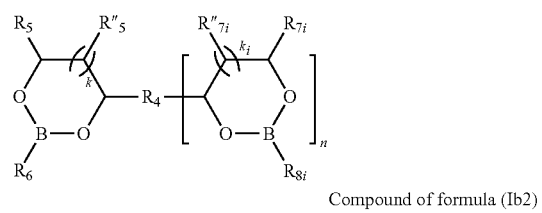

Compound of formula (Ib1)

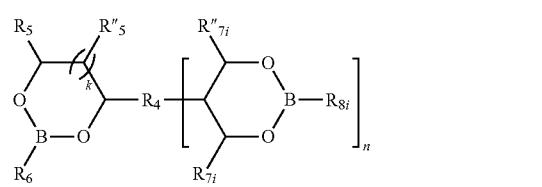

Compound of formula (Ib2)

in which
n is a whole number between 1 and 6;
i is a whole number between 1 and n;
k equals 0 or 1;
each $k_i$ equals 0 or 1;
$R_1$, $R'_1$, $R''_1$, $R_{3i}$, $R'_{3i}$, $R''_{3i}$, $R_5$, $R''_5$, $R_{7i}$, $R''_{7i}$, identically or differently, each represent, independently from one another, a hydrogen atom or a hydrocarbon group;
$R_6$, each $R_{8i}$ identical or different, each represent a hydrocarbon group;
$\{R_1, R'_1, R''_1\}$ can together form, in pairs, an aliphatic or aromatic ring;
$\{R_{3i}, R'_{3i}, R''_{3i}\}$ can together form, in pairs, an aliphatic or aromatic ring;

{R$_5$, R"$_5$} can together form an aliphatic or aromatic ring;
{R$_{7i}$, R"$_{7i}$} can together form an aliphatic or aromatic ring;
R$_2$ and R$_4$, identical or different, each represent a hydrocarbon group;
R$_2$, is linked to the boron atom by a covalent bond through a carbon atom;
R$_6$, each R$_{8i}$ is linked to the boron atom by a covalent bond through a carbon atom;
a linear or branched polymer P2 carrying:
boronic ester functional groups of formula (EB1) or (EB2) linked to the polymer by at least one carbon atom of the dioxaborolane or dioxaborinane ring; or
boronic ester functional groups of formula (EB1) or (EB2) linked to the polymer by the boron atom of the dioxaborolane or dioxaborinane ring;
and their mixtures.

16. A method for preparing a composition comprising (a) cross-linked polymers containing exchangeable pending links and exchangeable cross links, by boronic ester metathesis reactions; and (b) free monofunctional boronic esters, said boronic esters being chosen from among the following dioxaborolane and dioxaborinane rings of formulas (EB1) and (EB2) below:

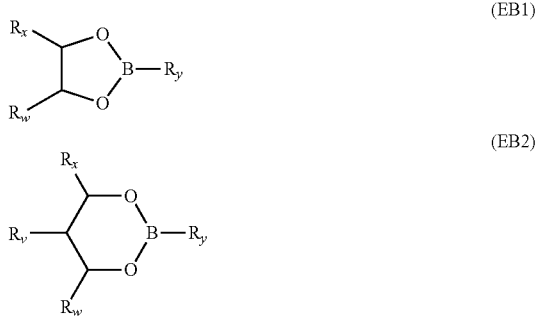

in which
Rx, Rw and Rv are identical or different and each represent a hydrogen atom or a hydrocarbon radical or form together, as a pair, an aliphatic or aromatic ring;
Ry is a hydrocarbon radical linked to the boron atom of the dioxaborolane or dioxaborinane ring by a covalent bond through a carbon atom, which comprises adding a combination to a linear or branched polymer,
wherein the combination comprises molecules that comprise at one end a functional group enabling covalent binding of the molecule to the polymer P1' and at the other end a functional group chosen from among a boronic ester function of formula (EB1) or (EB2) linked to the rest of the molecule by at least one carbon atom of the dioxaborolane or dioxaborinane ring, a boronic ester function of formula (EB1) or (EB2) linked to the rest of the molecule by its boron atom, and/or molecules comprising at two of their extremities functional groups enabling covalent binding of the molecule to the polymer P1' and between these two extremities a boronic ester function of formula (EB1) or (EB2), the combination enabling grafting and the creation of pending links and cross-links that are exchangeable by boronic ester metathesis reactions.

17. A method for preparing a composition comprising (a) cross-linked polymers containing exchangeable pending links and exchangeable cross links, by boronic ester metathesis reactions; and (b) free monofunctional boronic esters, said boronic esters being chosen from among the following dioxaborolane and dioxaborinane rings of formulas (EB1) and (EB2) below:

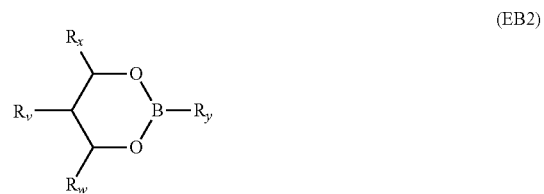

in which
Rx, Rw and Rv are identical or different and each represent a hydrogen atom or a hydrocarbon radical or form together, as a pair, an aliphatic or aromatic ring;
Ry is a hydrocarbon radical linked to the boron atom of the dioxaborolane or dioxaborinane ring by a covalent bond through a carbon atom, which comprises adding to a linear or branched polymer a combination to cross-link linear or branched polymers, said combinations being chosen from among the combinations comprising:
A+B;
A and/or B+C;
A+compound of formula (Ia), as defined in claim 6; or
B+compound of formula (Ib), as defined in claim 6
A, B and C corresponding to the following formulas:

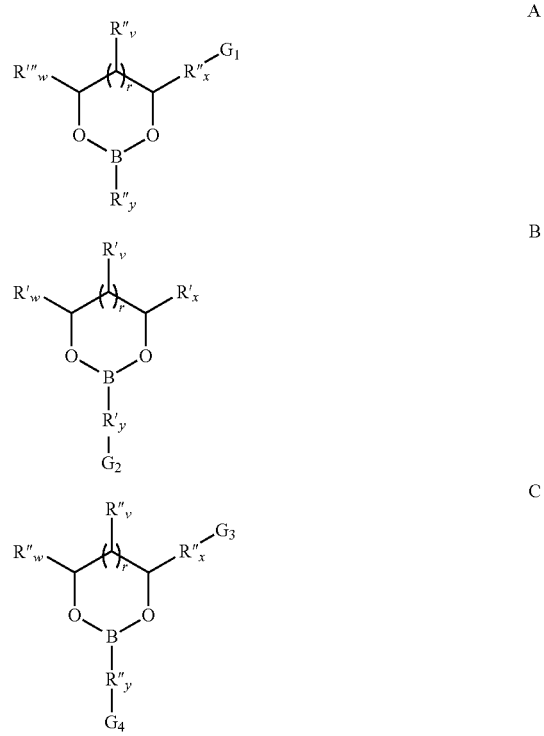

where r=0 or 1

G$_1$, G$_2$, G$_3$ and G$_4$ each represent, independently from one another, a functional group enabling the covalent binding of the molecules to the polymer chain to be functionalised;

R'''x, R''x, and R'''y, R'y, R''y are hydrocarbon groups;

R'v, R'w and R'x, identical or different, each represent a hydrogen atom, a hydrocarbon radical, or form together, as a pair, an aliphatic or aromatic ring;

R'''v and R'''w, respectively R''v and R''w, identical or different, represent a hydrogen atom or a hydrocarbon radical or form an aliphatic or aromatic ring together, or with R'''x, respectively or with R''x;

R'''y, R'y, R''y are linked to the boron through a carbon atom.

18. The method of claim 17, wherein the rheology of a composition containing the linear or branched polymer is modified by choosing the concentration of the combination.

19. The composition according to claim 6, wherein the cross-linked polymer composition is a cross-linked network.

20. The composition according to claim 9, wherein the linear or branched polymer is P1.

21. The composition according to claim 10, wherein the linear or branched polymer is P2.

22. The composition according to claim 11, wherein the linear or branched polymer is P1'.

* * * * *

UNITED STATES PATENT AND TRADEMARK OFFICE
CERTIFICATE OF CORRECTION

PATENT NO. : 10,005,900 B2
APPLICATION NO. : 15/243449
DATED : June 26, 2018
INVENTOR(S) : Ludwik Leibler et al.

Page 1 of 1

It is certified that error appears in the above-identified patent and that said Letters Patent is hereby corrected as shown below:

In the Claims

Column 114, Line 33: change "6" to --7--.

Column 114, Line 34: change "6" to --7--.

Signed and Sealed this
Third Day of September, 2019

Andrei Iancu
*Director of the United States Patent and Trademark Office*